US011790327B2

(12) United States Patent
Bowles et al.

(10) Patent No.: US 11,790,327 B2
(45) Date of Patent: *Oct. 17, 2023

(54) APPLICATION FOR DEVICE EVALUATION AND OTHER PROCESSES ASSOCIATED WITH DEVICE RECYCLING

(71) Applicant: ecoATM, LLC, San Diego, CA (US)

(72) Inventors: Mark Vincent Bowles, San Diego, CA (US); Randal Erman, San Diego, CA (US); Jarrod Hammes, San Diego, CA (US); Jeffrey Ploetner, San Diego, CA (US); John Silva, San Diego, CA (US); Rick Segil, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 16/556,018

(22) Filed: Aug. 29, 2019

(65) Prior Publication Data

US 2020/0090137 A1    Mar. 19, 2020

Related U.S. Application Data

(62) Division of application No. 14/873,145, filed on Oct. 1, 2015, now Pat. No. 10,438,174.
(Continued)

(51) Int. Cl.
*G06Q 10/00* (2023.01)
*G06Q 10/30* (2023.01)
(Continued)

(52) U.S. Cl.
CPC .............. *G06Q 10/30* (2013.01); *G06Q 20/18* (2013.01); *G06Q 20/208* (2013.01);
(Continued)

(58) Field of Classification Search
CPC .... G06Q 10/30; G06Q 30/0611; G06Q 20/18; G06Q 30/0278; G06Q 20/208;
(Continued)

(56) References Cited

U.S. PATENT DOCUMENTS

| 3,808,439 A | 4/1974 | Renius |
| 4,248,334 A | 2/1981 | Hanley et al. |

(Continued)

FOREIGN PATENT DOCUMENTS

| CA | 2926097 | * 10/2009 | ............... G06F 7/00 |
| CA | 2760863 | 11/2010 | |

(Continued)

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.
(Continued)

*Primary Examiner* — Andrew Joseph Rudy
(74) *Attorney, Agent, or Firm* — Perkins Coie LLP

(57) ABSTRACT

Software application systems and associated methods for recycling, purchasing, and/or performing other processes with mobile phones, tablet computers, laptop computers, and/or other electronic devices at a kiosk are described herein. In various embodiments, the present technology includes systems and methods associated with an electronic device to facilitate a consumer-operated kiosk processing (e.g., purchasing) the electronic device. In some embodiments, the present technology includes using a mobile app to identify an electronic device, evaluate the electronic device, resolve device issues to enable purchase of the electronic device, etc. Various other aspects of the present technology are described herein.

14 Claims, 20 Drawing Sheets

Related U.S. Application Data

(60) Provisional application No. 62/059,132, filed on Oct. 2, 2014.

(51) Int. Cl.
*G07F 7/06* (2006.01)
*G06Q 20/18* (2012.01)
*G06Q 20/20* (2012.01)
*G06Q 30/0601* (2023.01)
*G06Q 30/02* (2023.01)
*G06Q 30/0207* (2023.01)

(52) U.S. Cl.
CPC ........... *G06Q 30/0611* (2013.01); *G07F 7/06* (2013.01); *G06Q 30/0237* (2013.01); *G06Q 30/0278* (2013.01); *Y02W 30/82* (2015.05); *Y02W 90/00* (2015.05)

(58) Field of Classification Search
CPC .... G06Q 30/0237; G06Q 10/00; G06Q 30/06; G06Q 20/20; Y02W 30/82; Y02W 90/00; G07F 9/001; G07F 7/06
USPC ......................................................... 705/23
See application file for complete search history.

(56) References Cited

U.S. PATENT DOCUMENTS

| | | | |
|---|---|---|---|
| 4,519,522 A | 5/1985 | McElwee | |
| 4,593,820 A | 6/1986 | Antonie | |
| 4,715,709 A | 12/1987 | Sekine et al. | |
| 4,821,118 A | 4/1989 | Lafreniere | |
| 4,845,636 A | 7/1989 | Walker | |
| 4,870,357 A | 9/1989 | Young et al. | |
| 4,878,736 A | 11/1989 | Hekker et al. | |
| 4,893,789 A | 1/1990 | Novorsky | |
| 4,927,051 A | 5/1990 | Falk et al. | |
| 4,951,308 A | 8/1990 | Bishop et al. | |
| 5,025,344 A | 6/1991 | Maly et al. | |
| 5,027,074 A | 6/1991 | Haferstat | |
| 5,077,462 A | 12/1991 | Newell et al. | |
| 5,091,773 A | 2/1992 | Fouche et al. | |
| 5,105,149 A | 4/1992 | Tokura | |
| 5,216,502 A | 6/1993 | Katz | |
| 5,280,170 A | 1/1994 | Baldwin | |
| 5,319,459 A | 6/1994 | Mochizuki et al. | |
| 5,339,096 A | 8/1994 | Beaufort et al. | |
| 5,419,438 A | 5/1995 | Squyres et al. | |
| 5,436,554 A | 7/1995 | Decker | |
| 5,570,920 A | 11/1996 | Crisman et al. | |
| 5,572,444 A | 11/1996 | Lentz et al. | |
| 5,610,710 A | 3/1997 | Canfield et al. | |
| 5,717,780 A | 2/1998 | Mitsumune et al. | |
| 5,747,784 A | 5/1998 | Walter et al. | |
| 5,748,084 A | 5/1998 | Isikoff | |
| 5,775,806 A | 7/1998 | Allred | |
| 5,839,058 A | 11/1998 | Phillips et al. | |
| 5,871,371 A | 2/1999 | Rothenberger et al. | |
| 5,920,338 A | 7/1999 | Katz | |
| 5,949,901 A | 9/1999 | Nichani et al. | |
| 5,965,858 A | 10/1999 | Suzuki et al. | |
| 5,966,654 A | 10/1999 | Croughwell et al. | |
| 5,987,159 A | 11/1999 | Nichani | |
| 5,988,431 A | 11/1999 | Roe | |
| 6,029,851 A | 2/2000 | Jenkins et al. | |
| 6,041,229 A | 3/2000 | Turner | |
| 6,055,512 A | 4/2000 | Dean et al. | |
| 6,100,986 A | 8/2000 | Rydningen | |
| 6,170,702 B1 | 1/2001 | Zettler et al. | |
| 6,181,805 B1 | 1/2001 | Koike et al. | |
| 6,228,008 B1 | 5/2001 | Pollington et al. | |
| 6,234,812 B1 | 5/2001 | Ivers et al. | |
| 6,259,827 B1 | 7/2001 | Nichani | |
| 6,264,104 B1 | 7/2001 | Jenkins et al. | |
| 6,330,354 B1 | 12/2001 | Companion et al. | |
| 6,330,958 B1 | 12/2001 | Ruskin et al. | |
| 6,393,095 B1 | 5/2002 | Robinson | |
| 6,462,644 B1 | 10/2002 | Howell et al. | |
| 6,529,837 B1 | 3/2003 | Kang | |
| 6,535,637 B1 | 3/2003 | Wootton et al. | |
| 6,573,886 B1 | 6/2003 | Lehtinen et al. | |
| 6,587,581 B1 | 7/2003 | Matsuyama et al. | |
| 6,595,684 B1 | 7/2003 | Casagrande et al. | |
| 6,597,552 B1 | 7/2003 | Griepentrog et al. | |
| 6,633,377 B1 | 10/2003 | Weiss et al. | |
| 6,667,800 B1 | 12/2003 | Larsson et al. | |
| 6,748,296 B2 | 6/2004 | Banerjee et al. | |
| 6,754,637 B1 | 6/2004 | Stenz | |
| 6,758,370 B2 | 7/2004 | Cooke et al. | |
| 6,798,528 B1 | 9/2004 | Hartman | |
| 6,822,422 B2 | 11/2004 | Sagawa | |
| 6,842,596 B2 | 1/2005 | Morii et al. | |
| 6,854,656 B2 | 2/2005 | Matsumori | |
| 6,947,941 B1 | 9/2005 | Koon | |
| D512,964 S | 12/2005 | Kissinger et al. | |
| 7,069,236 B1 | 6/2006 | Tsunenari | |
| 7,076,449 B2 | 7/2006 | Tsunenari et al. | |
| 7,086,592 B2 | 8/2006 | Wagner et al. | |
| 7,178,720 B1 | 2/2007 | Strubbe et al. | |
| 7,234,609 B2 | 6/2007 | DeLazzer et al. | |
| 7,251,458 B2 | 7/2007 | O'Connell | |
| 7,268,345 B2 | 9/2007 | Schultz | |
| 7,334,729 B2 | 2/2008 | Brewington | |
| 7,407,392 B1 | 8/2008 | Cooke et al. | |
| 7,408,674 B2 * | 8/2008 | Moro | G06K 15/00 270/1.01 |
| 7,455,226 B1 | 11/2008 | Hammond et al. | |
| 7,520,666 B2 | 4/2009 | Pevzner et al. | |
| 7,529,687 B1 | 5/2009 | Phan | |
| 7,567,344 B2 | 7/2009 | LeBlanc et al. | |
| 7,642,687 B2 | 1/2010 | Kageyama et al. | |
| 7,646,193 B2 | 1/2010 | Suzuki et al. | |
| 7,649,450 B2 | 1/2010 | Campion et al. | |
| 7,702,108 B2 | 4/2010 | Amon et al. | |
| 7,735,125 B1 | 6/2010 | Alvarez et al. | |
| 7,761,331 B2 | 7/2010 | Low et al. | |
| 7,783,379 B2 | 8/2010 | Beane et al. | |
| 7,848,833 B2 | 12/2010 | Li | |
| 7,881,965 B2 | 2/2011 | Bowels et al. | |
| 7,890,373 B2 | 2/2011 | Janger | |
| D640,199 S | 6/2011 | Wilson | |
| 8,010,402 B1 | 8/2011 | Sharma et al. | |
| 8,019,588 B1 | 9/2011 | Wohlberg et al. | |
| 8,025,229 B2 | 9/2011 | Hammond et al. | |
| 8,031,930 B2 | 10/2011 | Wang et al. | |
| 8,107,243 B2 | 1/2012 | Guccione et al. | |
| 8,112,325 B2 | 2/2012 | Foy et al. | |
| 8,142,199 B1 | 3/2012 | Almouli | |
| 8,195,511 B2 | 6/2012 | Bowles et al. | |
| 8,200,533 B2 | 6/2012 | Librizzi et al. | |
| 8,200,736 B2 | 6/2012 | Shi | |
| 8,215,546 B2 | 7/2012 | Lin et al. | |
| 8,239,262 B2 | 8/2012 | Bowles et al. | |
| 8,254,883 B2 | 8/2012 | Uchida | |
| 8,266,008 B1 | 9/2012 | Siegel et al. | |
| 8,340,815 B2 | 12/2012 | Peters et al. | |
| 8,369,987 B2 | 2/2013 | Claessen | |
| 8,401,914 B1 | 3/2013 | Kim | |
| 8,417,234 B2 * | 4/2013 | Sanding | H04W 12/068 455/418 |
| 8,423,404 B2 | 4/2013 | Bowels et al. | |
| 8,429,021 B2 | 4/2013 | Kraft et al. | |
| 8,463,646 B2 | 6/2013 | Bowles | |
| 8,536,472 B2 | 9/2013 | Wu et al. | |
| 8,543,358 B2 | 9/2013 | Trabona | |
| 8,566,183 B1 | 10/2013 | Bonar et al. | |
| 8,606,633 B2 | 12/2013 | Tarbert et al. | |
| 8,718,717 B2 | 5/2014 | Vaknin et al. | |
| 8,743,215 B1 | 6/2014 | Lee | |
| 8,755,783 B2 | 6/2014 | Brahami et al. | |
| 8,806,280 B2 | 8/2014 | Stephenson | |
| 8,823,794 B2 | 9/2014 | Suzuki et al. | |
| 8,824,136 B1 | 9/2014 | Interian et al. | |

(56) References Cited

U.S. PATENT DOCUMENTS

| | | |
|---|---|---|
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 * | 7/2016 | Lyle ............... G06Q 30/06 |
| 9,497,563 B2 * | 11/2016 | Hornung ............. H04W 4/50 |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,697,548 B1 | 7/2017 | Jaff et al. |
| 9,704,142 B2 | 7/2017 | Ahn |
| 9,818,160 B2 | 11/2017 | Bowles et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 * | 3/2018 | Bowles ............. G06Q 20/208 |
| 9,934,644 B2 | 4/2018 | Chayun et al. |
| 10,032,140 B2 | 7/2018 | Bowles et al. |
| 10,043,339 B2 * | 8/2018 | Walker ............. G07F 17/3225 |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 * | 10/2019 | Bowles ............. G06Q 10/30 |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 * | 2/2020 | Bowles ............. G06Q 30/0278 |
| 10,679,279 B2 * | 6/2020 | Ward ............. G06Q 30/0639 |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,977,700 B2 | 4/2021 | Bordeleau et al. |
| 11,010,841 B2 | 5/2021 | Bowles et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 * | 9/2021 | Silva ............. G07F 7/06 |
| 11,232,412 B2 | 1/2022 | Hunt et al. |
| 11,315,093 B2 | 4/2022 | Bowles |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Higham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0013124 A1 | 1/2007 | Graef et al. |
| 2007/0032098 A1 | 2/2007 | Bowels et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0071627 A1 | 3/2008 | Janger |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |

(56) References Cited

U.S. PATENT DOCUMENTS

| | | |
|---|---|---|
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0160668 A1 | 6/2009 | Crowley et al. |
| 2009/0184865 A1 | 7/2009 | Valo et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1 | 7/2010 | Bowles et al. |
| 2010/0185506 A1 | 7/2010 | Wolff |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0235853 A1 | 9/2011 | Bowles et al. |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1* | 1/2012 | Seergy ............... G06Q 30/0639 705/26.4 |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | Mello et al. |
| 2012/0254046 A1 | 10/2012 | Librizzi et al. |
| 2012/0280934 A1 | 11/2012 | Ha |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0173430 A1* | 7/2013 | Benjamin .......... G06Q 30/0627 705/26.63 |
| 2013/0173434 A1 | 7/2013 | Hartman |
| 2013/0181935 A1 | 7/2013 | McKenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2014/0038556 A1 | 9/2013 | Sullivan |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0012643 A1 | 1/2014 | Behrisch |
| 2014/0052329 A1 | 2/2014 | Amirpour |
| 2014/0067710 A1 | 3/2014 | Gventer et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Chen et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0309912 A1 | 10/2015 | Nguyen et al. |
| 2015/0320485 A1 | 11/2015 | Nash |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0091549 A1 | 3/2016 | Snook et al. |
| 2016/0092849 A1 | 3/2016 | Cirannek et al. |
| 2016/0098689 A1 | 4/2016 | Bowles et al. |
| 2016/0125548 A1 | 5/2016 | Bowles et al. |
| 2016/0125612 A1 | 5/2016 | Seki et al. |
| 2016/0132840 A1 | 5/2016 | Bowles et al. |
| 2016/0171456 A1 | 6/2016 | Bowles et al. |
| 2016/0171544 A1 | 6/2016 | Heminger et al. |
| 2016/0171575 A1 | 6/2016 | Bowles et al. |
| 2016/0210648 A1 | 7/2016 | Cirannek et al. |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0284019 A1 | 9/2016 | Bowles et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0115235 A1 | 4/2017 | Ohlsson et al. |
| 2017/0169401 A1 | 6/2017 | Beane et al. |
| 2017/0278191 A1 | 9/2017 | Tassone et al. |
| 2017/0286920 A1 | 10/2017 | Silva et al. |
| 2017/0301010 A1 | 10/2017 | Bowles et al. |
| 2017/0323279 A1 | 11/2017 | Dion et al. |
| 2017/0372273 A1 | 12/2017 | Bowles et al. |
| 2018/0247280 A1 | 8/2018 | Bowles et al. |
| 2018/0260794 A1 | 9/2018 | Bowles et al. |
| 2019/0066439 A1* | 2/2019 | Pinkus .................. A63F 3/0665 |

(56) References Cited

U.S. PATENT DOCUMENTS

| | | |
|---|---|---|
| 2019/0287141 A1 | 9/2019 | Bordeleau et al. |
| 2019/0325530 A1 | 10/2019 | Bowles et al. |
| 2020/0090137 A1 | 3/2020 | Bowles et al. |
| 2020/0126046 A1 | 4/2020 | Bowles |
| 2020/0151677 A1 | 5/2020 | Bowles et al. |
| 2020/0151679 A1 | 5/2020 | Hunt et al. |
| 2020/0202319 A1 | 6/2020 | Forutanpour et al. |
| 2020/0258343 A1 | 8/2020 | Forutanpour et al. |
| 2020/0259300 A1 | 8/2020 | Forutanpour et al. |
| 2020/0265487 A1 | 8/2020 | Forutanpour et al. |
| 2021/0012315 A1* | 1/2021 | Priebatsch ......... G06Q 20/3278 |
| 2021/0035206 A1 | 2/2021 | Bowles et al. |
| 2021/0081914 A1* | 3/2021 | Nelms ............... G06Q 30/0633 |
| 2021/0174312 A1 | 6/2021 | Bowles et al. |
| 2021/0192484 A1 | 6/2021 | Forutanpour et al. |
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0198407 A1 | 6/2022 | Beane et al. |
| 2022/0318774 A1 | 10/2022 | Bowles |

FOREIGN PATENT DOCUMENTS

| | | |
|---|---|---|
| CA | 2818533 | 5/2012 |
| CA | 2866147 | 9/2013 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 102246384 | 11/2011 |
| CN | 202351953 | 7/2012 |
| CN | 202394296 | 8/2012 |
| CN | 102654927 | 9/2012 |
| CN | 102682597 A | 9/2012 |
| CN | 102812500 | 12/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 | 3/2014 |
| CN | 203520502 | 4/2014 |
| CN | 103824387 A | 5/2014 |
| CN | 203588366 | 5/2014 |
| CN | 103843040 | 6/2014 |
| CN | 103954626 | 7/2014 |
| CN | 105513201 | 4/2016 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 2428072 | 1/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 20120504832 | 2/2012 |
| JP | 2012058932 | 3/2012 |
| JP | 2013033361 | 2/2013 |
| JP | 2013037441 | 2/2013 |
| JP | 2013531823 | 8/2013 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101329949 | 11/2013 |
| KR | 20140037543 | 3/2014 |
| WO | WO8503790 | 8/1985 |
| WO | WO115096 | 3/2001 |
| WO | WO205176 | 1/2002 |
| WO | WO0221090 | 3/2002 |
| WO | WO225613 | 3/2002 |
| WO | WO239357 | 5/2002 |
| WO | WO3012717 | 2/2003 |
| WO | WO3014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006058601 | 6/2006 |
| WO | WO2006080851 | 8/2006 |
| WO | WO2007066166 | 6/2007 |
| WO | WO9128176 | 10/2009 |
| WO | WO2009128173 | 10/2009 |
| WO | WO2009129526 | 10/2009 |
| WO | WO2010040116 | 4/2010 |
| WO | WO2006021825 | 11/2010 |
| WO | WO2010128267 | 11/2010 |

(56) References Cited

FOREIGN PATENT DOCUMENTS

| | | |
|---|---|---|
| WO | WO2010128315 | 11/2010 |
| WO | WO2011131016 | 10/2011 |
| WO | WO2012073126 | 6/2012 |
| WO | WO2012138679 | 10/2012 |
| WO | WO2013002748 | 1/2013 |
| WO | WO2013063042 | 5/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2009089607 | 11/2016 |
| WO | WO2016181224 | 11/2016 |
| WO | WO2015196175 | 12/2016 |
| WO | WO2017034441 | 3/2017 |

OTHER PUBLICATIONS

Cybercom Group Europe AB, "The OMSI 2.0 Interface Supports," OMSI 2.0 Description, available at least before Oct. 2008, 1 page.
Cybercom Group Europe Ab, "OMSI Forum," Downloads, 2005, 2 pages.
Cybercom Group Europe AB, "OMSI Provides Easy Service and Maintenance for Mobile Phones," Press Release, 2005, 1 page.
Cybercom Group, "Leading Telecom Organisations Address Device Management Issues," Press Release, 2007, 1 page.
Foster et al., "Automated Visual Inspection: A Tutorial" 1990 Computers Ind. Engng. vol. 18(4): 493-504.
International Numbering Plan, www.numberingplans.com, 2 pages.
Phifer, "How to Use your 3G Phone as a Wireless Broad Band Modem," Computer Weekly News, 2007, 6 pages.
Romano "Recycling a Phone at EcoATM is an Easy Route to Feeling Green," Xconomy, Jan. 22, 2014, pp. 1-3.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Shotton et al., "Efficiently Combining Contour and Texture Cues for Object Recognition", Proceedings of The British Machine Vision Conference 2008, (Sep. 1, 2008), p. 7.1-7.10 * abstract *.
Sony Ericsson Mobile Communications AB, "T68i/T68ie," White Paper, 2002, 71 pages.
Sony Ericsson Mobile Communications AB, "P800/P802," White Paper, 2003, 128 pages.
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Non-Final Office Action dated Oct. 22, 2018 in U.S. Appl. No. 14/873,145, 7 pages.
Non-Final Office Action Response filed Apr. 22, 2019 in U.S. Appl. No. 14/873,145, 13 pages.
Notice of Allowance dated Jun. 28, 2019 in U.S. Appl. No. 14/873,145, 9 pages.
Non-Final Office Action dated Aug. 24, 2017 in U.S. Appl. No. 15/630,539, 23 pages.
Non-Final Office Action Response filed Nov. 2, 2017 in U.S. Appl. No. 15/630,539, 15 pages.
Notice of Allowance dated Jan. 17, 2018 in U.S. Appl. No. 15/630,539, 12 pages.
Non-Final Office Action response filed Mar. 16, 2021 in U.S. Appl. No. 16/575,003, 13 pages.
Notice of Allowance dated Jun. 28, 2021 in U.S. Appl. No. 16/575,003, 15 pages.
Bhule et al., "Environmental and economic trade-offs in consumer electronic products recycling: a case study of cell phones and computers," IEEE International Symposium on Electronics and the Environment, Conference Record, 2004.
Geyer et al. "The economics of cell phone reuse and recylcing," The International Journal of Advanced Manufacturing Technology, 47(5): 515-525, 2010.
Rosebrock, "How to Build a Kick-Ass Mobile Document Scanner in Just 5 Minutes" PyImage Search, Sep. 2014, 19 pages.
International Search Report and Written Opinion dated Dec. 20, 2021 in International Application No. PCT/US2021/071269, 14 pages.
Wiley Encyclopedia of Computer Science and Technology (2009).
Non-Final Office Action dated Dec. 29, 2017 in U.S. Appl. No. 14/873,158, 14 pages.
Non-Final Office Action dated Oct. 16, 2020 in U.S. Appl. No. 16/575,003, 11 pages.
Non-Final Office Action dated Sep. 8, 2017 in U.S. Appl. No. 15/630,508, 13 pages.
Non-Final Office Action Response filed Mar. 29, 2018 in U.S. Appl. No. 14/873,158, 18 pages.
Non-Final Office Action Response Filed Dec. 8, 2017 in U.S. Appl. No. 15/630,508, 17 pages.
Notice of Allowance dated May 6, 2019 in U.S. Appl. No. 14/873,158, 7 pages.
Notice of Allowance dated May 7, 2019 in U.S. Appl. No. 15/630,508, 7 pages.
Notice of Allowance dated Sep. 5, 2019 in U.S. Appl. No. 14/873,158, 7 pages.
Notice of Allowance dated Sep. 9, 2019 in U.S. Appl. No. 15/630,508, 7 pages.
Final Office Action dated Apr. 19, 2018 in U.S. Appl. No. 15/630,508, 15 Pages.
Final Office Action dated Jul. 23, 2018 in U.S. Appl. No. 14/873,158, 13 pages.
Final Office Action Response filed Apr. 3, 2019 in U.S. Appl. No. 15/630,508, 13 Pages.
Final Office Action Response filed Mar. 25, 2019 in U.S. Appl. No. 14/873,158, 12 pages.
International Search Report and Written Opinion dated Jun. 10, 2015 in International Application No. PCT/US2015/014139, 10 pages.
Decision to Refuse Application dated Sep. 25, 2020, EP17180663.1, 7pgs.
Declaration in Support of Written Submissions dated Jul. 8, 2020, EP17180663.1, 3pgs.
Written Submissions Arguments and Claims Filed Apr. 23, 2020, EP17180663.1, 6pgs.
Preliminary Opinion in Response to Written Submissions, dated Jul. 6, 2020, EP17180663.1, 5pgs.
Final Office Action dated Feb. 1, 2018 in U.S. Appl. No. 15/630,460, 24 pages.
Non-Final Office Action dated Sep. 1, 2017 in U.S. Appl. No. 15/630,460, 23 pages.
Non-Final Office Action Response filed Nov. 29, 2017 in U.S. Appl. No. 15/630,460, 15 pages.
Final Office Action Response as Appeal Brief filed Jun. 19, 2018 in U.S. Appl. No. 15/630,460, 20 pages.
Examiner's Answer to Appeal Briefs dated Sep. 28, 2018 in U.S. Appl. No. 15/630,460, 16 pages.
Supplemental Appeal Brief filed Apr. 9, 2020 in U.S. Appl. No. 15/630,460, 4 pages.
Notice of Allowance dated Jul. 6, 2020 in U.S. Appl. No. 15/630,460, 8 pages.
2006 Florida Statutes Title XXXIII, Chapter 538, Sections 538.03 and 538.04, 7 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

(56) References Cited

OTHER PUBLICATIONS

Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Evgenii Masunov, Mar. 25, 2010, http://www.appleinsider.ru/news/ipone-obladaet-luchshim-tachskrinom-provereno_robotom.html, 4 pages.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, E., "Use it Up, Wear it Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion andregion linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Proceedings of the 2005 JEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
Rawson, C., "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
Steinhilper, R. "Remanufacturing: The Ultimate Form of Recycling", Fraunhofer IRBVerlag, 1998, parts 1-3, http://www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.
Tecace Softwate: "Your phone appraosal-Movaluate-Android Apps on Google Play", Android Apps on Google Play, Aug. 12, 2013 (Aug. 12, 2012), XP055230264, <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (2010).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion dated Dec. 22, 2015 in International Application No. PCT/US2015/053591, 18 pages.

* cited by examiner

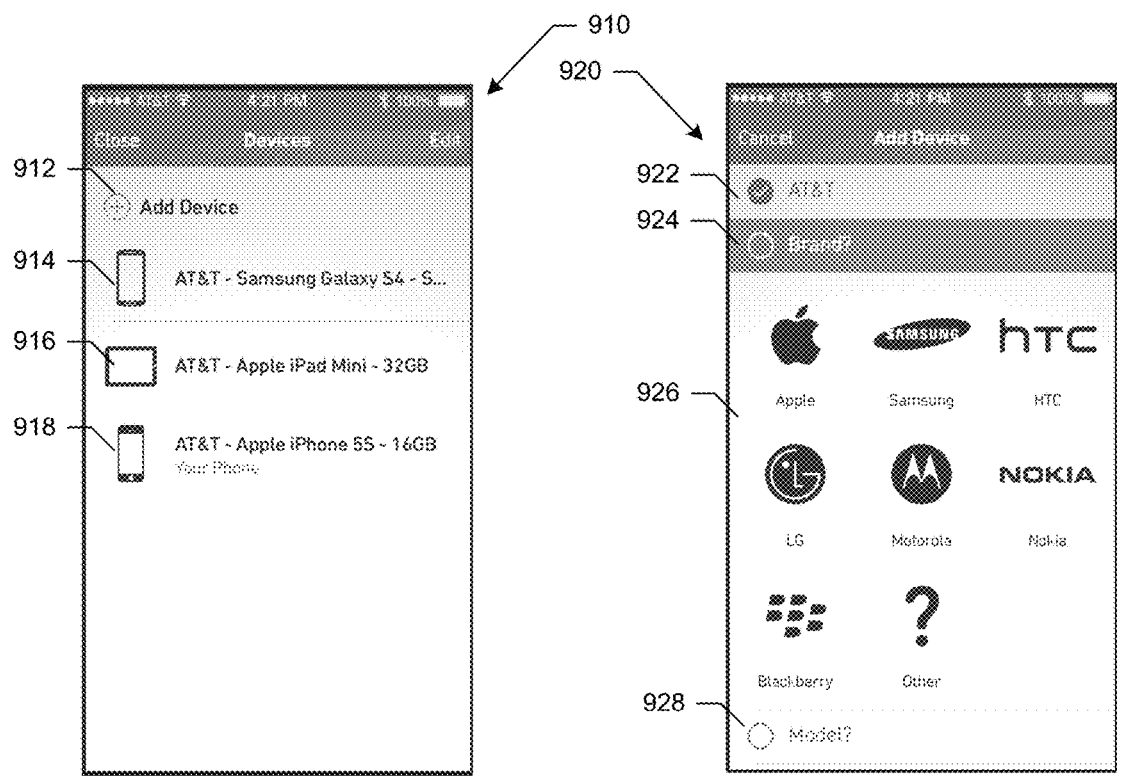
FIG. 9A
FIG. 9B
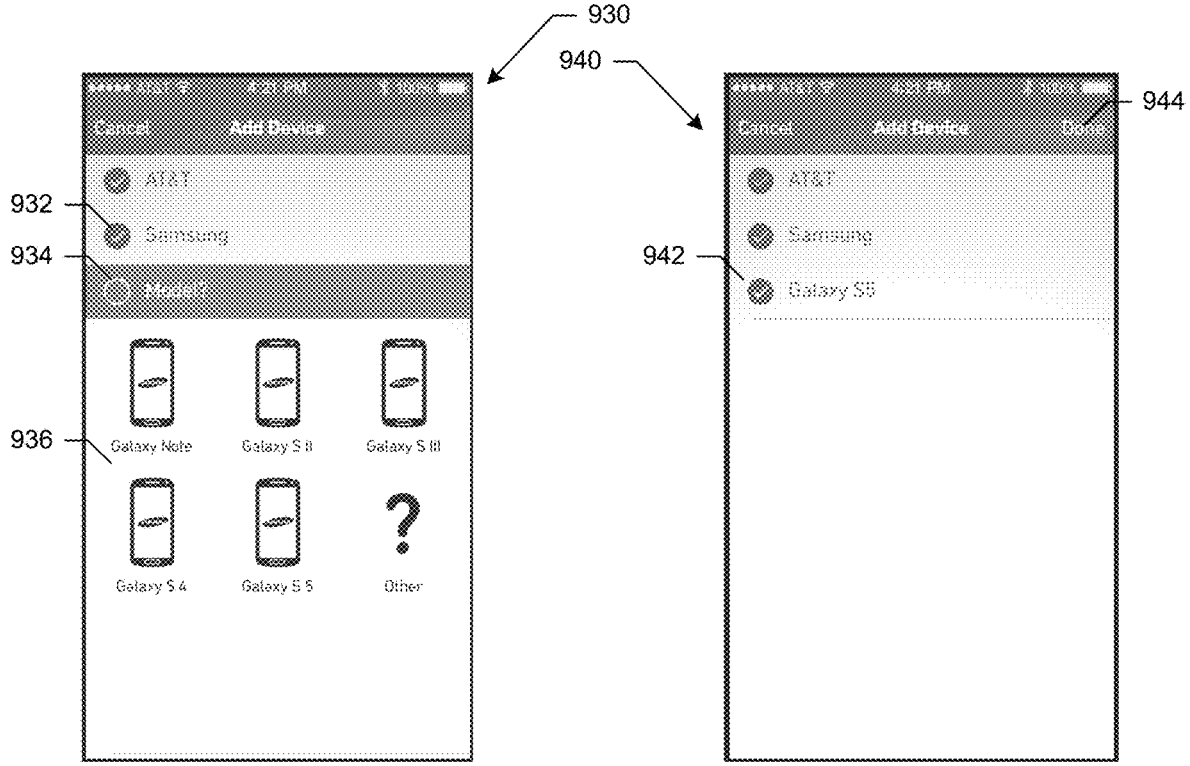
FIG. 9C
FIG. 9D

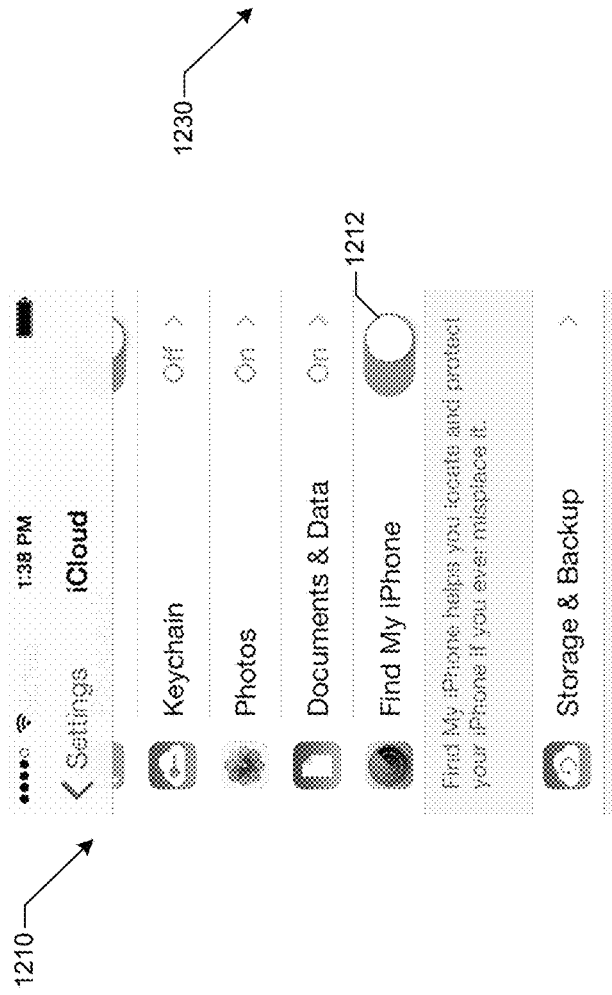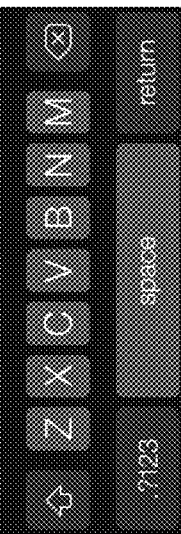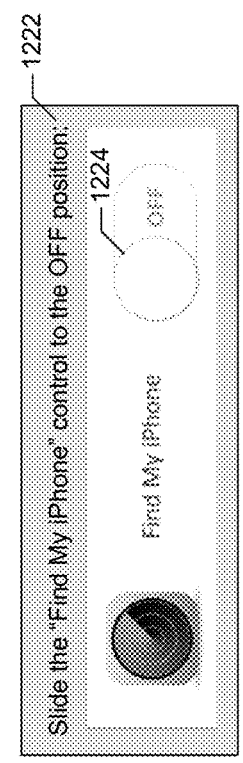
FIG. 12A
FIG. 12B
FIG. 12C

APPLICATION FOR DEVICE EVALUATION AND OTHER PROCESSES ASSOCIATED WITH DEVICE RECYCLING

CROSS-REFERENCE TO RELATED APPLICATIONS

This application is a Divisional of U.S. patent application Ser. No. 14/873,145, filed Oct. 1, 2015, now U.S. Pat. No. 10,438,174, which claims the benefit of U.S. Provisional Application No. 62/059,132, titled "APPLICATION FOR DEVICE EVALUATION AND OTHER PROCESSES ASSOCIATED WITH DEVICE RECYCLING," filed by the applicant on Oct. 2, 2014, which is incorporated herein by reference in its entirety.

TECHNICAL FIELD

The present disclosure is directed generally to methods and systems for evaluating and recycling mobile phones and other consumer devices and, more particularly, to software applications for facilitating identification, evaluation, purchase, and/or other processes associated with electronic device recycling.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.8 billion mobile phones being sold in 2013 alone. By 2017 it is expected that there will be more mobile devices in use than there are people on the planet. In addition to mobile phones, over 300 million desk-based and notebook computers shipped in 2013, and for the first time the number of tablet computers shipped exceeded laptops. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

There continues to be a need for improving the means available to consumers for recycling or reselling their mobile phones and other electronic devices. Simplifying the recycling/reselling process, enhancing the consumer experience, and discouraging fraud can incentivize consumers to dispose of their old electronic devices in an efficient and environmentally conscientious way.

BRIEF DESCRIPTION OF THE DRAWINGS

FIGS. 9A-9D are a series of display diagrams illustrating screen displays associated with identifying an electronic device in accordance with embodiments of the present technology.

FIGS. 12A-12C are a series of display diagrams illustrating screen displays associated with disabling a remote device control feature in accordance with embodiments of the present technology.

DETAILED DESCRIPTION

Figure 1:
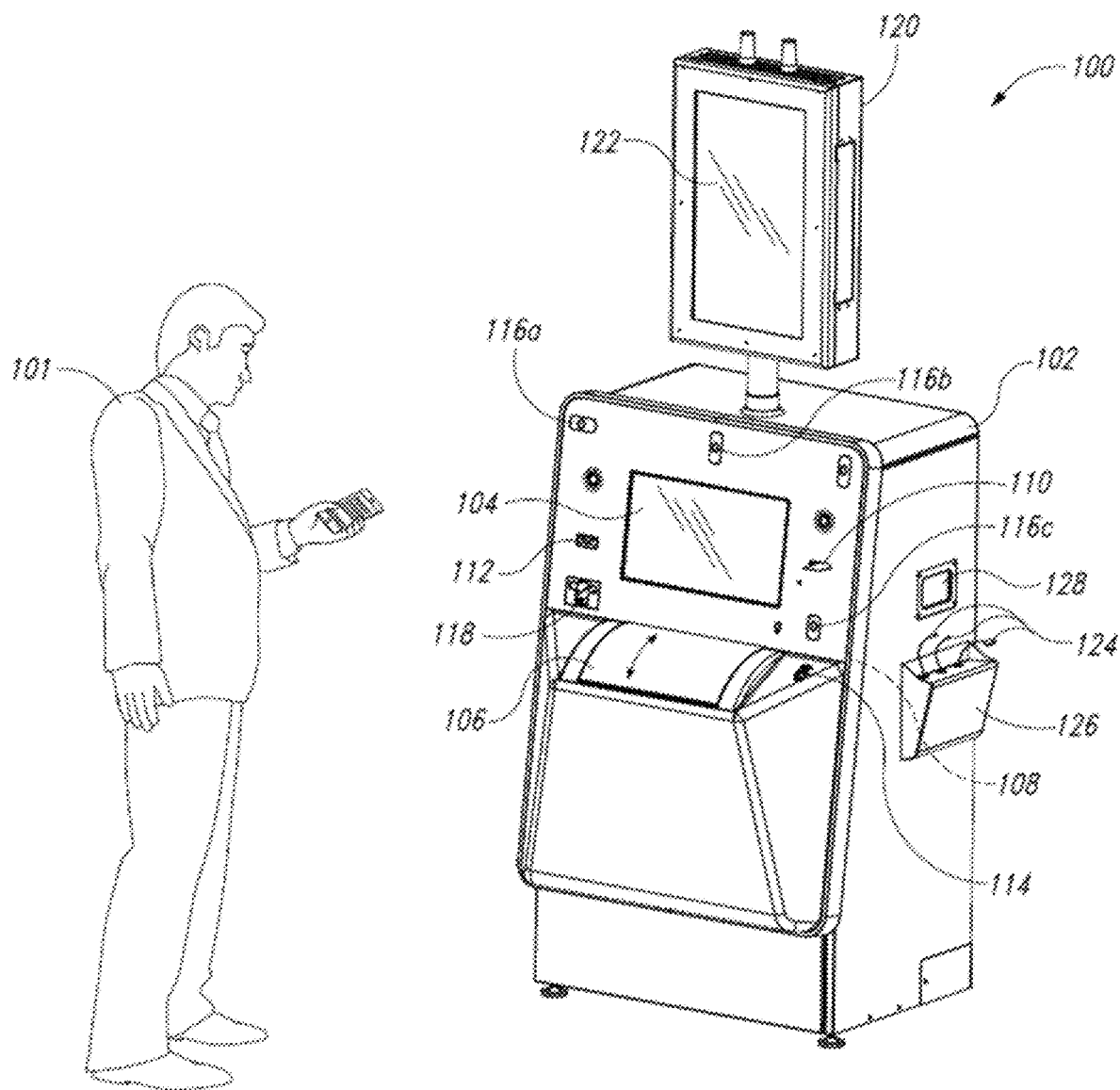
FIG. 1 is an isometric view of a machine configured in accordance with an embodiment of the present technology for recycling electronic devices.

The following disclosure describes various embodiments of software application ("app") systems and methods for mobile phones and/or other electronic devices to facilitate identification, evaluation, purchase, and/or other processes associated with recycling electronic devices. In various embodiments, for example, the app enables a device owner to accurately assess the condition and secondhand or resale market value of his or her mobile phone and/or other electronic devices. It allows the device owner to maintain awareness of the market value of his or her electronic devices with minimal user input, building certainty so that the user can have a quick and predictable experience selling his or her electronic devices at a recycling kiosk. The app can inform users of the values of their electronic devices, guide users to the locations of recycling kiosks, and offer incentives to motivate the users to recycle their electronic devices at the kiosk. In addition, the app can alert users to changes in the values of their electronic devices and can help a user prepare his or her electronic devices for selling and recycling, such as by backing up the user's data and turning off a remote device control feature. At a recycling kiosk, the app can provide an assistive interface for the user, and can use information collected prior to the user's arrival at the kiosk to facilitate kiosk recognition of the user and/or the electronic device and quickly provide the user with a price, e.g., a previously agreed price for the electronic device.

Certain details are set forth in the following description and in FIGS. 1-21 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a kiosk 100 for recycling and/or other processing of mobile phones and other consumer electronic devices in accordance with the present technology. The term "processing" is used herein for ease of reference to generally refer to all manner of services and operations that may be performed or facilitated by the kiosk 100 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc. mobile phones and other electronic devices. The term "recycling" is used herein for ease of reference to generally refer to selling and/or purchasing, reselling, exchanging, donating and/or receiving, etc. electronic devices. For example, owners may elect to sell their used electronic devices at the kiosk 100, and the electronic devices can be recycled for resale, reconditioning, repair, recovery of salvageable components, environmentally conscious disposal, etc. Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers all types of cameras GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch™, Android Wear™ devices such as the Moto 360®, or the Pebble Steel™ watch), etc. The kiosk 100 and various features thereof can be at least generally similar in structure and function to the kiosks and corresponding features described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395 and 13/913,408. The disclosed technology also includes the disclosures of U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. provisional application No. 62/059,129, titled "WIRELESS-ENABLED KIOSK FOR RECYCLING CONSUMER DEVICES," filed by the applicant on Oct. 2, 2014; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. provisional application No. 62/073,840, titled "SYSTEMS AND METHODS FOR RECYCLING CONSUMER ELECTRONIC DEVICES," filed by the applicant on Oct. 31, 2014; U.S. provisional application No. 62/073,847, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 31, 2014; U.S. provisional application No. 62/076,437, titled "METHODS AND SYSTEMS FOR EVALUATING AND RECYCLING ELECTRONIC DEVICES," filed by the applicant on Nov. 6, 2014; U.S. provisional application No. 62/090,855, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 11, 2014; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. provisional application No. 62/091,426, titled "SYSTEMS AND METHODS FOR RECYCLING CONSUMER ELECTRONIC DEVICES," filed by the applicant on Dec. 12, 2014; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; and U.S. provisional application No. 62/221,510, titled "METHODS AND SYSTEMS FOR INTERACTIONS WITH A SYSTEM FOR PURCHASING MOBILE PHONES AND OTHER ELECTRONIC DEVICES," filed by the applicant on Sep. 21, 2015. All of the patents and patent applications listed in the preceding sentences are commonly owned by the applicant of the present application, and they along with any other patents or patent applications identified herein are incorporated herein by reference in their entireties.

In the illustrated embodiment, the kiosk 100 is a floor-standing self-service kiosk configured for use by a user 101 (e.g., a consumer, customer, etc.) to recycle, sell, and/or perform other operations with a mobile phone or other consumer electronic device. In other embodiments, the kiosk 100 can be configured for use on a countertop or a similar raised surface. Although the kiosk 100 is configured for use by consumers, in various embodiments the kiosk 100 and/or various portions thereof can also be used by other operators, such as a retail clerk or kiosk assistant to facilitate the selling or other processing of mobile phones and other electronic devices.

In the illustrated embodiment, the kiosk 100 includes a housing 102 that is approximately the size of a conventional vending machine. The housing 102 can be of conventional manufacture from, for example, sheet metal, plastic panels, etc. A plurality of user interface devices are provided on a front portion of the housing 102 for providing instructions and other information to users, and/or for receiving user inputs and other information from users. For example, the kiosk 100 can include a display screen 104 (e.g., a liquid crystal display (LCD) or light emitting diode (LED) display screen, a projected display (such as a heads-up display or a head-mounted device), and so on) for providing information, prompts, etc. to users. The display screen 104 can include a touch screen for receiving user input and responses to displayed prompts. In addition or alternatively, the kiosk 100 can include a separate keyboard or keypad for this purpose. The kiosk 100 can also include an ID reader or scanner 112 (e.g., a driver's license scanner), a fingerprint reader 114, and one or more cameras 116 (e.g., digital still and/or video cameras, identified individually as cameras 116a-c). The kiosk 100 can additionally include output devices such as a label printer having an outlet 110, and a cash dispenser having an outlet 118. Although not identified in FIG. 1, the kiosk 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device such as a mouse, a joystick, pen, game pad, motion sensor, scanner, eye direction monitoring system, etc. Additionally the kiosk 100 can also include a bar code reader, QR code reader, bag/package dispenser, a digital signature pad, etc. In the illustrated embodiment, the kiosk 100 additionally includes a header 120 having a display screen 122 for displaying marketing advertisements and/or other video or graphical information to attract users to the kiosk 100. In addition to the user interface devices described above, the front portion of the housing 102 also includes an access panel or door 106 located directly beneath the display screen 104. As described in greater detail below, the access door is configured to automatically retract so that the user 101 can place an electronic device (e.g., a mobile phone) in an inspection area 108 for automatic inspection by the kiosk 100.

A sidewall portion of the housing 102 can include a number of conveniences to help users recycle or otherwise process their mobile phones. For example, in the illustrated embodiment the kiosk 100 includes an accessory bin 128 that is configured to receive mobile device accessories that the user wishes to recycle or otherwise dispose of. Additionally, the kiosk 100 can provide a free charging station 126 with a plurality of electrical connectors 124 for charging a wide variety of mobile phones and other consumer electronic devices.

Figure 2B:
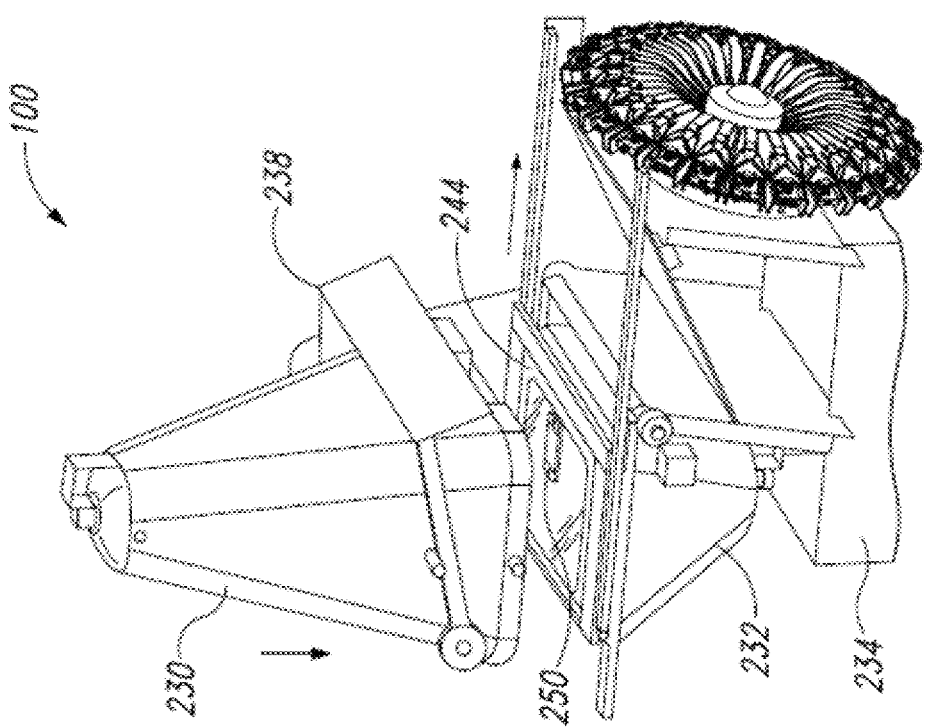
FIGS. 2A-2D are a series of isometric views of the machine of FIG. 1 with a number of exterior panels removed to illustrate operation of the machine in accordance with an embodiment of the present technology.
Figure 2A:
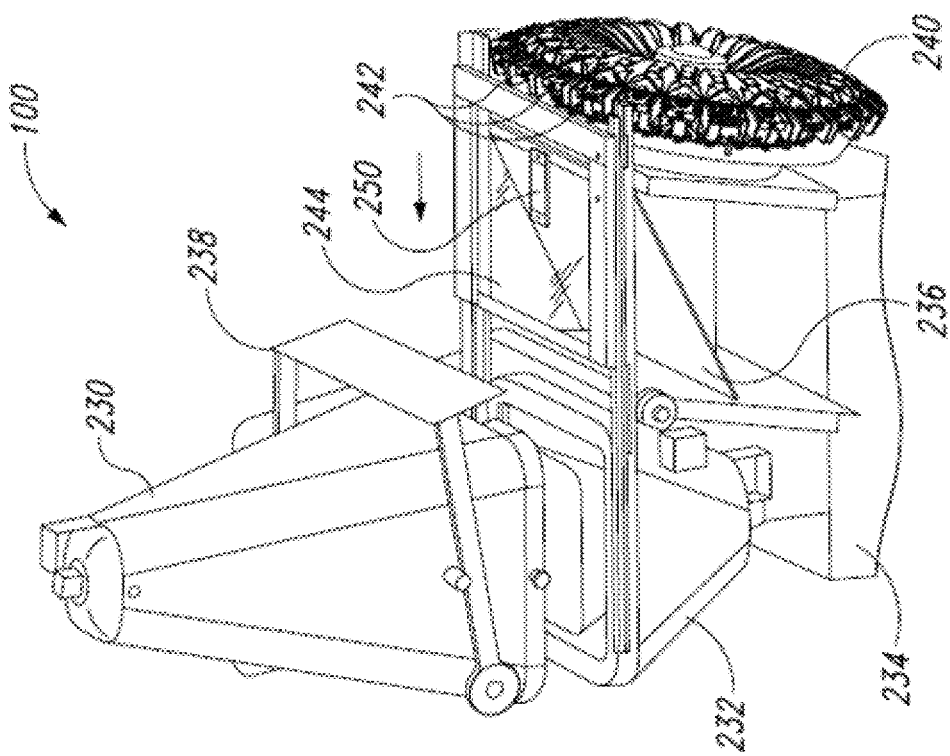

FIGS. 2A-2D are a series of isometric views of the kiosk 100 with the housing 102 removed to illustrate selected internal components configured in accordance with an embodiment of the present technology. Referring first to FIG. 2A, in the illustrated embodiment the kiosk 100 includes a connector carrier 240 and an inspection plate 244 operably disposed behind the access door 106 (FIG. 1). In the illustrated embodiment, the connector carrier 240 is a rotatable carrousel that is configured to rotate about a generally horizontal axis and carries a plurality of electrical connectors 242 (e.g., approximately 25 connectors) distributed around an outer periphery thereof. In other embodiments, other types of connector carrying devices (including both fixed and movable arrangements) can be used. In some embodiments, the connectors 242 can include a plurality of interchangeable USB connectors configured to provide power and/or exchange data with a variety of different mobile phones and/or other electronic devices. In operation, the carrousel 240 is configured to automatically rotate about its axis to position an appropriate one of the connectors 242 adjacent to an electronic device, such as a mobile phone 250, that has been placed on the inspection plate 244 for recycling. The connector 242 can then be manually and/or automatically withdrawn from the carousel 240 and connected to a port on the mobile phone 250 for electrical analysis. Such analysis can include, e.g., an evaluation of make, model, configuration, condition, etc. using one or more of the methods and/or systems described in detail in the commonly owned patents and patent applications identified herein and incorporated by reference in their entireties.

In the illustrated embodiment, the inspection plate 244 is configured to translate back and forth (on, e.g., parallel mounting tracks) to move an electronic device, such as the mobile phone 250, between a first position directly behind the access door 106 and a second position between an upper chamber 230 and an opposing lower chamber 232. Moreover, in this embodiment the inspection plate 244 is transparent, or at least partially transparent (e.g., formed of glass, Plexiglas, etc.) to enable the mobile phone 250 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 230 and 232. When the mobile phone 250 is in the second position, the upper chamber 230 can translate downwardly to generally enclose the mobile phone 250 between the upper chamber 230 and the lower chamber 232. The upper chamber 230 is operably coupled to a gate 238 that moves up and down in unison with the upper chamber 230. As noted above, in the illustrated embodiment the upper chamber 230 and/or the lower chamber 232 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 250 from multiple perspectives. In some embodiments, one or more of the cameras and/or other imaging components discussed above can be movable to facilitate device evaluation. The inspection area 108 can also include weight scales, heat detectors, UV readers/detectors, and the like for further evaluation of electronic devices placed therein. The kiosk 100 can further include an angled binning plate 236 for directing electronic devices from the transparent plate 244 into a collection bin 234 positioned in a lower portion of the kiosk 100.

Figure 2D:
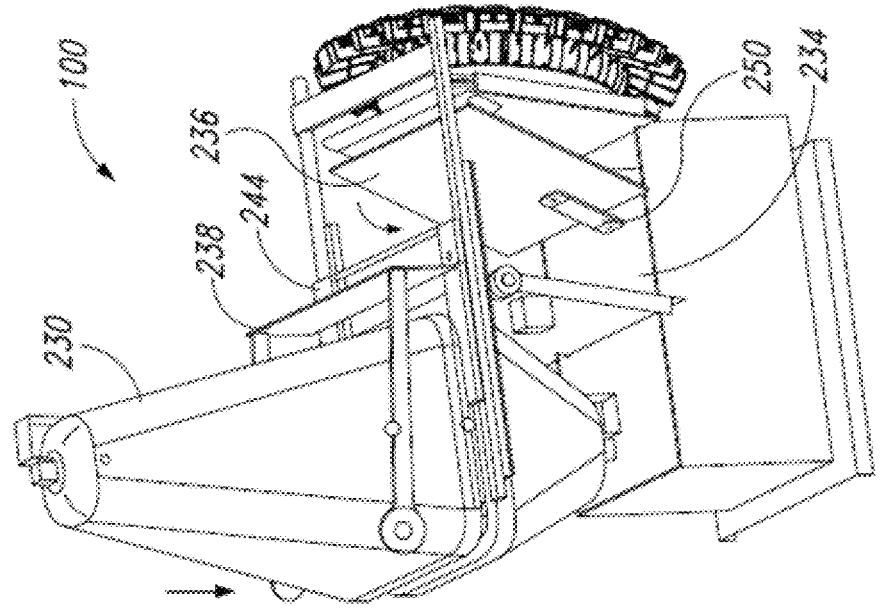

The kiosk 100 can used in a number of different ways to efficiently facilitate the recycling, selling and/or other processing of mobile phones and other consumer electronic devices. Referring to FIGS. 1-2D together, in some embodiments a user wishing to sell a used mobile phone, such as the mobile phone 250, approaches the kiosk 100 and identifies the type of device the user wishes to sell in response to prompts on the display screen 104. Next, the user may be prompted to remove any cases, stickers, or other accessories from the device so that it can be accurately evaluated. Additionally, the kiosk 100 may print and dispense a unique identification label (e.g., a small adhesive-backed sticker with a QR code, barcode, etc.) from the label outlet 110 for the user to adhere to the back of the mobile phone 250. After this is done, the door 106 retracts allowing the user to place the mobile phone 250 onto the transparent plate 244 in the inspection area 108 (FIG. 2A). The door 106 then closes and the transparent plate 244 moves the mobile phone 250 under the upper chamber 230 as shown in FIG. 2B. The upper chamber 230 then moves downwardly to generally enclose the mobile phone 250 between the upper and lower chambers 230 and 232, and the cameras and/or other imaging components in the upper and lower chambers 230 and 232 perform a visual inspection of the mobile phone 250. In some embodiments, the visual inspection can include a 3D visual analysis to confirm the identification of the mobile phone 250 (e.g. make and model) and/or to evaluate or assess the condition and/or function of the mobile phone 250 and/or its various components and systems. For example, the visual analysis can include an inspection of a display screen on the mobile phone 250 for cracks or other damage. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as a model number, serial number, etc. In some embodiments, the kiosk 100 can perform the visual analysis using one or more of the methods and/or systems described in detail in the commonly owned patents and patent applications identified herein and incorporated by reference in their entireties.

Figure 2C:
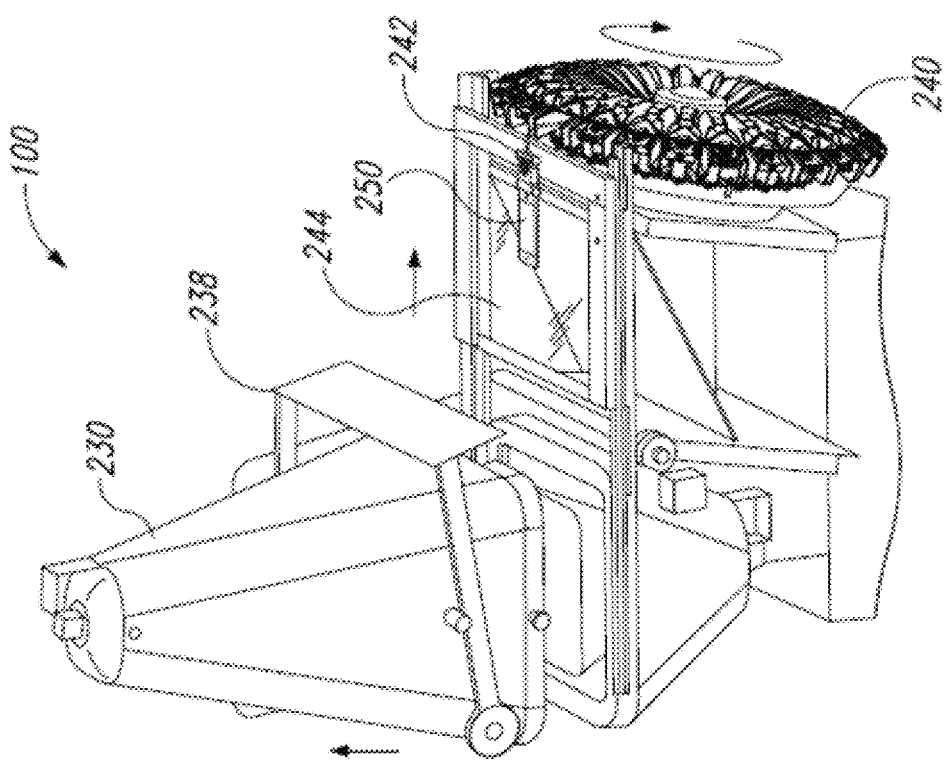

Referring next to FIG. 2C, after the visual analysis is performed and the device has been identified, the upper chamber 230 returns to its upper position and the transparent plate 244 returns the mobile phone 250 to its initial position next to the door 106. The display screen 104 can also provide an estimated price or an estimated range of prices that the kiosk 100 may offer the user for the mobile phone 250 based on the visual analysis and/or based on user input (e.g., input regarding the type, condition, etc. of the mobile phone 250). If the user indicates (via, e.g., input via the touch screen) that he or she wishes to proceed with the transaction, the carrousel 240 automatically rotates an appropriate one of the connectors 242 into position adjacent the transparent plate 244, and door 106 is again opened. The user can then be instructed (via, e.g., the display screen 104) to withdraw the connector 242 (and its associated wire) from the carrousel 240, plug the connector 242 into the corresponding port (e.g., a USB port) on the mobile phone 250, and reposition the mobile phone 250 in the inspection area on the transparent plate 244. After doing so, the door 106 once again closes and the kiosk 100 performs an electrical inspection of the device to further evaluate the condition of the phone as well as specific component and operating parameters such as memory, carrier, etc. In some embodiments, the kiosk 100 can perform the electrical analysis using one or more of the methods and/or systems described in detail in the commonly owned patents and patent applications identified herein and incorporated by reference in their entireties.

In some embodiments, the user can attach the electrical connector to the mobile phone 250 and/or perform an electrical analysis of the device before the kiosk 100 performs a visual analysis of the phone. For example, in such an embodiment the user can approach the kiosk 100 and identify the type of device (e.g., the make and model) he or she wishes to recycle, and/or the appropriate electrical connector for connecting to the device. The kiosk 100 can then use this information to stage the appropriate electrical connector at the inspection area. Alternatively, the kiosk 100 can present the user with a selection of standard electrical connectors from which the user can determine an appropriate electrical connector for connecting to the device. Either way, the door 106 retracts and the user is instructed to withdraw the selected connector 242 from the carrier 240, plug it into the corresponding port (e.g., a USB port) on the mobile phone 250, and position the mobile phone 250 on the transparent plate 244 in the inspection area. The user may also be prompted to remove any cases, stickers, or other accessories from the mobile phone 250, and adhere a unique identification label to the back of the mobile phone 250 as described above. The door 106 then closes and the kiosk 100 can perform an electrical inspection of the mobile phone 250 as described above, and after the electrical inspection, a visual inspection as described above. The electrical inspection can include gathering device identification information and/or other information, which the kiosk 100 can then use to customize further interaction with the user, such as to add or omit user inquiries depending on the type of device the user connects. Thus, in some embodiments, electrical inspection of the mobile phone 250 can occur before the user provides information about the mobile phone 250 to the kiosk 100.

After the visual and electronic analysis of the mobile phone 250, the user may be presented with a phone purchase price via the display screen 104. If the user declines the price (via, e.g., the touch screen), a retraction mechanism (not shown) automatically disconnects the connector 242 from the mobile phone 250, the door 106 opens, and the user can reach in and retrieve the mobile phone 250. If the user accepts the price, the door 106 remains closed and the purchase transaction proceeds. For example, the user may be prompted to place his or her identification (e.g., a driver's license) in the ID scanner 112 and provide a thumbprint via the fingerprint reader 114. As a fraud prevention measure, the kiosk 100 can be configured to transmit an image of the driver's license to a remote computer screen, and an operator at the remote computer can visually compare the picture (and/or other information) on the driver's license to the person standing in front of the kiosk 100 as viewed by one or more of the cameras 116a-c (FIG. 1) to confirm that the person attempting to sell the mobile phone 250 is in fact the person identified by the driver's license. In some embodiments, one or more of the cameras 116a-c can be movable to facilitate viewing of kiosk users, as well as other individuals in the proximity of the kiosk 100. Additionally, the person's fingerprint can be checked against records of known fraud perpetrators. If either of these checks indicate that the person selling the phone presents a fraud risk, the transaction can be declined and the mobile phone 250 returned. After the user's identity has been verified, the transparent plate 244 moves back toward the upper and lower chambers 230 and 232. As shown in FIG. 2D, however, when the upper chamber 230 is in the lower position the gate 238 permits the transparent plate 244 to slide underneath but not electronic devices carried thereon. As a result, the gate 238 knocks the phone 150 off of the transparent plate 244, onto the binning plate 236 and into the bin 234. The kiosk 100 can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet, etc.), Bitcoin, etc.

As those of ordinary skill in the art will appreciate, the foregoing routines are but some examples of ways in which the kiosk 100 can be used to recycle or otherwise process consumer electronic devices such as mobile phones. Although the foregoing examples are described in the context of mobile phones, it should be understood that kiosk 100 and various embodiments thereof can also be used in a similar manner for recycling virtually any consumer electronic device, such as MP3 players, tablet computers, laptop computers, e-readers, PDAs, Google® Glass™, smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the kiosk 100 in various embodiments thereof can similarly be used by others, such as store clerk, to assist consumers in recycling, selling, exchanging, etc. their electronic devices.

Figure 3:
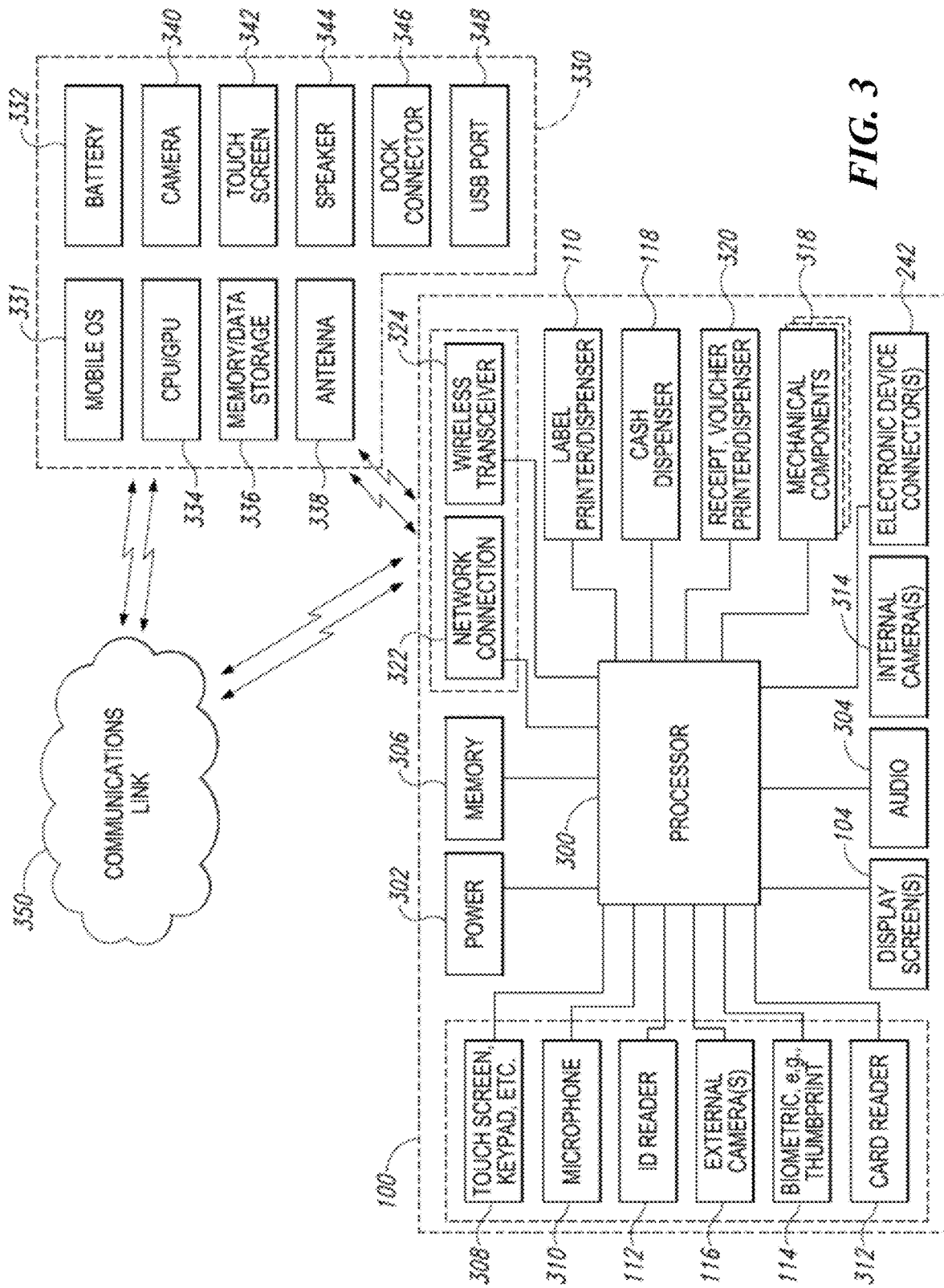
FIG. 3 is a schematic diagram illustrating various components associated with the machine of FIG. 1.

FIG. 3 provides a schematic representation of an architecture of the kiosk 100 in accordance with an embodiment of the present technology. In the illustrated embodiment, the kiosk 100 includes a suitable processor or central processing unit (CPU) 300 that controls operation of the kiosk 100 in accordance with computer-readable instructions stored on system memory 306. The CPU 300 may be any logic processing unit, such as one or more CPUs, digital signal processors (DSPs), application-specific integrated circuits (ASICs), etc. The CPU 300 may be a single processing unit or multiple processing units in an electronic device or distributed across multiple devices. The CPU 300 is connected to the memory 306 and may be coupled to other hardware devices, for example, with the use of a bus (e.g., a PCI Express or Serial ATA bus). The CPU 300 can include, by way of example, a standard personal computer (PC) (e.g., a DELL® OptiPlex® 7010 PC) or other type of embedded computer running any suitable operating system, such as Windows®, Linux®, Android™, iOS®, or an embedded real-time operating system. In some embodiments, the CPU 300 can be a small form factor PC with integrated hard disk drive (HDD) or solid-state drive (SSD) and universal serial bus (USB) or other ports to communicate with the other components of the kiosk 100. In other embodiments, the CPU 300 can include a microprocessor with a standalone motherboard that interfaces with a separate HDD. The memory 306 can include read-only memory (ROM) and random access memory (RAM) or other storage devices, such as disk drives or SSDs, that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 300 can provide information and instructions to kiosk users via the display screen 104 and/or an audio system (e.g., a speaker) 304. The CPU 300 can also receive user inputs via, e.g., a touch screen 308 associated with the display screen 104, a keypad with physical keys, and/or a microphone 310. Additionally, the CPU 300 can receive personal identification and/or biometric information associated with users via the ID reader 112, one or more of the external cameras 116, and/or the fingerprint reader 114. In some embodiments, the CPU 300 can also receive information (such as user identification and/or account information) via a card reader 312 (e.g., a debit, credit, or loyalty card reader having, e.g., a suitable magnetic stripe reader, optical reader, etc.). The CPU 300 can also control operation of the label dispenser 110 and systems for providing remuneration to users, such as the cash dispenser 118 and/or a receipt or voucher printer and an associated dispenser 320.

As noted above, the kiosk 100 additionally includes a number of electronic, optical and electromechanical devices for electrically, visually and/or physically analyzing electronic devices placed therein for recycling. Such systems can include one more internal cameras 314 for visually inspecting electronic devices for, e.g., determining external dimensions and condition, and one or more of the electrical connectors 242 (e.g., USB connectors) for, e.g., powering up electronic devices and performing electronic analyses. As noted above, the cameras 314 can be operably coupled to the upper and lower chambers 230 and 232, and the connectors 242 can be movably and interchangeably carried by the carrousel 240 (FIGS. 2A-2D). The kiosk 100 further includes a plurality of mechanical components that are electronically actuated for carrying out the various functions of the kiosk 100 during operation. The mechanical components 318 can include, for example, the inspection area access door 106 and one or more of the movable components (e.g. the inspection plate 244, the upper and lower chambers 230 and 232, etc.) operably disposed within the inspection area 108 (FIG. 1). The kiosk 100 further includes power 302, which can include battery power and/or facility power for operation of the various electrical components associated with kiosk operation.

In the illustrated embodiment, the kiosk 100 further includes a network connection 322 (e.g., a wired connection, such as an Ethernet port, cable modem, FireWire cable, Lightning connector, USB port, etc.) suitable for communication with, e.g., all manner of processing devices (including remote processing devices) via a communication link 350, and a wireless transceiver 324 (e.g., including a Wi-Fi access point; Bluetooth transceiver; near-field communication (NFC) device; wireless modem or cellular radio utilizing GSM, CDMA, 3G and/or 4G technologies; etc.) suitable for communication with, e.g., all manner of processing devices (including remote processing devices) via the communication link 350 and/or directly via, e.g., a wireless peer-to-peer connection. For example, the wireless transceiver 324 can facilitate wireless communication with electronic devices, such as an electronic device 330 either in the proximity of the kiosk 100 or remote therefrom. In the illustrated embodiment, the electronic device 330 is depicted as a handheld device, e.g., a mobile phone. In other embodiments, however, the electronic device 330 can be other types of electronic devices including, for example, other handheld devices; PDAs; MP3 players; tablet, notebook and laptop computers; e-readers; cameras; desktop computers; TVs; DVRs; game consoles; Google® Glass™; smartwatches; etc. By way of example only, in the illustrated embodiment the electronic device 330 can include one or more features, applications and/or other elements commonly found in smartphones and other known mobile devices. For example, the electronic device 330 can include a CPU and/or a graphics processing unit (GPU) 334 for executing computer readable instructions stored on memory 336. In addition, the electronic device 330 can include an internal power source or battery 332, a dock connector 346, a USB port 348, a camera 340, and/or well-known input devices, including, for example, a touch screen 342, a keypad, etc. In many embodiments, the electronic device 330 can also include a speaker 344 for two-way communication and audio playback. In addition to the foregoing features, the electronic device 330 can include an operating system (OS) 331 and/or a device wireless transceiver that may include one or more antennas 338 for wirelessly communicating with, for example, other electronic devices, websites, and the kiosk 100. Such communication can be performed via, e.g., the communication link 350 (which can include the Internet, a public or private intranet, a local or extended Wi-Fi network, cell towers, the plain old telephone system (POTS), etc.), direct wireless communication, etc.

Unless described otherwise, the construction and operation of the various components shown in FIG. 3 are of conventional design. As a result, such components need not be described in further detail herein, as they will be readily understood by those skilled in the relevant art. In other embodiments, the kiosk 100 and/or the electronic device 330 can include other features that may be different from those described above. In still further embodiments, the kiosk 100 and/or the electronic device 330 can include more or fewer features similar to those described above.

Figure 4:
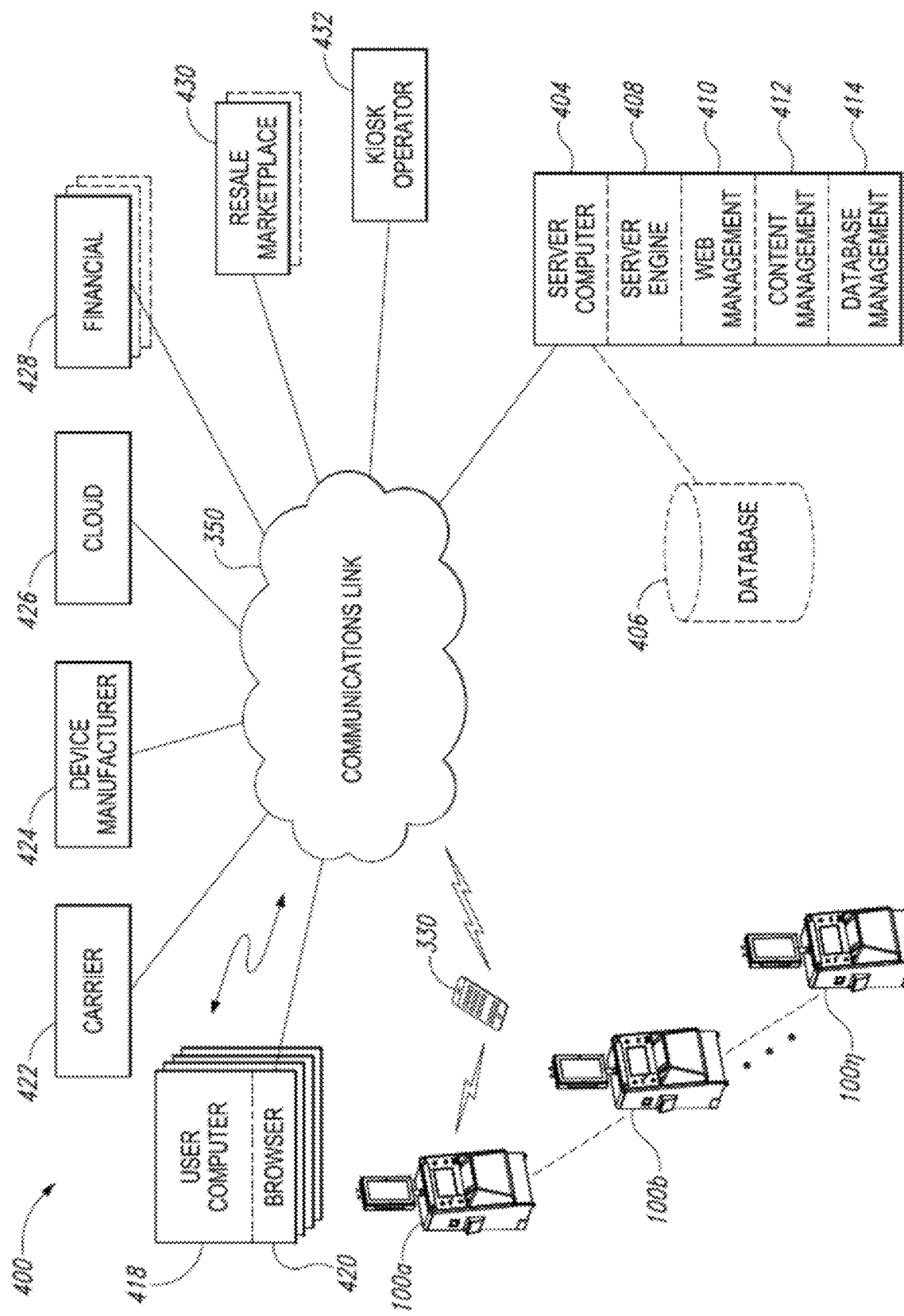
FIG. 4 is a schematic diagram of a suitable distributed computing environment for implementing various aspects of the present technology.

FIG. 4 is a schematic diagram of a suitable network environment for implementing various aspects of an electronic device recycling system 400 configured in accordance with embodiments of the present technology. In the illustrated embodiment, a plurality of the kiosks 100 (identified individually as kiosks 100a-100n) can exchange information with one or more remote computers (e.g., one or more server computers 404) via the communication link 350. Although the communication link 350 can include a publically available network (e.g., the Internet with a web interface), a private communication link, such as an intranet or other network can also be used. Moreover, in various embodiments the individual kiosk 100 can be connected to a host computer (not shown) that facilitates the exchange of information between the kiosks 100 and remote computers, other kiosks, mobile devices, etc.

The server computer 404 can perform many or all of the functions for receiving, routing and storing of electronic messages, such as webpages, audio signals and electronic images necessary to implement the various electronic transactions described herein. For example, the server computer 404 can retrieve and exchange web pages and other content with an associated database or databases 406. In some embodiments, the database 406 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 404 can also include a server engine 408, a web page management component 410, a content management component 412, and a database management component 414. The server engine 408 can perform the basic processing and operating system level tasks associated with the various technologies described herein. The webpage management component 410 can handle creation and/or display and/or routing of web or other display pages. The content management component 412 can handle many of the functions associated with the routines described herein. The database management component 414 can perform various storage, retrieval and query tasks associated with the database 406, and can store various information and data such as animation, graphics, visual and audio signals, etc.

In the illustrated embodiment, the kiosks 100 can also be operably connected to a plurality of other remote devices and systems via the communication link 350. For example, the kiosks 100 can be operably connected to a plurality of user devices 418 (e.g., personal computers, laptops, handheld devices, etc.) having associated browsers 420. Similarly, as described above the kiosks 100 can each include wireless communication facilities for exchanging digital information with wireless-enabled electronic devices, such as the electronic device 330. The kiosks 100 and/or the server computer 404 are also operably connectable to a series of remote computers for obtaining data and/or exchanging information with necessary service providers, financial institutions, device manufactures, authorities, government agencies, etc. For example, the kiosks 100 and the server computer 404 can be operably connected to one or more cell carriers 422, one or more device manufacturers 424 (e.g., mobile phone manufacturers), one or more electronic payment or financial institutions 428, one or more databases (e.g., the GSMA IMEI Database, etc.), and one or more computers and/or other remotely located or shared resources associated with cloud computing 426. The financial institutions 428 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 404 can also be operably connected to a resale marketplace 430 and a kiosk operator 432. The resale marketplace 430 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 432 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 432 can further include one or more display screens operably connected to cameras located at each of the kiosks 100 (e.g., one or more of the cameras 116 described above with reference to FIG. 1). This remote viewing capability enables operator personnel to verify user identification and/or make other visual observations at the kiosks 100 in real-time during transactions, as described above with reference to FIG. 1.

The foregoing description of the electronic device recycling system 400 illustrates but one possible network system suitable for implementing the various technologies described herein. Accordingly, those of ordinary skill in the art with appreciate that other systems consistent with the present technology can omit one or more of the facilities described in reference to FIG. 4, or can include one or more additional facilities not described in detail in FIG. 4.

The kiosks 100, mobile devices 330, server computers 404, user computers or devices 418, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a transitory propagating signal per se.

Figure 5:
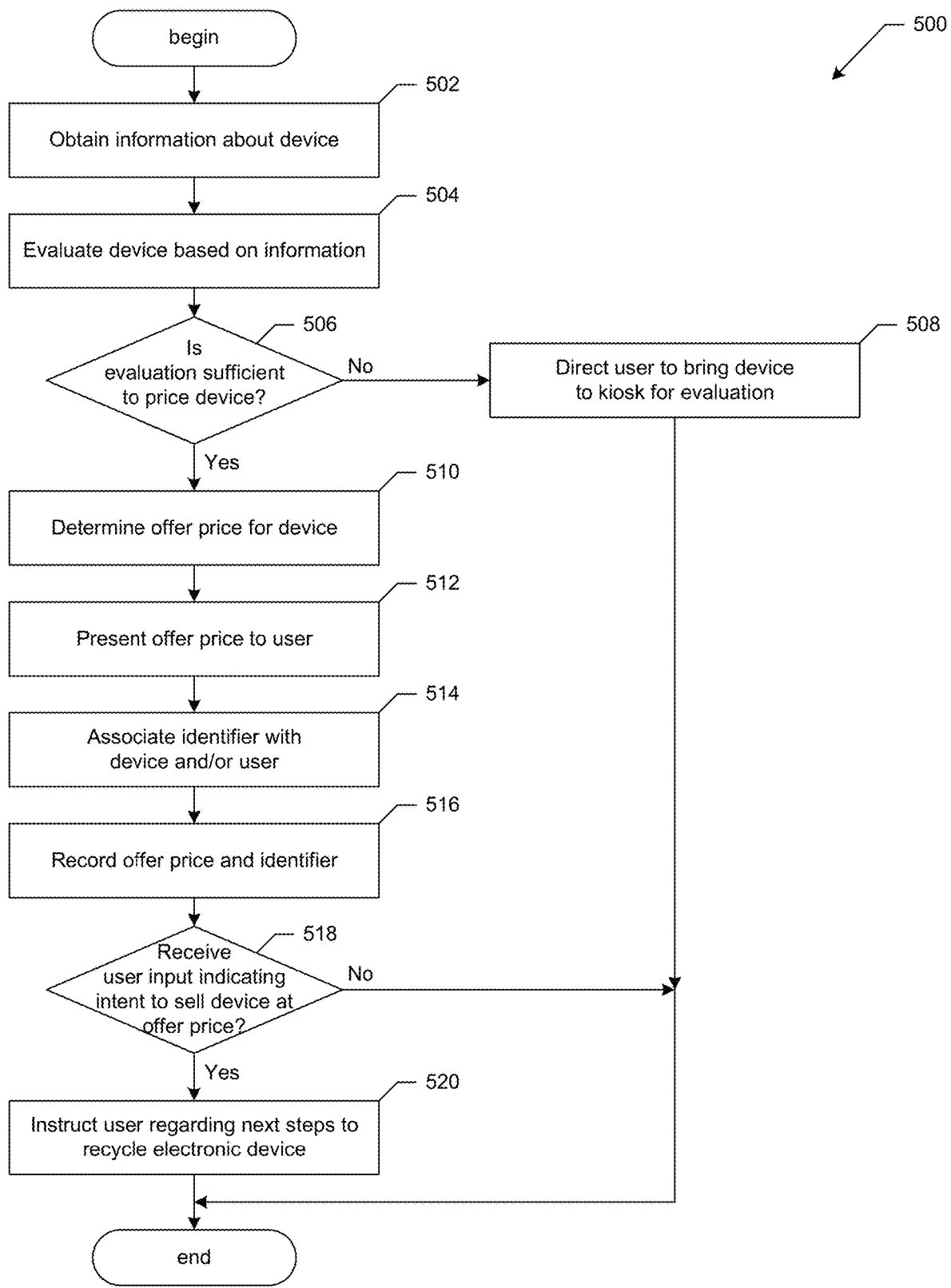
FIG. 5 is a flow diagram of a routine for pricing an electronic device for recycling in accordance with embodiments of the present technology.

FIG. 5 is a flow diagram of a routine 500 for pricing an electronic device (e.g., a mobile phone) for recycling in accordance with embodiments of the present technology. The routine 500 and/or portions thereof can be implemented by an app running on the mobile phone and/or other electronic device. In some instances, for example, a user who owns a mobile phone may want to know how much the mobile phone is worth so that he or she can consider selling the mobile phone. The routine 500 of FIG. 5 enables the user to quickly obtain a current price for the electronic device, without requiring the user to bring the electronic device to the recycling kiosk 100, and without requiring the user to provide all the details of the electronic device and its configuration. After the user knows how much the electronic device is worth, he or she can take the electronic device to the recycling kiosk 100 and efficiently complete a transaction to recycle the electronic device, and/or take other steps to sell the device, such as by mailing the device in to be recycled.

The routine 500 utilizes an app that can obtain information about a user's electronic device. The electronic device may be, for example, one of various consumer electronic devices, such as a used mobile telecommunication device, which includes all manner of handheld devices having wireless communication capabilities (e.g., a smartphone). In some embodiments, the user downloads the app to the electronic device from an app store or other software repository associated with the device manufacturer 424 or a third party (e.g., the Apple® App Stores℠, Google Play™ store, Amazon® Appstore™, and so on), from a website (e.g., a website associated with the kiosk operator 432), from the kiosk 100 (e.g., sideloading an app over a wired or wireless data connection), from a removable memory device such as an SD flash card or USB drive, etc. In other embodiments, the app is loaded on the electronic device before it is first acquired by the user (e.g., preinstalled by the device manufacturer 424, a wireless service carrier 422, or a device vendor). In various embodiments, the app and/or a remote server operatively connectable to the app can perform some or all of the routine 500. For example, when the user wants to find out how much the electronic device is worth, the user can activate the app (e.g., by selecting an icon representing the app on the touch screen of the electronic device) and, for example, choose a "What's my device worth?" function to begin a process to price the electronic device. The user can use the app to price the electronic device even when the electronic device is remote from the kiosk 100.

In block 502, the routine 500 receives or otherwise obtains information about the electronic device via the app. In some embodiments, the routine 500 obtains the information automatically, i.e., without receiving user input of the information. For example, under the iOS® operating system, the app can access mobile device information via the Settings/General/About screen, or by using Application Programming Interfaces (APIs) available via iOS®; other operating systems provide similar access to device information. The app can obtain information necessary to identify and/or evaluate the electronic device, such as a unique identifier (e.g., an IMEI number or an MEID or equivalent number of a mobile phone, a hardware media access control address (MAC address) of a networkable device, or a model number and serial number of the electronic device); information describing the device's manufacturer (e.g., a manufacturer name or ID code), model, characteristics (e.g., storage capacity, color, carrier, and/or radio bands), capabilities, and/or condition; and so on. Characteristic information about an electronic device includes the device's make, model, and configuration. Additional details about obtaining information about the electronic device are described below with reference to FIG. 8. The routine 500 can store the information about the electronic device in a data structure on the electronic device (e.g., in a table maintained by the app) and/or remotely from the electronic device (e.g., in a data structure maintained at one or more of the kiosk 100, the server computer 404, the cloud storage facility 426, etc.).

In block 504, the routine 500 evaluates the electronic device based on the information. In some embodiments, the routine 500 performs the evaluation automatically, i.e., without receiving user input in the evaluation. Evaluating the electronic device can include identifying the electronic device and/or assessing its condition. For example, the evaluation can include identifying the electronic device by determining one or more of the electronic device's platform, make, model, carrier (for a mobile phone, for example), features, configuration (e.g., memory and/or other storage capacity), upgrades, peripherals, etc. In various embodiments, the app or a remote server can query a local or remote database (e.g., the database 406) using the information. For example, the app or the remote server can obtain a mobile phone's IMEI number and can then communicate remotely (via, e.g., a wireless or wired link) with a backend database such as the GSMA IMEI Database, parsing the IMEI to determine or verify the phone's make and/or model. The routine 500 can use such queries to obtain meta-information, e.g., to confirm whether various sources of information about the electronic device are consistent with each other. Evaluating the electronic device can also include determining what kind of information is and is not available about the electronic device. For example, depending on the type of device, it may or may not be possible to perform tests to gauge the condition of the electronic device (e.g., to assess the processor, the battery, and/or the screen, and so on).

Evaluating the electronic device can also include, for example, assessing the physical and/or electrical condition of the electronic device based on the information. In some embodiments, the app can perform tests to reveal the condition of the electronic device, such as tests of processor performance, battery charging and/or capacity, memory tests for quality of the memory, test calls to confirm sufficient operation of device's radios, and so forth). The app can perform interactive tests that incorporate user feedback, such as screen tests (e.g., asking the user whether there are any cracks in the glass and/or displaying a solid color or pattern on an LCD or LED display and prompting the user to identify dead or stuck pixels in the display), and/or interactive tests that include user action such as directing the user to activate a function on the electronic device (e.g., turning on a Bluetooth radio so that the app can test the radio's function).

In some embodiments, evaluating the electronic device includes determining whether the electronic device is associated with a remote user account that enables remote user control of the electronic device (such as tracking the electronic device and/or erasing data from the electronic device), and/or identifying other potential issues that could affect the electronic device's operation, value, or ability to be resold. For example, additional details about identifying and deactivating a remote device control feature (e.g., a "kill switch") are described below with reference to FIG. 10.

In some embodiments, evaluating the electronic device includes transmitting information about the electronic device to one or more remote server computers (e.g., to a remote server computer 404, to a cloud computing service 426, to the kiosk operator 432, and/or to the user's computer 418) before the user brings the electronic device to the kiosk 100. In some embodiments, the routine 500 can send raw information about the electronic device to be remotely stored (e.g. to a cloud storage site) for later access and evaluation by the kiosk 100, or can send identifiers of the electronic device and the results of evaluation processes performed by the app to be retrieved by the kiosk 100.

In decision block 506, the routine 500 determines whether the evaluation is sufficient for pricing the electronic device. The determination can include, for example, whether the evaluation of the electronic device's type and condition is sufficient to determine a price to offer for the electronic device or whether the electronic device could be in a range of possible prices. For example, to determine a price for the electronic device, the routine 500 may require information about the make and model of the electronic device or one or more unique identifiers of the electronic device to look up a current price for the device in a database or pricing model. The database or pricing model can be, for example, a local lookup table of common devices and/or a remotely hosted database or web service to which the app can transmit information about the electronic device and receive a current market value or offer price for the electronic device. Accordingly, the evaluation of the electronic device's type and condition may be insufficient to determine a price or a price range for the electronic device if the evaluation is based on insufficient information about the electronic device (e.g., if the app does not have access to a model number or a unique identifier of the electronic device), and/or if the evaluation is unable to positively identify the electronic device. In some instances, for example, the evaluation can identify the electronic device as one of a group of devices (e.g., a Samsung® Galaxy® device, a family that includes a large number of devices such as tablet computers and smartphones), but cannot specifically identify the electronic device. In such instances, the routine 500 can determine, for example, that the electronic device is in a range of possible prices. The range of prices can be based on, e.g., the values of some or each of the devices in the group of devices. The routine 500 can also determine in such instances that the range of prices is larger than a threshold price range, and accordingly determine that the information about the electronic device is not sufficient to determine a price or a sufficiently narrow range of prices for the electronic device. In some embodiments, the determination can also include whether the evaluation is sufficient to identify the presence or confirm the absence of various issues, as described below with reference to FIGS. 10 and 11. For example, if the routine 500 cannot determine from the evaluation whether the electronic device is in a fully functional state (such as whether the electronic device is subject to remote user control), the routine 500 can decide that the evaluation is insufficient to price the electronic device.

If the routine 500 determines that the evaluation is not sufficient for pricing the electronic device, then in block 508 the routine 500 directs the user to bring the electronic device to the kiosk 100 for a physical and/or electrical inspection such as described above with reference to FIGS. 2A-2D. After block 508, the routine 500 ends. Conversely, if the routine 500 determines that the information is sufficient to price the electronic device, then in block 510 the routine 500 determines an offer price for the electronic device. For example, the routine 500 can consult a local or remote database (for example, the database 406) to set an offer price based on the information and the evaluation of the electronic device. In some instances, the offer price includes a range of prices or a price that is contingent on a particular identification and/or evaluation of the electronic device at the kiosk 100. In some embodiments, the app downloads pricing data from a remote server (e.g., the server computer 404 of FIG. 4), and the app determines an offer price for the electronic device based on the pricing data downloaded by the app. For example, in some embodiments, the app can download a database of prices, such as a lookup table, pricing model, or other data structure containing prices for popular electronic devices. The app can use the information about the make and model of the electronic device to look up the current value of the electronic device in the table. The app can also look up information in a remote database (e.g., the database 406). In other embodiments, the app can transmit some or all of the information to a remote server. The remote server can then use the transmitted information to determine the current market value of the electronic device (such as by looking up the value of the electronic device in a database) and return a price that the app can offer the user for the electronic device. In various embodiments, the pricing data is updated periodically, such as daily. The routine 500 can ensure that such pricing data is valid only for a certain time, or only while the app is connected to the remote server, so that the app offers only current, accurate prices.

In some embodiments, the routine 500 determines a fixed price for the electronic device that is valid for a set amount of time, so that the user can bring his or her electronic device to the kiosk 100 within the set time already knowing its value, increasing the user's certainty and confidence. In some embodiments, the routine 500 determines a price range for the electronic device, enabling the user to bring the electronic device to the kiosk 100, so that the kiosk 100 can complete evaluation of the electronic device (e.g., a visual inspection) and offer a price consistent with the determined range. In some embodiments, determining an offer price includes projecting a future value of the electronic device, or future values projected over time. Such projections can be based on past depreciation, and/or anticipated release schedules for future devices (such as new Apple® iPhone® mobile phones).

In block 512, the routine 500 presents the determined offer price or estimated price for the electronic device. For example, the app can display the price on the electronic device's screen, and/or a remote server can send the user a text message or email containing the price that the user can obtain by selling the electronic device at the kiosk 100 within a certain time. For example, the routine 500 can indicate that the kiosk 100 will hold the offer valid for a period of time. In some embodiments, the app enables the user to commit to bringing the electronic device to the kiosk 100, for example, at a set time or within a set period of time. In some embodiments, the app can reward the user with incentives for bringing the electronic device to the kiosk 100. Such incentives can include, for example, a time-expiring offer, a coupon valid at a store nearby the kiosk 100, a bonus for recycling additional devices, a referral bonus, etc.

In block 514, the routine 500 can associate a unique identifier with the electronic device or the user. The routine 500 can use an identifier that is already associated with the electronic device (for example, the device's IMEI number, for a mobile phone) or can generate a new identifier. The identifier can be a globally unique identifier (GUID) and/or a visual identifier, such as a QR code, a bar code, etc. For example, the routine 500 can associate the price with a unique identifier such as a hash value generated based on the user, the device identification, the app, and/or the time and amount of the price itself, etc. For example, the routine 500 can associate a numeric or alphanumeric identifier code with the offer price for the electronic device and give that code to the user, informing the user that the user can enter the code at the kiosk 100 by a certain time to receive the offer price for the device. For example, the routine 500 can display the code on the screen of the electronic device, and/or send the user an email or text message containing the code. The routine 500 can store the price and the identifier in a data structure on the electronic device (e.g., in a table maintained by the app) and/or remotely from the electronic device (e.g., in a data structure maintained at one or more of the kiosk 100, the server computer 404, the cloud storage facility 426, etc.), and can transmit them between or among various computing and/or storage facilities. In some embodiments, the routine 500 transmits the identifier to the server computer 404 so that when the kiosk 100 receives the identifier, the kiosk 100 can look up the identifier and retrieve the associated price (for example, together with information used to automatically recognize the electronic device and/or the user, such as described below with reference to FIG. 6). In other embodiments, the routine 500 prompts the user to create an account or provide account credentials, such as by entering a username and password. For example, the routine 500 can prompt the user to set up an account associated with the kiosk operator 432, or can ask the user to login to a third-party account, such as a Facebook® account.

In block 516, the routine 500 records the offer price for the electronic device and the identifier. For example, the routine 500 can store the offer price in a lookup table indexed against the unique identifier of the electronic device. The routine 500 can record the offer price for the electronic device locally on the electronic device and/or remotely (e.g., together with the information about the electronic device). For example, the app can store a record of the offer price for the electronic device and timestamp of the offer price, and/or can transmit the offer price data to the kiosk operator 432, to the remote server 404, to the cloud storage facility 426, and/or to one or more kiosks 100 (e.g., kiosks 100a-100n that are in the same geographic area as the user or the app), so that any kiosk 100 can retrieve the offered price from a server and efficiently complete the contemplated purchase transaction based on the offer price. In addition, the routine 500 can track and aggregate information about prices offered for the electronic device (and for all priced electronic devices) over time, together with, for example, information about when electronic devices are actually recycled after an offer is presented via the app.

In decision block 518, the routine 500 can receive user input indicating that the user intends to sell the electronic device at the kiosk 100 for the offer price. For example, the app can present options that the user can select to indicate the user's interest, such as a button on the device display enabling the user to obtain a coupon by committing to recycle the electronic device within a specified time. If the user selects an option indicating the user's intent to recycle the electronic device, then in block 520, the app instructs the user regarding the next steps for the user to recycle the electronic device. For example, the app can prompt the user to prepare the electronic device for recycling, such as described below with reference to FIG. 13. As another example, if the user selects a "Take me to a kiosk now!" button displayed by the app on the device display, the app can provide directions to the closest recycling kiosk 100. After instructing the user of next steps for recycling the electronic device, or if the user does not indicate an intent to accept the offer price (or, e.g., indicates that the user does not intend to recycle the electronic device while the offer price remains valid), the routine 500 ends.

FIG. 5 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 5 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 5 and the other flow diagrams are of a type well known in the art, and can themselves include a sequence of operations that need not be described herein. Those of ordinary skill in the art can create source code and/or microcode, program logic arrays, or otherwise implement the invention based on the flow diagrams and the detailed description provided herein.

In various embodiments, all or a portion of the routine 500 and the routines in the other flow diagrams herein can be implemented by means of a consumer or other user (such as a retail employee) operating one or more of the electronic devices and systems described above. For example, in some embodiments, the routine 500 and other routines disclosed herein can be implemented by a mobile device, such as the electronic device 330 described above with reference to FIG. 3. In some embodiments, portions (e.g., blocks) of the routine can be performed by one or more of the kiosks 100a-100n of FIG. 4, and/or by one or more remote computers. For example, such remote computers can include one or more of the server computers 404 of FIG. 4 and/or computing resources associated with the cloud 426, the resale marketplace 430, and/or the kiosk operator 432 operating separately or in combination. The kiosk 100 and/or the remote computers can perform the routines described herein using one or more local and/or remote databases (e.g., the database 406 of FIG. 4, such as the GSMA IMEI Database). Accordingly, the description of the routine 500 and the other routines disclosed herein may refer interchangeably to the routine, the app, the subject electronic device, and/or the kiosk 100 performing an operation, with the understanding that any of the above devices, systems, and resources can perform all or part of the operation.

While various embodiments of the present technology are described herein using mobile phones and other handheld devices as examples of electronic devices, the present technology applies generally to all types of electronic devices. For example, in some embodiments, the app can be installed and/or run on a larger device, e.g., a laptop or tower computer, to perform all or a portion of the routine 500. For example, the app can inventory a laptop or desktop computer and provide the user a confirmation code that the user can print out and bring to a kiosk or to an associated retailer location or point of sale (or send in with the computer via, e.g., courier, mail, or package delivery service) as a receipt. The code can identify the electronic device and represent the agreed price determined according to the valuation performed by the app based on the information it obtained from the electronic device and on the user-provided supplemental information. In some embodiments, the app and/or the receipt can indicate any elements that require independent verification (e.g., undamaged screen glass) for the user to receive the agreed price for the electronic device. The user can then take the electronic device to the retail storefront or point of sale (or, e.g., to the kiosk 100 for viewing by a remote kiosk operator) for its condition to be independently verified, after which the user can deposit the electronic device. The user can then receive the price upon verified receipt of the electronic device, such as a retailer or the kiosk 100 issuing cash, a credit, or a card such as a gift card.

Figure 6:
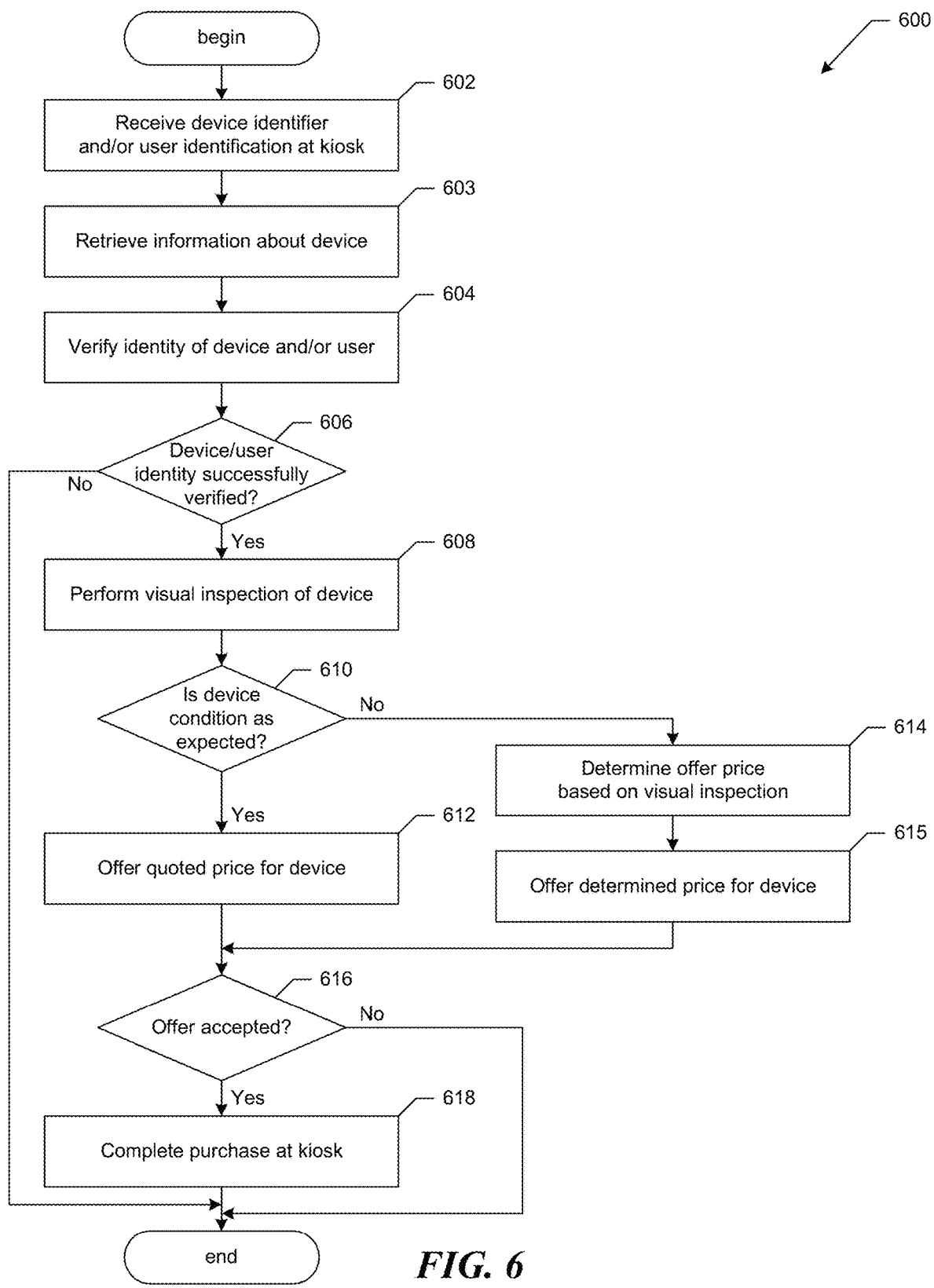
FIG. 6 is a flow diagram of a routine for purchasing an electronic device at a kiosk in accordance with embodiments of the present technology.

FIG. 6 is a flow diagram of a routine 600 for purchasing an electronic device (e.g., a mobile phone) at a kiosk 100 in accordance with embodiments of the present technology. In various embodiments, the kiosk 100 and/or a remote server operatively connectable to the kiosk 100 can perform some or all of the routine 600. In the example depicted in the routine 600, the user has used the mobile app to price the electronic device for recycling, as described above with reference to FIG. 5. For example, after the user has purchased a new mobile device, he or she may use the app to receive a price quote for the old device and get directions to the closest kiosk 100 where the user can exchange the old device for the quoted price while that price remains valid. After the user is presented with the device offer price, the user knows how much the electronic device is worth and may elect to bring the electronic device to the kiosk 100 for recycling. In this example, the user brings the electronic device to the kiosk 100 for recycling.

In block 602, the routine 600 begins by receiving an identifier of the electronic device and/or user identification at the kiosk 100. For example, when the user electrically connects the electronic device to the kiosk 100 (e.g., by plugging one of the kiosk's physical wired connectors 242 into the electronic device, or by causing the electronic device to join a wireless network provided by the kiosk 100), the kiosk 100 can detect the electronic device via the connection. Based on the type of the electronic device and/or the type of connection, the kiosk 100 can electrically query the electronic device to receive the unique identifier of the device. As another example, the kiosk 100 can prompt the user to identify himself or herself at the kiosk 100 (e.g., by logging in to an account). The kiosk 100 can also prompt the user to identify the electronic device and/or the user at the kiosk 100, such as by entering a code or an identifier (e.g., the identifier that was assigned as described above with reference to FIG. 5) at the touch screen 308 of the kiosk 100, by displaying a code (e.g., a QR code) or image on the screen of the electronic device so that a camera 116 of the kiosk 100 can read the code or image, by placing the electronic device in front of a camera 116 of the kiosk 100 so that the camera 116 can image features of the electronic device and/or read (e.g., via OCR) information such as an identifier (e.g., a serial number or IMEI number) printed on the electronic device (e.g. the back of the device), etc. Additional ways for the system to determine that the electronic device is present at the kiosk 100 are described below with reference to FIGS. 16 and 17. Receiving an identifier can also include, for example, identifying the user from a scanned driver license number; the app software detecting a wireless network signal from the kiosk 100; the kiosk 100 detecting a connection request from the electronic device; and so on.

In block 603, the routine 600 retrieves stored information about the electronic device at the kiosk 100 based on the received identifier of the electronic device. In some embodiments, after the kiosk 100 receives the device identifier, the kiosk 100 can query a local or remote database (e.g., a lookup table indexed against unique identifiers of electronic devices such as native identifiers or derived or assigned codes) to determine whether the device identifier is associated with stored information about an electronic device (e.g., any device to which the app has been installed, any device that the user has priced using the app, and/or any device that the kiosk 100 has previously evaluated). If information about the electronic device—such as, for example, a currently valid price quote—has been stored, the kiosk 100 automatically retrieves the stored information about the electronic device. In some embodiments, the kiosk 100 automatically retrieves information previously submitted about the electronic device, such as information that the user submitted via the app, from the memory 306 of the device 330 of FIG. 3, and/or from a remote database, such as the database 406 of FIG. 4.

In block 604, the routine 600 verifies the identity of the electronic device and/or the user. For example, after retrieving the stored information (e.g., information about the electronic device that was obtained via the app), the kiosk 100 can compare that information with information directly detected at the kiosk 100. For example, the routine 600 can electrically query the electronic device to confirm that the information received directly from the electronic device in response to the query corresponds to the information received indirectly via the app. To confirm the identity of the electronic device, the routine 600 can confirm that all of the identifiers match, and/or are consistent with third-party information about the electronic device, e.g., as described above with reference to FIG. 5. The routine 600 can also query a database (such as described below with reference to FIG. 8) to confirm that the electronic device is not, for example, reported stolen or associated with a remote device control feature (such as described below with reference to FIG. 10).

In decision block 606, the routine 600 determines whether the identities of the electronic device and/or the user have been verified successfully. If the routine 600 is not able to verify the identity of the electronic device and/or the user, then the routine 600 ends. For example, if the kiosk 100 cannot confirm that the electronic device submitted at the kiosk 100 is the same electronic device for which the app presented an offer price, then the kiosk 100 can return the submitted device, or indicate to the user that the submitted device needs to be fully evaluated and priced at the kiosk 100. On the other hand, if the verification is successful, then the routine 600 proceeds in block 608.

In block 608, the routine 600 performs an inspection of the electronic device, such as by receiving the electronic device and visually inspecting the electronic device as described above with reference to FIG. 2B to determine the electronic device's visual condition (e.g., whether the exterior of the electronic device appears to be damaged, whether the electronic device appears to be powered on, etc.). In decision block 610, the routine 600 determines whether the electronic device's visual condition is in the expected visual condition. For example, the routine 600 can evaluate whether the electronic device's visual condition meets a specific threshold (e.g., appearing largely or completely undamaged) or whether the electronic device's condition matches the information obtained via the software and used to provide the price quote for the electronic device. If the information about the electronic device indicated, for example, that the electronic device's case has a scratch, then in block 610, the routine 600 can confirm that the case is scratched (and not, e.g., completely broken or unblemished).

If the electronic device passes the visual inspection, then in block 612, the routine 600 offers to purchase the electronic device at the kiosk 100 at the previously offered price (e.g., the price determined in block 510 of FIG. 5, provided that the price is still valid for redemption). If the offered price has expired, then the routine 600 can check the current value of the electronic device and, if its value has changed, present an updated offer price based on the verified identity and condition of the electronic device. If, however the electronic device's visual condition is not as previously indicated, then in block 614 the routine 600 determines a price to offer for the electronic device based on the results of the visual inspection, and in block 615 the routine 600 presents the determined offer price to the user, such as by displaying the determined offer price on the kiosk display screen 104.

In decision block 616, after presenting the offer price to the user in block 612 or block 614, the routine 600 determines whether the offer price is accepted. If the user does not accept the offer, then the routine 600 ends. If, on the other hand, the user accepts the offer and has submitted the electronic device at the kiosk 100, then in block 618, the routine 600 completes the purchase and/or recycling transaction (e.g., receiving the electronic device in the collection bin 234 of FIGS. 2A-2D and paying the user). After the transaction is completed, the routine 600 ends.

In some instances, the user may want to maintain possession of his or her electronic device while obtaining an estimated price for the electronic device; for example, the user may be apprehensive about placing his or her electronic device into the inspection area 108 of the kiosk 100 for an electrical and/or visual inspection. In some embodiments, the present technology provides a "quick quote" or initial price estimate that the kiosk 100 can present to the user based on performing an initial analysis of the electronic device that does not require the user to give up control of his or her device. After receiving the "quick quote," the user can decide whether to recycle his or her electronic device based on a greater certainty about the value of the electronic device.

For example, to initiate obtaining a "quick quote" price estimate, the user can launch the app on the user's device. In some embodiments, the routine transfers information about the user's device from the electronic device to the kiosk 100. The app can transfer such information indirectly via an Internet data connection (e.g., via a mobile phone device transmitting cellular data to the remote server 404 of FIG. 4, which can then send that information to the kiosk 100) or directly to the kiosk 100. For example, the kiosk 100 can direct the user to swipe an NFC-enabled device against or in close proximity to (e.g., within a few inches of) an NFC sensor on the kiosk 100, or direct the user to connect the electronic device to a Wi-Fi or Bluetooth network provided by the kiosk 100. The kiosk 100 and/or the app can instruct the user to position the electronic device so that one or more of the cameras 116a-c can image the device to perform an initial visual analysis of the device. The routine can also direct the user to present the electronic device at the kiosk 100 displaying a code such as a QR code on the device's display screen so that the kiosk's camera 116 can scan the code. For example, the app and/or kiosk 100 may instruct the user to hold his or her electronic device at various angles or distances from the camera 116 (e.g., to show components of the device 330 and/or information printed on the device 330), or direct the user to display particular content on the screen of the electronic device (e.g., a device information "about" screen, or a visual code or test pattern screen displayed by the app) for evaluation by the kiosk 100 through the camera 116. The routine can also direct the user to use the electronic device's camera to read a code such as a QR code or bar code displayed by the kiosk's display screen 104, such as to verify that the electronic device's camera is functioning properly, and/or to transmit information (such as an offer price) to the electronic device without requiring a wireless network connection. If the information and/or initial visual analysis are sufficient to provide an initial quote, the kiosk 100 and/or the app can provide the user a price or estimated range of prices for the electronic device, e.g., via the app on the display screen of the electronic device and/or via the kiosk display screen 104.

Figures 7A, 7B:
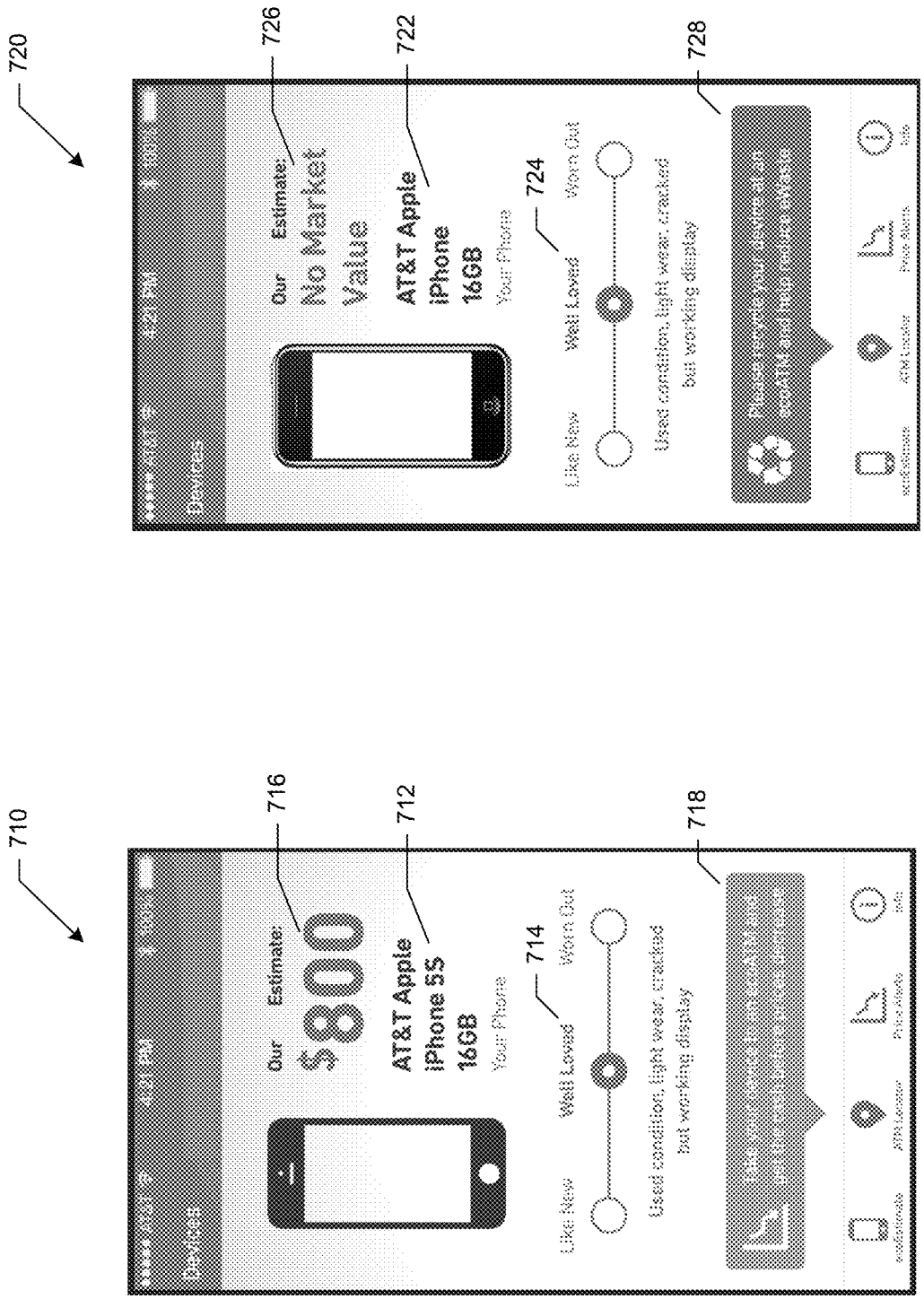
FIGS. 7A and 7B are display diagrams illustrating screen displays or graphical user interfaces associated with determining an offer price for an electronic device in accordance with embodiments of the present technology.

FIGS. 7A and 7B are display diagrams illustrating screen displays or graphical user interfaces (GUIs) associated with determining an offer price for an electronic device in accordance with embodiments of the present technology. In some embodiments, the electronic device displays the illustrated information on the display of the electronic device's screen. Referring first to FIG. 7A, the display page 710 illustrates an estimated price or offer for the electronic device, e.g., a mobile phone. In the illustrated example, the app has identified the electronic device as an Apple® iPhone® 5S mobile phone having 16 GB of memory and associated with the AT&T® mobile carrier network, as shown by the descriptive text 712. The page 710 displays a condition indicator 714 characterizing the phone as "well loved," in used condition showing light wear. In the illustrated embodiment, the condition indicator 714 includes other options such as "like new" and "worn out." In other embodiments, the condition indicator 714 enables a user to select whether the electronic device appears to be in poor, fair, or excellent condition, for example. Based on the phone's identity 712 and condition 714, the app presents a price estimate or offer 716 of $800 for the user to sell the electronic device at a kiosk 100. Instructions 718 prompt the user to take the electronic device to a kiosk 100 (e.g., "an ecoATM" kiosk) to exchange it for cash before the price changes. FIG. 7B shows a similar display page 720 that illustrates an estimated price or offer for a less valuable device. The description 722 identifies the electronic device as a mobile phone, e.g., an original Apple® iPhone® having 16 GB of memory and AT&T® as a mobile carrier. The condition indicator 724 describes the phone as "well loved," for instance, with cracked glass but a working display. Based on the phone's identity 722 and condition 724, the app presents an estimate that the electronic device has no market value. Instructions 728 prompt the user to take the electronic device to a kiosk 100 for recycling to benefit the environment.

The display diagrams in the present disclosure, including display diagrams 710 and 720, illustrate representative computer display screens or web pages that can be implemented in various ways, such as in C++ or as web pages in XML (Extensible Markup Language), HTML (HyperText Markup Language), the Wireless Access Protocol (WAP), LaTeX or PDF documents, or any other scripts or methods of creating displayable data, such as text, images, animations, video and audio, etc. The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users are shown and described with reference to certain Figures, those skilled in the relevant art will recognize that various other alternatives may be employed. The terms "screen," "web page" and "page" are generally used interchangeably herein.

When implemented as web pages, for example, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), matrix or bit-mapped formats, animated or video formats, etc. While aspects of the invention are described herein using a networked environment, some or all features can be implemented within a single-computer environment.

Figure 8:
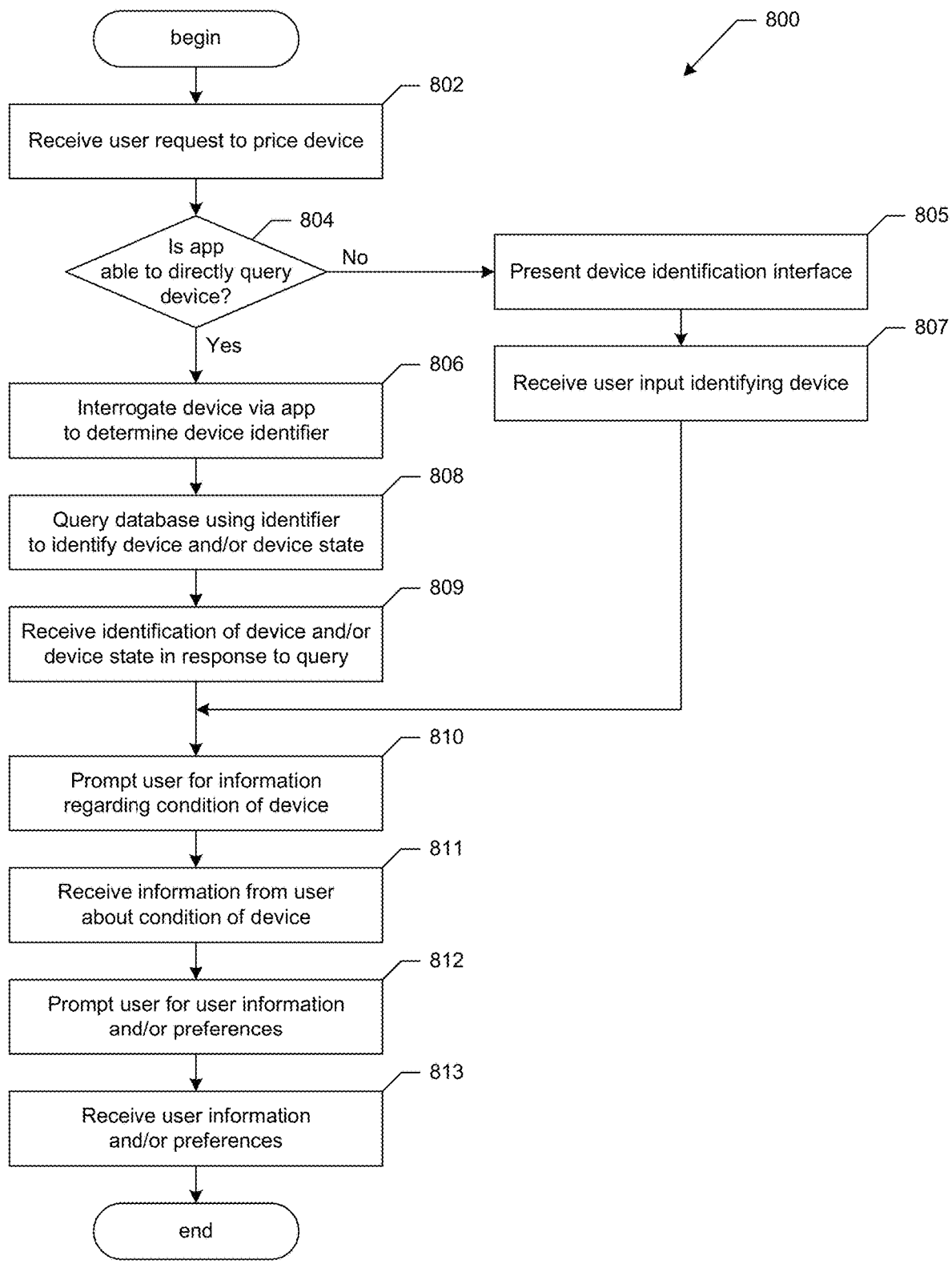
FIG. 8 is a flow diagram of a routine for obtaining information about an electronic device in accordance with embodiments of the present technology.

FIG. 8 is a flow diagram of a routine 800 for obtaining information about an electronic device in accordance with embodiments of the present technology. In various embodiments, the app and/or a remote server operatively connectable to the app can perform some or all of the routine 800. For example, the routine 800 can be performed when the user directs the app to price the electronic device for possible recycling, which causes the app to receive or otherwise obtain information about the electronic device. In some embodiments, the app can directly query the electrical device on which the app is running, such as by using an operating system API to obtain information about the device. As described above with reference to FIG. 5, the app and/or a remote server can then use the information to determine an offer price for the electronic device and can save the information about the electronic device to facilitate a transaction to recycle the electronic device.

In block 802, the routine 800 receives a request from the user to price the electronic device. For example, the user may initiate a process to price the electronic device for recycling by selecting a "What's My Device Worth?" option displayed by the app on the screen of the electronic device. As another example, when the user installs and first runs the app on the electronic device, the initial running of the app can cause the routine 800 to obtain information about the electronic device running the app.

In decision block 804, the routine 800 determines whether the app is able to directly query the electronic device. For example, the app may be running on a platform that allows the app to directly obtain detailed information about the electronic device and its configuration, as described below with reference to block 806. On the other hand, the app may be running on an electronic device that does not allow such access, or the user may not give the app permission to obtain some or all of the information that would be useful to determine the value of the electronic device. In another embodiment, the user may use the app to find the value of another device not running the app, so that the app is not able to directly obtain information about the electronic device.

If the app is not able to directly query the electronic device, then in block 805 the routine 800 presents a device identification interface for the user to identify the electronic device. For example, in some embodiments the app presents a hierarchy of screen displays for the user to identify the electronic device's make (or brand) and model, such as described below with reference to FIGS. 9A-9D. In other embodiments, the app can prompt the user (such as by a dialog that the app can display on the screen of the electronic device) to provide more general and/or more specific information about the electronic device. For example, the app can ask the user to confirm the category of the electronic device (e.g., laptop, television, smartwatch, game console, music player, wireless headset, mobile phone, virtual reality display, etc.). As another example, the app can request detailed information such as the color and/or style of the electronic device, such as information about a mobile phone produced in more than one variety or a device that could include external or interchangeable accessories (e.g., console face plates). In some embodiments, the app can prompt the user to submit an identifier of the electronic device. For example, the app can instruct the user to input a model number, serial number, or IMEI of the electronic device. As another example, the app can direct the user to navigate to a device settings "about" page, take a screenshot of the displayed information, then provide a copy of that screenshot to the app (e.g., for a remote server to perform optical character recognition (OCR) on the screenshot), to identify the electronic device.

In block 807, the routine 800 receives user input identifying the electronic device. For example, in some embodiments the user responds to the displayed hierarchy of screen displays, identifying the electronic device's wireless carrier, make, model, storage capacity, etc. such as described below with reference to FIGS. 9A-9D. In some embodiments, the user responds to prompts by the app for information about the electronic device such as by choosing button options displayed on the screen of the electronic device or by responding orally to audio prompts or questions. For example, the app can receive audio input from the user in response to a prompt, transmit the audio input to a remote server (e.g., the remote server computer 404 of FIG. 4) for voice recognition, and receive the recognized content of the user's response from the remote server. The app can also receive input of identifying information such as a device model number and/or unique identifying information such as a serial number or IMEI from the user as described above. After receiving the user input identifying the electronic device, the routine 800 proceeds in block 810.

Returning to decision block 804, if the app is able to directly query the electronic device, then in block 806, the routine 800 interrogates the electronic device via the app, obtaining information such as a device identifier. For example, a user can download the app onto the user's mobile phone, execute the app, and direct the app to evaluate the mobile phone such as by selecting an option presented by the app to price the electronic device. The app can be designed to run on a particular software platform (e.g., iOS®, Android™, Windows®, etc.), so that the app starts from the basis of already knowing the operating system for which it is installed. In some embodiments, the app can be programmed with what kinds of information are available on that platform, and what interfaces (e.g., APIs or data stores) can be used to obtain that information. For example, the app can use APIs to access logs on a mobile phone to obtain information such as the number of charge-discharge cycles (to indicate the condition of the phone's rechargeable battery) and/or call logs (to indicate possible issues with radio hardware or software if calls recently were not successfully completed), etc. The information can include, for example, the electronic device's MAC address, IMEI number, electronic serial number (ESN), Integrated Circuit Card Identifier (ICCID), manufacturer ID, model number, storage capacity, radio bands (e.g., frequency ranges and encoding such as CDMA, GSM, LTE, etc.), charge state, etc. In some embodiments, the app includes permissions to obtain various types of information or access various resources of the electronic device on which the app is installed. For example, the application may be associated with a set of permissions (e.g., Android™ manifest permissions listed with <uses-permission> XML tags) that are selected by the developer and automatically provided when the app is installed, or to which the user must agree before the app can be installed. As another example, the app can request permission at runtime to obtain information about the electronic device and/or the user (e.g., an iOS® location information permission dialog), and/or to access device features such as a camera and images taken by the camera.

In block 808, the routine 800 queries one or more databases using the identifier to identify the electronic device and/or the device's state. For example, the app can construct a database query string based on information such as the model number, serial number, and/or IMEI of the electronic device obtained by the interrogation of the electronic device. The app can use one or more local and/or remote databases, such as a locally stored lookup table included in or associated with the app and/or a remotely hosted database or service for responding to queries. The local and/or remote database can be a data structure indexed against device identifiers and/or configured to identify popular devices and/or devices that the user has previously used or indicated owning. In some embodiments, for example, the app contains a database of several popular electronic devices. The app can compare the information about the electronic device to the information in the local database to determine whether the electronic device is one of the several popular devices. If no match is found, the app can transmit a query to a remote server for comparison against a database of a larger number of devices.

In block 809, the routine 800 receives information identifying the electronic device and/or the device's state in response to the querying described above. For example, in response to a query including the electronic device's model number, the app can receive a particularly formatted identification of the device's maker, model designation, known features and/or characteristics, options and/or additional device-specific information to prompt the user for, etc. The app can also communicate with remote servers and/or services such as the GSMA IMEI Database (e.g., for parsing mobile phone IMEI numbers), a database of stolen devices (e.g., including device identifiers associated with police reports), and/or a service configured to provide data about whether an electronic device is associated with a remote user account (e.g., Apple® GSX servers for iCloud® accounts). Using the responses from such local and/or remote databases, the routine 800 can determine the identity of the electronic device (e.g., its make and model) and determine whether the electronic device is in an acceptable state for processing at the kiosk 100 (e.g., determining whether the electronic device is subject to remote user control, as described below with reference to FIGS. 10 and 11).

In block 810, the routine 800 prompts the user to receive information about the electronic device and/or the electronic device's condition, such as configuration information that may be specific to the device and/or information that may not be available to the app via direct interrogation. For example, the app can prompt the user (e.g., by displaying a question on the screen of the electronic device and/or by playing audio instructions to the user) to indicate whether there are any dead pixels on the electronic device's display screen (e.g., the touch screen 342 of the device 330), to identify case damage, to reveal whether the electronic device is linked to a remote user account enabling remote user control of the electronic device, etc. As another example, for an electronic device that is or may be associated with a subscription or service (such as a mobile phone that requires carrier service), the app can use the device's user interface to prompt the user to input information about when the user's contract for carrier service, if any, will terminate. In block 811, the routine 800 receives information from the user about the electronic device and/or the condition of the electronic device. For example, the app can receive responses from the user through the electronic device's user input interface, such as by text input, touchscreen button responses, checkboxes, etc. In some embodiments, the routine 800 uses audio voice recognition, image analysis, gesture detection, accelerometer input, and/or other input means to receive interactive input from the user.

In block 812, the routine 800 requests information about the user and/or the user's preferences. For example, before the user recycles the electronic device at the kiosk 100, the app can request the user's name; prompt the user to pose for a photograph to compare with the user's driver's license photo and/or photos taken by the kiosk cameras 116; request the user's driver's license number; prompt the user for biometric data such as a thumbprint; request user login credentials such as a user ID and password; ask the user to enter his or her physical and/or email address (e.g., for sending the user a receipt); request payment destination preference information; and so on.

In block 813, the routine 800 receives the information about the user and/or the user's preferences. For example, in response to the prompts described above with reference to block 812, the app can receive the name that the user inputs; take the seller's photograph; obtain the user's driver's license number; obtain biometric data such as a thumbprint (e.g., using the fingerprint sensor on an Apple® iPhone® 5S, Samsung® Galaxy S5®, or HTC One® Max); receive user login credentials such as a user ID and password; receive the user's physical and/or email address; obtain payment destination preference information; and so on. After block 813, the routine 800 ends.

In some embodiments, the routine 800 includes remote notification and/or security features based on the information received about the electronic device and/or the user. For example, the routine 800 can obtain a piece of information from more than one source and check the multiply-sourced information for consistency. For example, to confirm that the seller is the owner of the electronic device, the routine 800 can compare the user's name entered by the user and/or on the user's driver's license to a name associated with the electronic device, such as an owner's name associated with a remote user account. If the names do not match, then the routine 800 can, for example, prompt the user to use the owner's credentials to disassociate the device from the remote user account, or can flag the device as potentially stolen. As another example, after checking the IMEI or other unique identifier on the electronic device against one or more databases as described above with reference to block 808, the routine 800 may determine that the electronic device's identifier corresponds to a stolen device (or, e.g., a copied or cloned mobile phone). In those cases, the routine 800 can automatically notify the user (e.g., via a message displayed on the screen of the electronic device) and/or the recorded owner, if the electronic device was reported stolen (e.g., via an email message to the owner's address stored on the electronic device), a service provider (e.g., the wireless service carrier 422 of a mobile phone), the device manufacturer 424, law enforcement authorities, etc.). For example, the app can report the phone's location and user-identifying information received as described above with reference to block 810 to a law enforcement authority (e.g., by sending an automated email message) to help the law enforcement authority recover the electronic device and return it to the electronic device's owner. The capability to assist in recovering a stolen device (or, e.g., identify a cloned mobile phone that may be violating the owner's privacy and/or abusing the carrier's network) can encourage users, carriers, and/or manufacturers to add the app to mobile phones and/or other electronic devices.

In some embodiments, the present technology includes aggregating information obtained as described above with reference to FIG. 8. For example, to refine the operation of the app and improve its usefulness to users, the system can determine information about where users obtain the app (e.g., from a website, from an app store, or from a kiosk 100); what kinds of devices are most popular for app users (e.g., on what devices users install the app, and what devices users price using the app); user demographics; what app features are most popular; how often users are in the vicinity of a kiosk 100 and how often the users use the kiosk 100; what percentage of users who price an electronic device using the app later recycle the electronic device at a kiosk 100, and how long users usually take to bring their device to a kiosk 100; etc.

FIGS. 9A-9D are display diagrams illustrating screen displays for identifying an electronic device in accordance with embodiments of the present technology. For example, a user who is running the app on a mobile phone may want to price a tablet that is not running the app, or may want to determine the value of an old mobile phone that does not power up or does not have a network connection to download the app. The app can provide an interface configured to enable the user to quickly identify the electronic device.

Referring first to FIG. 9A, the display page 910 illustrates a list of devices for potential recycling, including mobile phones 914 and 918, and tablet 916. By way of example only, in the illustrated embodiment, the app is running on the mobile phone 918, which is indicated to be "Your Phone" with associated text. If the electronic device that the user wishes to recycle is not listed, then the plus icon 912 enables the user to add another device to the list of devices. By enabling the user to add multiple devices to be priced for recycling, the app provides flexibility and convenience for the user: the user can manage his or her various devices (e.g., tracking their value over time), decide which devices to recycle and when to recycle them, and bring multiple devices to the kiosk 100 at once for recycling. In some embodiments, the app provides aggregate information about the value of the electronic devices in the user's list of devices for potential recycling.

In FIG. 9B, the display page 920 illustrates a device identification interface, as described above with reference to block 805 of FIG. 8. The illustrated example enables the user to identify an electronic device by carrier 922, brand 924, and model 928. For example, to cause the app to display the display page 920, the user could select the "Add Device" option 912 in FIG. 9A, and then select "AT&T" from a list of carriers (not shown). In the illustrated example, the user has selected the carrier AT&T® 922 indicated by a check mark icon, and the app is highlighting the "Brand?" indicator 924 and is presenting a list of device manufacturer brands 926. The example list of device manufacturer brands 926 includes "Samsung" in the center of the top row. The user can select Samsung® as the manufacturer of the electronic device, such as by pressing the Samsung® icon on a touch screen. In FIG. 9C, the display page 930 illustrates that the user has chosen Samsung® 932 as the manufacturer, indicated by a check mark icon. The app is highlighting the "Model?" indicator 934, and is presenting a list 936 of Samsung® devices for user selection to identify the model of the electronic device. In FIG. 9D, the display page 940 illustrates a completed selection of an electronic device 942: an AT&T® Samsung® Galaxy S5® mobile phone. After the user has identified the electronic device's carrier, make (or brand), and model using the illustrated device identification interface, the user can select the "Done" indicator 944. The app can then add the electronic device 942 to the list of devices for potential recycling.

Figure 10:
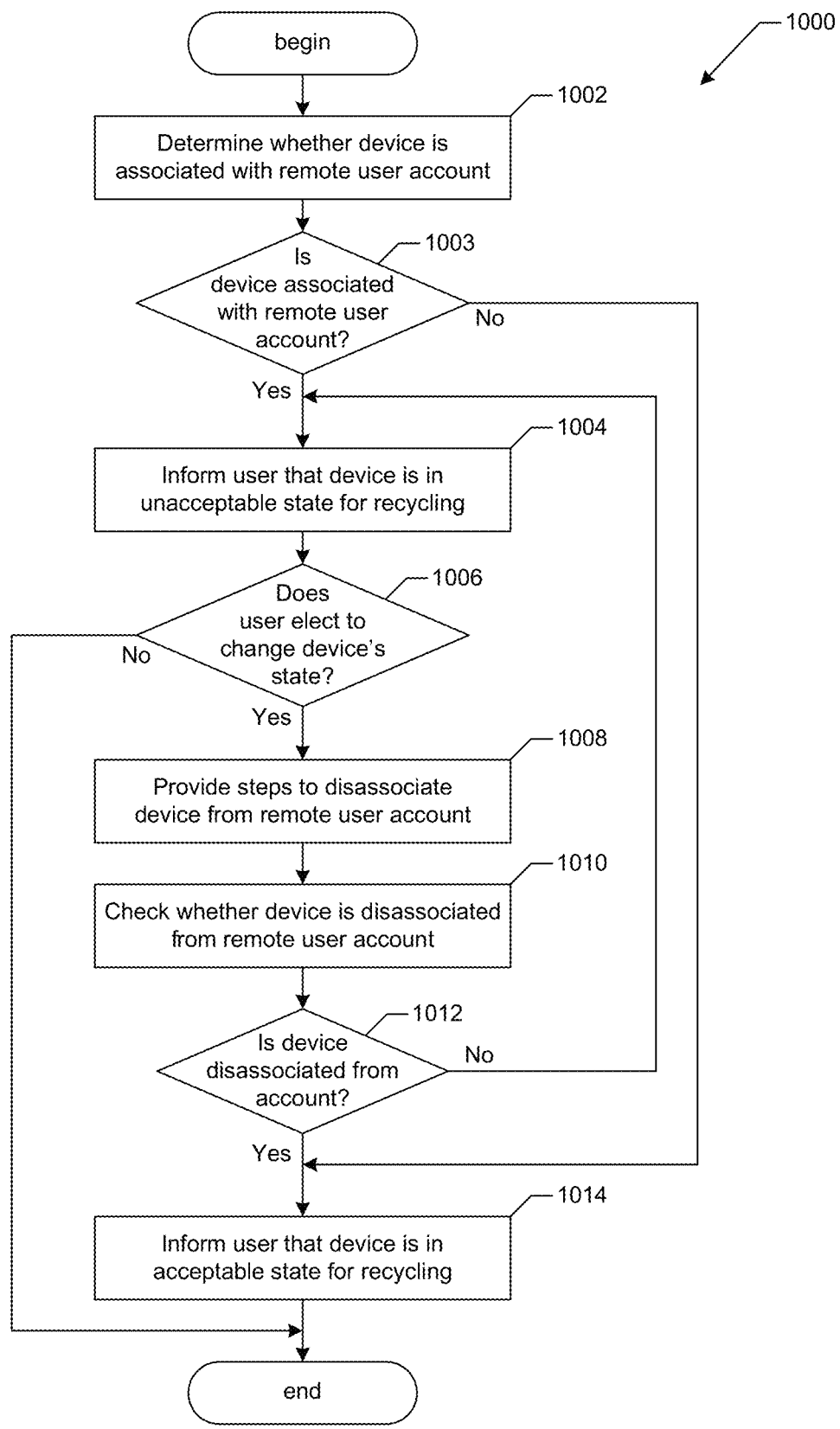
FIG. 10 is a flow diagram of a routine for preparing an electronic device for recycling in accordance with embodiments of the present technology.

FIG. 10 is a flow diagram of a routine 1000 for preparing an electronic device for recycling in accordance with embodiments of the present technology. In various embodiments, the app and/or a remote server operatively connectable to the app can perform some or all of the routine 1000. In some instances, for example, the electronic device that a user wishes to sell for recycling (e.g., at a kiosk 100) may be in an unacceptable state for recycling. One example of an electronic device in an unacceptable state is an electronic device associated with a remote user account that enables remote user control of the electronic device, such as tracking the electronic device, initiating actions on the electronic device (e.g., causing the electronic device to emit sounds or display a message), locking the electronic device (and/or changing a password to access or reactivate the electronic device), erasing data from the electronic device (a "remote wipe") and/or disabling the electronic device (a remote device "kill switch"). It is increasingly common for electronic devices such as computers, tablets, and mobile phones to be associated with remote user accounts. Examples of such remote user accounts include cloud-based services provided by a device manufacturer, a wireless service carrier, or another third party. For example, an Android™ device user whose device is associated with a Google Play™ account can push AndroidLost™ remote device control software to the electronic device, enabling the user to remotely find and wipe the electronic device even after the user no longer has possession of the electronic device. When an electronic device is associated with such a remote user account, it may be password protected or otherwise locked to that user's identity so that the electronic device cannot be reset and used by another individual (e.g., a subsequent purchaser). In addition, a remote user account may allow the account owner to remotely lock or disable the associated device to prevent anyone else from using it. For example, if an Apple® device such as an iPhone is connected to an iCloud account, then the iPhone cannot be recycled because the seller could remotely lock the iPhone and prevent it from being used by the buyer. As a result, an electronic device may not be marketable while the electronic device is associated with such a remote user account or other device control feature (e.g., a corporate device access and tracking system that is associated with an organization or a computing system rather than a particular user). Accordingly, to sell such an electronic device at the kiosk 100, the user should first disassociate the electronic device from the remote user account. The app enables the user to identify such issues and place the electronic device in an acceptable state for recycling before the user takes the electronic device to the kiosk 100.

In block 1002, the routine 1000 detects whether a remote user account is associated with the electronic device. For example, the app can use an operating system 331 API (FIG. 3) on the electronic device to determine whether the electronic device is associated with a remote user account. As another example, to determine whether an Apple® device is associated with an iCloud® remote user account, the routine 1000 can query the Apple® device manufacturer 424 servers (FIG. 4) (e.g., the Global Service Exchange (GSX) servers at gsx.apple.com). In some embodiments, obtaining the information can include receiving user answers to questions or prompts displayed to the user on the electronic device by the app, and/or directing the user to perform an action that requires the electronic device to be unlocked and activated before the action can be performed (e.g., displaying the electronic device's home screen). In some embodiments, for example, the routine 1000 can detect that an electronic device has been locked by a remote user account using queries via an electronic interface of the electronic device, and/or by analyzing information displayed on the electronic device's screen (e.g., if the user indicates that the electronic device is displaying a message stating that the electronic device is lost and should be returned to its owner). In some embodiments, the routine 1000 can also detect, for example, whether a PIN or other code controls access to the electronic device, and/or whether an automatic reactivation lock is engaged on the electronic device.

In decision block 1003, if no remote user account is detected, then the routine 1000 proceeds in block 1014. Otherwise, if a remote user account has been detected, then the routine 1000 proceeds in block 1004. In block 1004, the routine 1000 informs the user that the electronic device is in an unacceptable state for recycling. For example, the app can display a message on the screen of the electronic device to alert the user that the electronic device is in an unacceptable state for recycling while it is associated with the remote user account, and ask the user if he or she wishes to change the state of the electronic device to prepare it for recycling.

In decision block 1006, if the user elects not to change the electronic device's state, the routine 1000 ends. If, however, the user elects to change the electronic device's state to make it acceptable for recycling, then in block 1008, the routine 1000 provides steps to disassociate the electronic device from the remote user account. For example, the app can cause the screen of the electronic device to display instructions that guide the user to perform the necessary steps to deactivate the remote user account. The routine 1000 can display instructions including animated graphics or text, photographs, and/or video guidance, e.g., through the app running on the electronic device or on a separate device. In some embodiments, the routine 1000 updates the instructions as the user follows the instructions, for example, when the routine 1000 detects that an instruction has been followed, displaying the next instruction, until each step is complete. In some embodiments, in addition to presenting steps for the user to follow, the app can assist the user to perform such steps. For example, the app can activate a settings application or options screen and superimpose instructions or highlight a control for the user to activate, or modify the electronic device's settings with the user's permission (e.g., prompting the user to enter a password to allow changes).

In block 1010, the routine 1000 checks whether the user has disassociated the electronic device from the remote user account, according to the steps provided in block 1008. In decision block 1012, the routine 1000 determines whether the user successfully disassociated the electronic device from the remote user account, as described above. If not, then the routine 1000 returns to block 1004 (e.g., notifying the user that the state of the electronic device is still unacceptable for recycling because the electronic device is still associated with the remote user account) and repeats as described above. If, on the other hand, the user was successful, then in block 1014, the routine 1000 informs the user that the electronic device is free of any remote device control feature of the remote user account and is accordingly in an acceptable state for recycling at a recycling kiosk 100. After block 1014, the routine 1000 ends.

Figure 11:
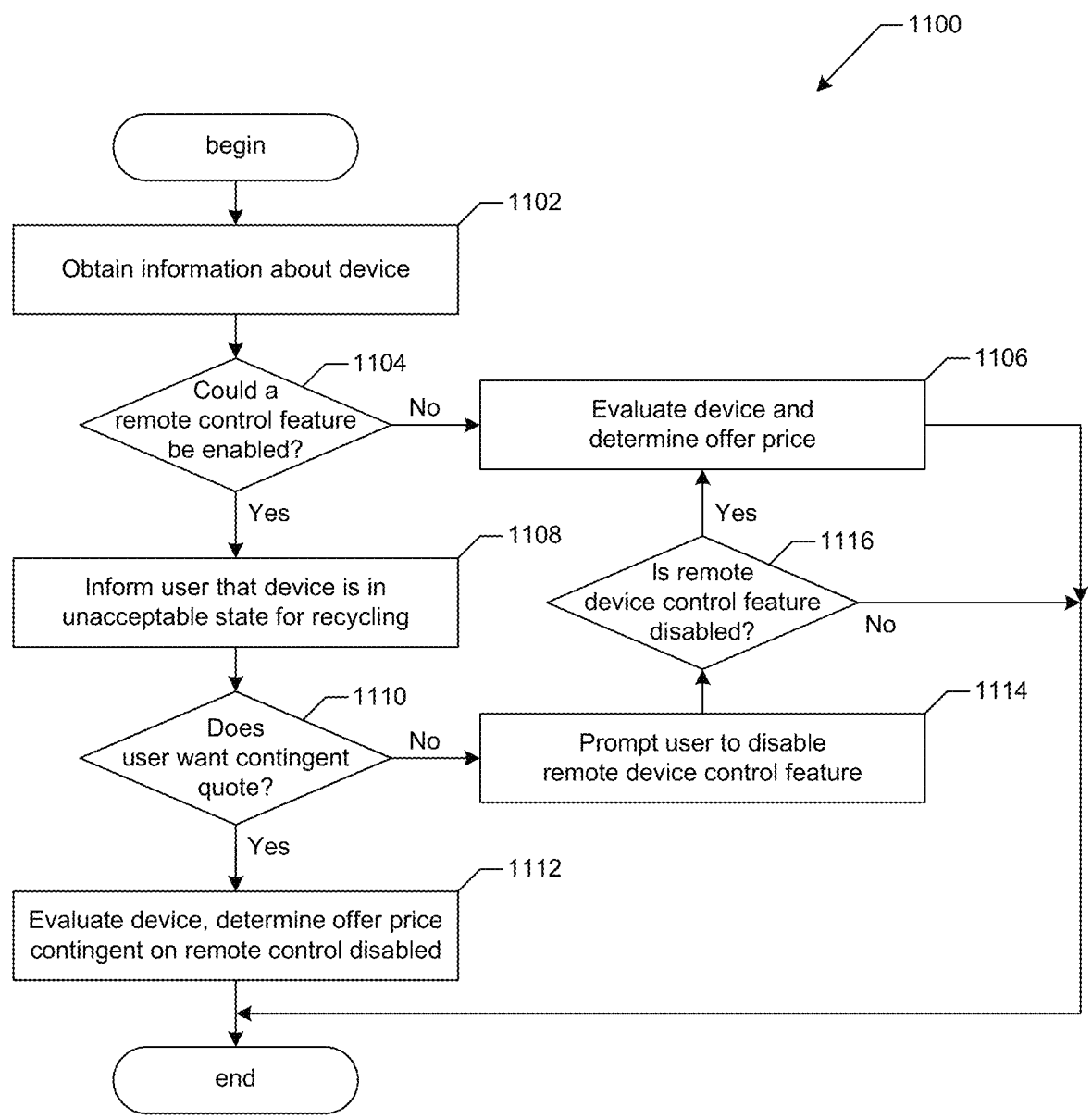
FIG. 11 is a flow diagram of a routine for determining an offer price for an electronic device subject to remote device control in accordance with embodiments of the present technology.

FIG. 11 is a flow diagram of a routine 1100 for determining an offer price for an electronic device subject to remote device control in accordance with embodiments of the present technology. In various embodiments, the app and/or a remote server operatively connectable to the app can perform some or all of the routine 1100. For example, the routine 1100 can be performed when a user's electronic device is associated with a remote device control feature (e.g., a feature associated with a remote user account). The user can run the app to find out how much the electronic device is worth without having to disable the remote device control feature. The app can either prompt the user to disable the remote device control feature before providing an offer price, or can provide an offer price that is contingent on the user disabling the remote device control feature before recycling the device at the kiosk 100.

In block 1102, the routine 1100 obtains information about the electronic device (such as a mobile phone), as described above with reference to, e.g., FIG. 8 and FIG. 10. The routine 1100 can query, for example, the electronic device and/or a service provided by the device manufacturer 424 or another third party that provides remote device control capabilities. In decision block 1104, the routine 1100 determines, based on the information, whether the electronic device is or might be subject to a remote device control feature. For example, the electronic device may be associated with a remote user account that enables remote owner control of the electronic device, such as a "kill switch" feature allowing the owner to disable the electronic device. If the information indicates that the electronic device is not associated with a remote user account, or that the electronic device is associated only with a remote user account that does not include a remote device control feature (e.g., a webmail account that is removed from the electronic device by a factory reset of the electronic device), then the electronic device is not subject to a remote device control feature, and the routine 1100 proceeds in block 1106. In block 1106, the routine 1100 evaluates the electronic device and determines an offer price for the electronic device, as described above with reference to FIG. 5.

On the other hand, if the information indicates that the electronic device could be associated with a remote user account including a remote device control feature that is enabled for the electronic device, the user may be required to disable it before the electronic device can be sold at a recycling kiosk 100. In block 1108, the routine 1100 informs the user that because the electronic device may be subject to a remote device control feature, the electronic device is in an unacceptable state for recycling. The routine 1100 prompts the user to indicate (e.g., via a dialog on the screen of the electronic device) whether the user elects to disable the remote device control feature or receive a contingent price quote for the electronic device. For example, the routine 1100 can provide a price quote that is contingent on the electronic device being placed in an acceptable state for recycling and/or a price quote that is contingent on an evaluation of the electronic device at the kiosk 100 to confirm the electronic device's electrical and/or physical condition. In some instances, for example, the user may want to determine the electronic device's value before taking the steps required to turn off a remote device control feature. In decision block 1110, the routine 1100 determines whether the user wants to receive a contingent offer price. If the user does want to receive a contingent quote, then in block 1112, the routine 1100 evaluates the electronic device and determines an offer price for the electronic device, subject to the electronic device being in an acceptable state when the user proceeds to recycle the electronic device.

Otherwise, in block 1114, the routine 1100 prompts the user to disable the remote device control feature, such as described above with reference to FIG. 10 and below with reference to FIGS. 12A-12C. In decision block 1116, the routine 1100 determines whether the remote user account's device control feature has been disabled. If so, then the routine 1100 proceeds in block 1106 as described above. If not, then the user does not want a contingent quote but has not disabled the device control feature, so the routine 1100 does not provide an offer price quote. After block 1106 or block 1116, the routine 1100 ends.

FIGS. 12A-12C are display diagrams illustrating device screen displays associated with disabling a remote device control feature in accordance with embodiments of the present technology. In some embodiments, these display diagrams 12A-12C can be used in conjunction with the routines described above with reference to FIGS. 10 and 11. For example, if the app determines that the electronic device is subject to a remote device control feature, and the user indicates an intent to prepare the electronic device for recycling, then the app can display instructions to disable the remote device control feature as depicted in FIGS. 12A-12C. "Find My iPhone" is an example of a remote device control feature for Apple® iOS® devices that is described herein for illustrative purposes.

Referring first to FIG. 12A, the display page 1210 illustrates device settings for an Apple® iOS® device including a button or control 1212 for the "Find My iPhone" feature. The control 1212 is illustrated in an "ON" state, indicating that the feature is active. As long as the feature is active, the owner can attempt to locate and/or remotely disable this electronic device if the electronic device were to be lost or stolen. For example, the user can log into his or her remote user account on icloud.com, select the electronic device, and press a button to play a sound on the electronic device, lock the electronic device and track its movement, or erase the electronic device. To prevent the electronic device from being subject to such actions by the user after the user sells it at the kiosk 100, the app in this embodiment requires the user to deactivate the "Find My iPhone" feature.

FIG. 12B shows an enlarged portion of an instruction screen 1220 for accessing the device settings control panel or application and deactivating the "Find My iPhone" feature. The illustrated example instructions 1222 guide the user to deactivate the "Find My iPhone" feature, such as by tapping or sliding the button or slider switch control 1212 to the left to put it into an "OFF" state 1224. For example, the instructions can animate the control 1212/1224 to show the user how to turn off the "Find My iPhone" feature. FIG. 12C shows an Apple® iOS® device display page 1230 that requires user authentication on the electronic device before the "Find My iPhone" feature can be deactivated. After turning the control 1212 to the "OFF" state, the electronic device requires the user to enter the device owner's account password 1232. Only after the user enters the correct credentials can the feature be turned off 1234. The display screens illustrated in FIGS. 12A-12C are provided by way of example only, and the disclosed technology includes multiple other embodiments.

Figure 13:
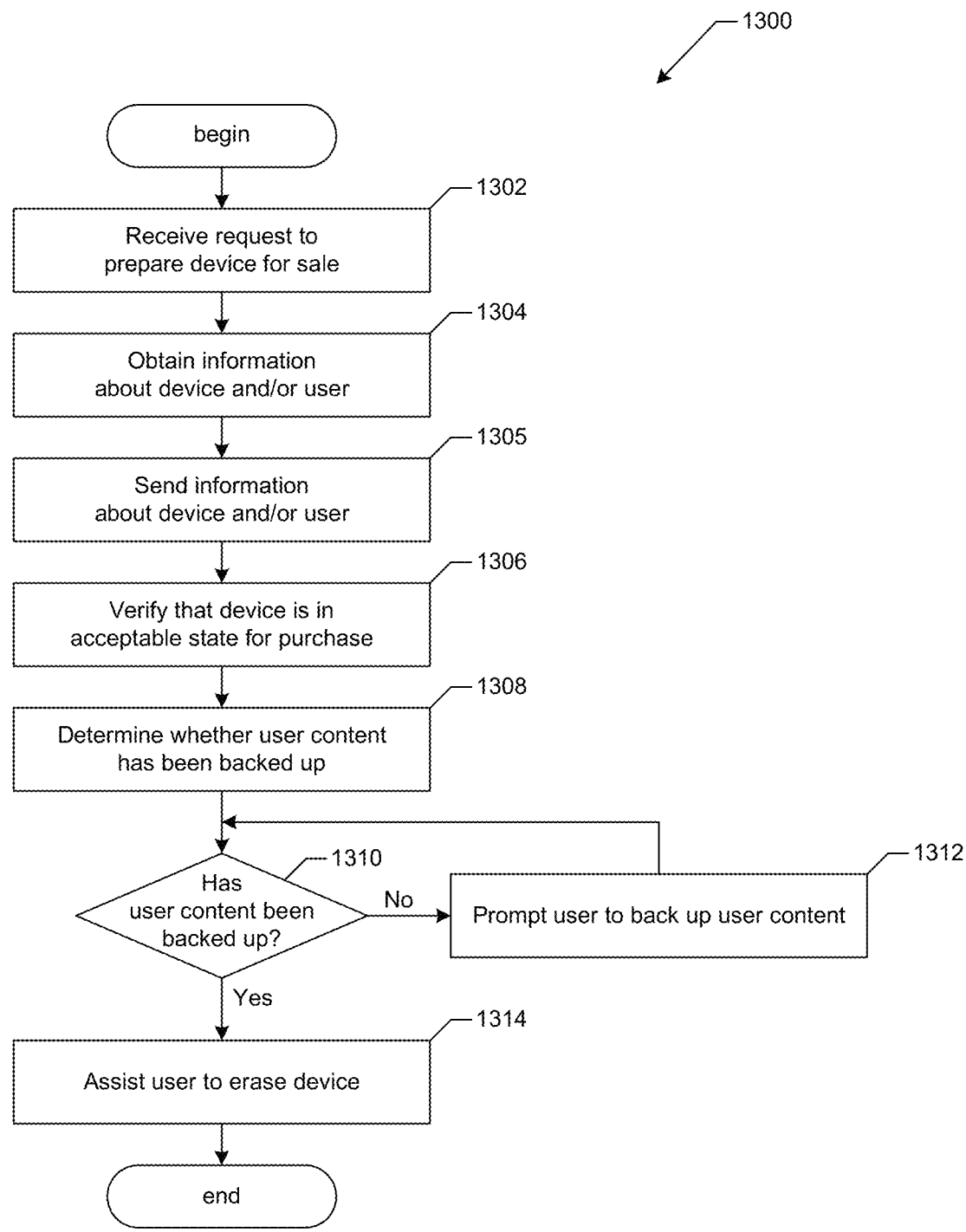
FIG. 13 is a flow diagram of a routine for preparing an electronic device for recycling in accordance with embodiments of the present technology.

FIG. 13 is a flow diagram of a routine 1300 for preparing an electronic device for sale at a kiosk 100 in accordance with embodiments of the present technology. For example, before the user recycles the electronic device at the kiosk 100, the app can help the user prepare for a smooth transaction by transmitting device information to the kiosk 100, verifying that the electronic device is free of remote user accounts, helping the user back up personal content on the electronic device, and/or assisting the user to erase the electronic device. In various embodiments, the app a remote server operatively connectable to the app, and/or one of the kiosks 100 can perform some or all of the routine 1300.

In block 1302, the routine 1300 receives a request to prepare the electronic device for sale. For example, the app can display a "Prep my device for recycling!" option that the user can select (e.g., via the touch screen display of the electronic device). As another example, after the app presents an offer price to the user (e.g., as described above with reference to FIG. 5), if the user indicates that he or she wants to take the next step to recycle the electronic device for the offer price, the app can prompt the user to prepare the electronic device for recycling at the kiosk 100.

In block 1304, the routine 1300 obtains information about the electronic device and/or about the user to facilitate the sale of the electronic device at the kiosk 100. Examples of some information that the routine 1300 can obtain are described above with reference to FIG. 8. For example, the app can retrieve from a data structure maintained by the app on the electronic device a unique identifier for the electronic device and information about the latest offer price for the electronic device. In block 1305, the routine 1300 sends the information about the electronic device and/or the user to one or more of the kiosks 100 so that the kiosks 100 can recognize and more quickly purchase the electronic device. In some embodiments, the app can transmit the unique identifier for the electronic device and information about the latest offer price for the electronic device to a remote server computer 404, to a cloud storage service 426, to the kiosk operator 432, and/or to the user's computer 418 (e.g., to another device running the app). For example, the kiosk 100 can receive or retrieve the information from the remote server 404. In other embodiments, the app can prompt the user to submit user identification information, such as a self-photograph, thumbprint, driver's license information, etc., to speed or skip some identification steps at the kiosk 100, such as the user verification steps described above with reference to FIG. 2C.

In block 1306, the routine 1300 verifies that the electronic device is in an acceptable state for purchasing at the kiosk 100. In some embodiments, for example, the app can determine in conjunction with a remote server whether the electronic device is subject to a manufacturer-provided or carrier-provided remote user account that includes a remote device control feature, and direct the user to remove the electronic device from the account before recycling it, as described above with reference to FIGS. 10 and 11. In other embodiments, the app can search information stored locally on the electronic device for any accounts that may still be active on the user's device (including, e.g., Internet banking accounts and/or other services configured to recognize the electronic device), and help the user to disassociate the electronic device from such accounts. To identify such accounts, the app can, for example, take an inventory of other apps present on the electronic device (e.g., a financial company app or a webmail service app), direct the user to review Web services commonly associated with automatic device-based login, etc.

In block 1308, the routine 1300 determines whether user content on the electronic device has been backed up. For example, the app can prompt the user to indicate whether he or she performs local data backups and/or uses an automatic cloud-synced backup service. If the user indicates that data should be backed up to a network service, the app can check for online backups of the user's images, notes, contacts, and/or calendar appointments. In decision block 1310 if the user's content has not been backed up, then in block 1312 the routine 1300 can prompt the user to save copies of such information (as well as passwords, bookmarks, and other personal content) in a local archive and/or cloud-based storage, and/or can provide a backup service to help the user transfer data off the electronic device to prepare the electronic device for recycling. If the user's content has been backed up, then in block 1314, the routine 1300 assists the user to erase the electronic device. For example, the app can instruct the user to perform a reset of the electronic device to return it to a factory-original state, such as by displaying steps for the user to perform on the screen of the electronic device and/or by emailing a list of instructions to the user. In some embodiments, the app prompts the user for permission to perform a factory reset of the electronic device when the user sells the electronic device at the kiosk 100. After block 1314, the routine 1300 ends.

Figures 14A, 14B:
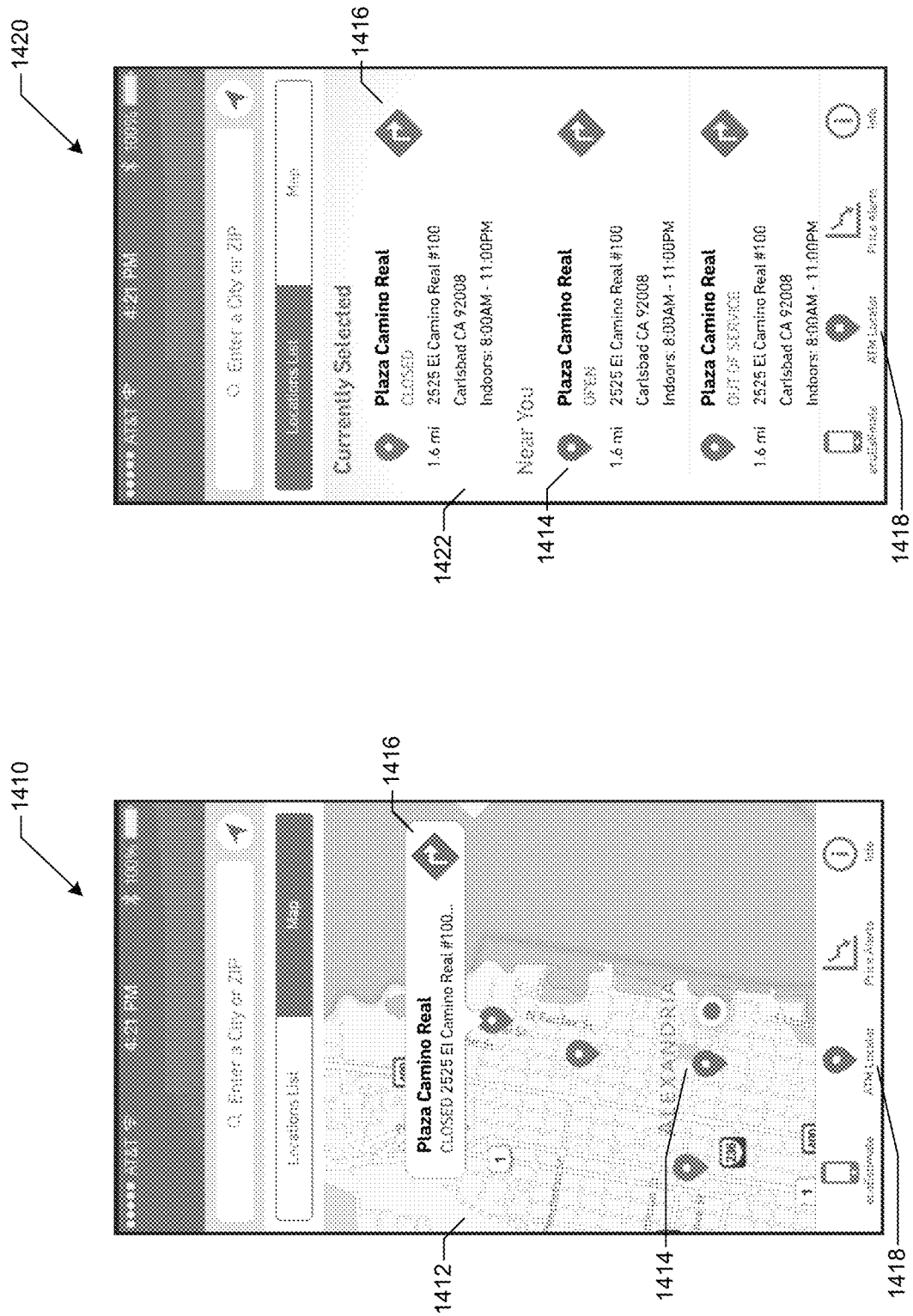
FIGS. 14A and 14B are display diagrams illustrating screen displays associated with guiding a user to an electronic device recycling kiosk in accordance with embodiments of the present technology.

FIGS. 14A and 14B are display diagrams illustrating screen displays associated with guiding a user to a device recycling kiosk 100 in accordance with embodiments of the present technology. For example, after the user has prepared his or her electronic device for recycling and/or received an offer price for the electronic device, the user may want to know where to go to recycle the electronic device. The app can display on the screen of the electronic device, for example, maps, addresses, and/or directions to the recycling kiosks 100.

Referring first to FIG. 14A, the display page 1410 illustrates a map-based interface 1412 showing kiosk locations. By way of illustration, the app displays the kiosk location information in response to the user selecting an "ATM Locator" option 1418. For example, the highlighted icon 1414 indicates a currently available kiosk 100. An information panel 1416 about another kiosk 100 includes a name, street address, whether the kiosk 100 is operative (and, e.g., free or in use), and directions icon for the app to provide turn-by-turn directions to the kiosk 100 (e.g., via a separate mapping application). For example, the app can automatically present the information panel 1416 about the nearest kiosk 100. In FIG. 14B, the display page 1420 illustrates a list-based interface 1422 showing kiosk locations. For example, the list 1422 includes the same highlighted icon 1414, and the information panel 1416 expanded to show the full address and hours of operation of the kiosk 100, as well as indication that it is in an indoor location.

Figure 15:
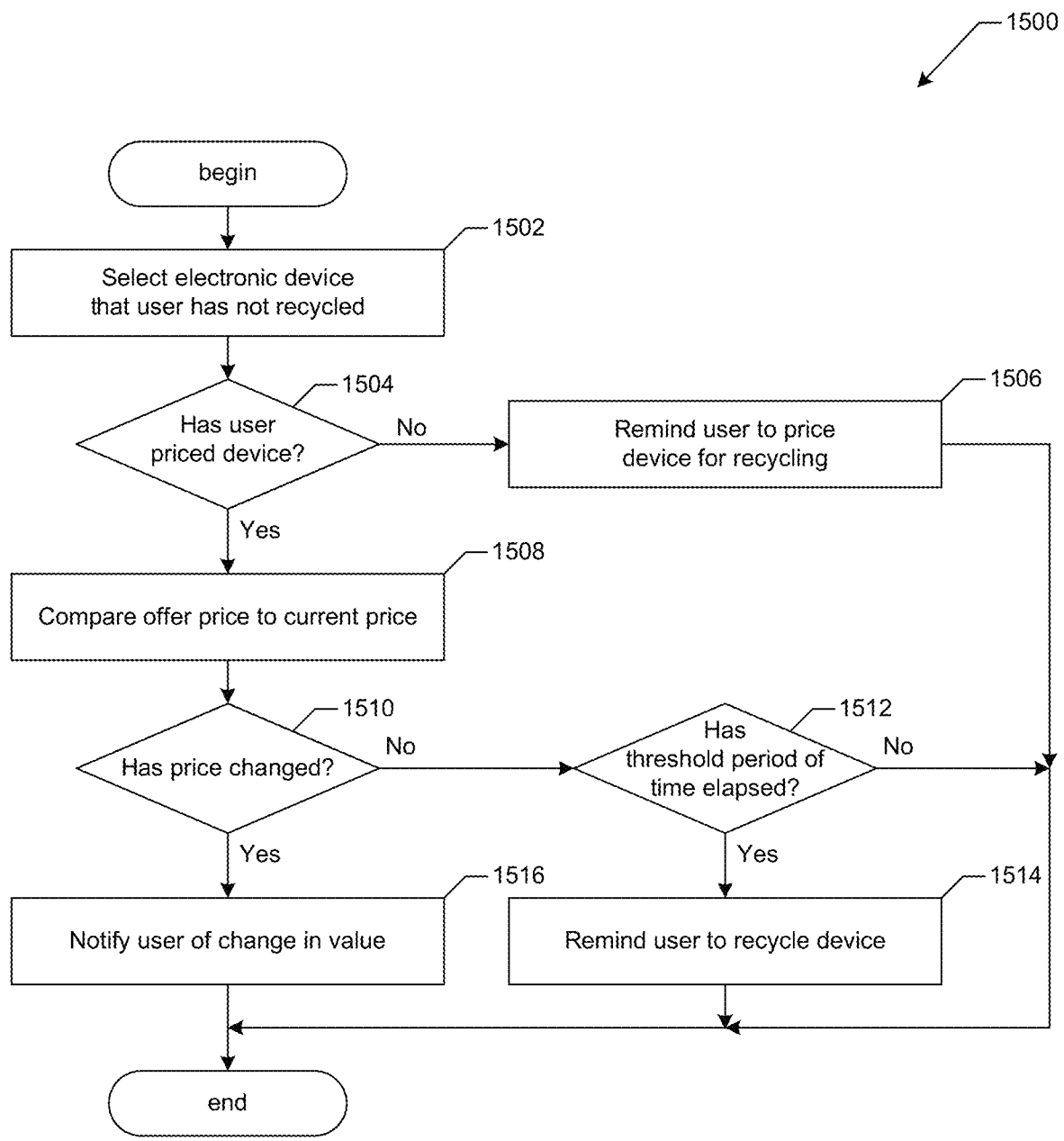
FIG. 15 is a flow diagram of a routine for notifying a user of a change in device value in accordance with embodiments of the present technology.

FIG. 15 is a flow diagram of a routine 1500 for notifying a user of a change in device value or a reminder in accordance with embodiments of the present technology. In various embodiments, the app and/or a remote server operatively connectable to the app can perform some or all of the routine 1500. In various instances, for example, it can be useful for the app to notify or remind the user to take an electronic device to a kiosk 100 for recycling. For example, after the user receives an offer price for the electronic device (e.g., at the kiosk 100 or using the app as described above with reference to FIG. 5), the user may not immediately recycle the electronic device. The user may wait to recycle the electronic device, or may forget to recycle the electronic device. By providing a reminder to the user such as a price change notification, the routine 1500 can encourage the user to recycle the electronic device while the electronic device still has market value.

In block 1502, the routine 1500 selects an electronic device that the user has not recycled. For example, in some embodiments the routine 1500 selects one or more of the devices associated with the user, such as all of the devices that are in the user's list of devices for recycling (e.g., the list of devices 910 illustrated in FIG. 9A). As another example, the app can select the electronic device on which the app is running. The routine 1500 can contact a remote server to verify whether the user has recycled a listed electronic device. In some embodiments, the routine 1500 associates the user with each device on which the user has used the app; when the user starts using the app with a different device, the app can inquire about the new device and/or the old device.

In decision block 1504, the routine 1500 determines whether the user has priced the electronic device. For example, the routine 1500 can determine whether or not the user has priced the electronic device using e.g., the app as described above with reference to FIG. 5, or the kiosk 100. If the user has not received an offer price for the electronic device, then in block 1506, the routine 1500 reminds the user to price the electronic device for recycling at the recycling kiosk 100. For example, the app can send the user a notification on the electronic device (e.g., displaying a message on the display, illuminating an LED, vibrating a buzzer, playing a sound, etc.) and/or a remote server can send the user a notification such as an email or a text message to remind the user about the opportunity to recycle the electronic device, to offer a coupon or special deal to the user, etc. After block 1506, the routine 1500 ends.

On the other hand, if the user has received an offer price for the electronic device, then in block 1508, the routine 1500 compares the offer price for the electronic device to a current price for the electronic device. For example, either the app or a server computer (e.g., the server computer 404 of FIG. 4) can retrieve the previously determined offer price for the electronic device. The app and/or the server computer can determine a current price for the electronic device, as described above with reference to FIG. 5. In some embodiments, determining a current price of the electronic device includes projecting a future value of the electronic device, or future values over time.

Electronic devices commonly lose value over time, although depending on supply and demand the price for an electronic device can also rise. In decision block 1510, the routine 1500 identifies whether the electronic device's current price has changed from, e.g., the offer price, or if the user has previously received a price change notification, from the last price that the user was notified of. For example, the app can identify a real or projected change in the price of the electronic device. In some embodiments, the routine 1500 uploads data about electronic device prices to the app (e.g., on a periodic basis, such as daily) and the app checks for changes in prices for electronic devices about which the app has obtained information, such as the electronic devices in the user's list of devices for recycling. In some embodiments, the routine 1500 checks for a change in the value of a previously priced device after a set period of time, or receives a message to alert users of a particular make and model of device when that device's value will change or has changed significantly.

If the price of the electronic device has not changed, then in decision block 1512, the routine 1500 determines whether a threshold period of time has elapsed. For example, the routine 1500 can wait until the user has had an opportunity to bring the electronic device to the recycling kiosk 100 before sending the user a reminder to do so. In some embodiments, when the user uses the app to re-price the electronic device and/or to locate the kiosk 100 the routine 1500 resets the threshold period of time. In some embodiments, the threshold period of time is measured against the amount of time since the offer price, since the user's last activity with the app (e.g., on a particular electronic device or on any of the user's electronic devices), and/or since the routine 1500 provided the most recent notification to the user. If the threshold period of time has not passed, then after block 1512, the routine 1500 ends. If, on the other hand, the threshold period of time has passed, then in block 1514, the routine 1500 reminds the user to recycle the electronic device. For example, the routine 1500 can be configured to send the user a device recycling reminder (such as described above with respect to block 1506) after a day, a week, and/or a month. In some embodiments, the routine 1500 can be configured to remind the user to recycle the electronic device before the current offer price expires. After block 1514, the routine 1500 ends.

Returning to decision block 1510, if the current price of the electronic device has changed from the offer price, then in block 1516, the routine 1500 notifies the user of the change in price. For example, the app can send the user a notification on the electronic device and/or a remote server can send the user an email or text message to notify the user that the price of the user's device has risen or fallen or is expected to rise or fall, and/or to offer a coupon or special deal to the user, etc. As another example, if the price of the electronic device changes while the offer price for the electronic device is still valid, then the app can inform the user that the user can sell the electronic device at the kiosk 100 for the offer price if he or she brings the electronic device to the kiosk 100 within a set period of time. In some embodiments, the app enables the user to set a preference or configure an alert to notify the user if the price of the electronic device changes. After block 1516, the routine 1500 ends.

Figure 16:
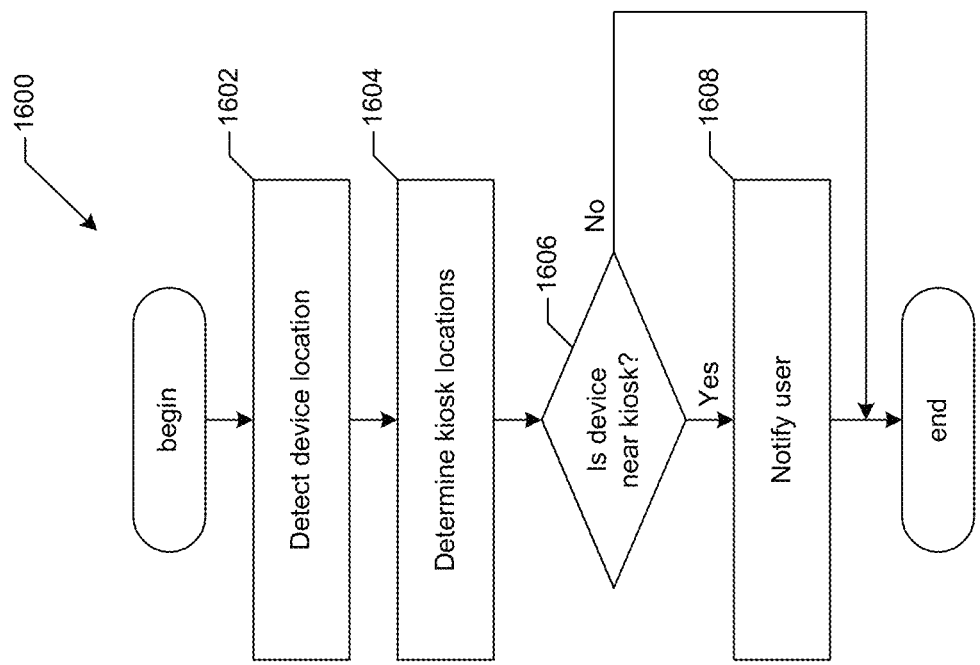
FIG. 16 is a flow diagram of a routine for providing a location-based notification in accordance with embodiments of the present technology.

FIG. 16 is a flow diagram of a routine 1600 for providing a location-based notification in accordance with embodiments of the present technology. In various embodiments, the app and/or a remote server operatively connectable to the app can perform some or all of the routine 1600. In some instances, for example, a user who is ready to recycle his or her electronic device may not be aware that a recycling kiosk 100 is nearby. By providing the user a location-based notification, the routine 1600 can remind the user of the opportunity to recycle the electronic device, and inform the user of a location convenient to the user where the user can recycle the electronic device.

In block 1602, the routine 1600 detects the electronic device's location. For example, if the app is running on the electronic device (e.g., on a mobile phone), the app can determine its approximate or precise location, such as via a GPS location estimate, a mobile carrier tower location fix, Wi-Fi network data referencing, a device operating system-provided location service, a user-entered ZIP code, etc. In block 1604, the routine 1600 determines kiosk locations. For example, the app can query a service (e.g., a web service provided by the server computer 404) to obtain information about kiosks 100 in the vicinity of the electronic device's location, such as a list of the nearest n kiosk locations. In some embodiments, the app can store information about kiosks 100 in areas previously visited by the user, such as kiosks 100 in a city in which the user accesses the app.

In decision block 1606, the routine 1600 determines whether the electronic device is near a kiosk 100. For example, the proximity determination can include projecting the electronic device's location based on current movement and/or previous location patterns. As another example, detecting whether the kiosk 100 is close to the electronic device can include detecting a wireless signal from the kiosk 100, indicating that the electronic device is within range of a wireless network of the kiosk 100. In some embodiments, if the routine 1600 detects a wireless signal from the kiosk 100, the electronic device can automatically wirelessly connect to the kiosk 100.

If the electronic device is not near any kiosk 100, then the routine 1600 ends. If, however, the electronic device is near the kiosk 100, then in block 1608, the routine 1600 notifies the user (e.g., as described above with reference to FIG. 15). For example, the routine 1600 can alert the user that the kiosk 100 is nearby and available, and/or offer a coupon or special deal to the user, etc. In some embodiments, the routine 1600 presents a notification to the user only if the user has expressed a preference or otherwise agreed to receive such notifications, and/or if the user has priced the electronic device for sale at the kiosk 100. For example, the routine 1600 can notify the user that the user can complete the contemplated sale of the electronic device for the previously determined price at the nearby kiosk 100, enabling the user to complete the sale of his or her device without needing to travel far. In addition, the localized notification enables the system to provide location-specific incentives, such as discounts redeemable at merchants located close to the kiosk 100. After block 1608, the routine 1600 ends.

Figure 17:
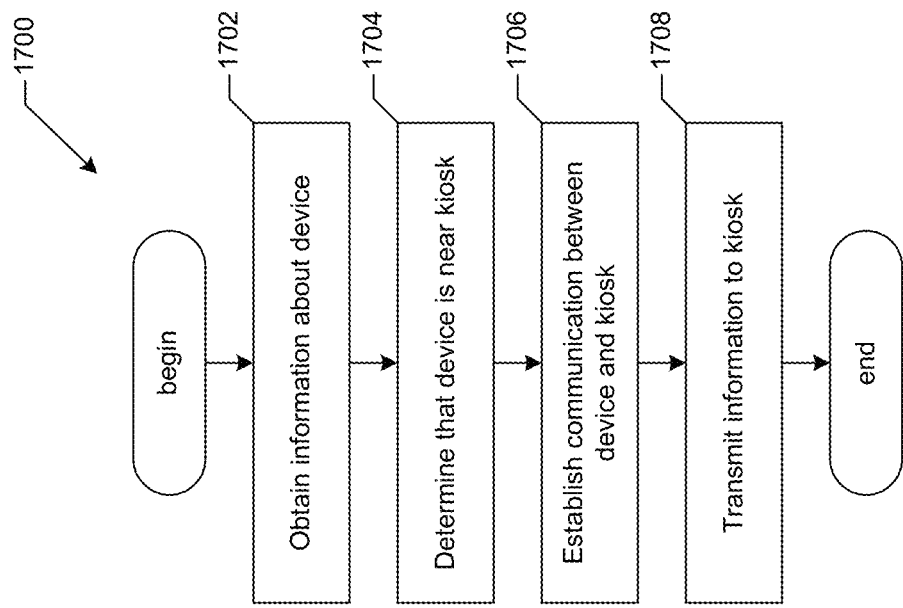
FIG. 17 is a flow diagram of a routine for transmitting information about an electronic device from the electronic device to a kiosk in accordance with embodiments of the present technology.

FIG. 17 is a flow diagram of a routine 1700 for transmitting information about an electronic device from the electronic device to a kiosk 100 in accordance with embodiments of the present technology. In various embodiments, a mobile app configured in accordance with the present technology can perform some or all of the routine 1700. In some instances, for example, a user may want to recycle the electronic device but may not want to transmit information about the electronic device to a remote server. In other instances, a user may want to recycle an electronic device, but the user does not have a network connection to transmit information to a remote server. In some embodiments such as these, the routine 1700 can obtain information about the electronic device to be transferred to the kiosk 100, for example, when the user brings the electronic device to the kiosk 100.

In block 1702, the routine 1700 obtains information about the electronic device. For example, the routine 1700 can obtain device identifiers such as the electronic device's MAC address, IMEI number, electronic serial number (ESN), Integrated Circuit Card Identifier (ICCID), etc.; and other information useful to identify and price the electronic device, such as its make and model, storage capacity, radio bands (e.g., frequency ranges and encoding such as CDMA, GSM, LTE, etc.), charge state, etc. The information about the electronic device can also include, for example, information generated and/or stored by the app, such as an offer price for the electronic device; a price history for the electronic device; the results of evaluation of the electronic device performed by the app (e.g., CPU performance data); information submitted to the app by the user (e.g., information about remote user accounts and/or the condition of the electronic device); information about the user's use of the app; an app-stored code identifying the electronic device, the user, and/or an offer for the electronic device, etc.

In block 1704, the routine 1700 determines that the electronic device is near (e.g., in the proximity of) the kiosk 100. For example, the app can track the location of the electronic device with which it is associated (e.g., as described above with reference to FIG. 16) and determine that the device's location is near a known kiosk location. As another example, the device's user may indicate to the app that he or she has brought the electronic device to the kiosk 100 (e.g., by activating an "I'm at the Kiosk Now!" function of the app). In some embodiments, the routine 1700 determines that the electronic device and the kiosk 100 are in close proximity based on detecting wireless signals. For example, a Wi-Fi access point or base station associated with the kiosk 100 can transmit packets advertising the access point's station ID (e.g., BSSID and/or SSID) on various channels via its wireless transceiver 324. In some embodiments, the app is configured to recognize IDs associated with kiosk access points, and/or to automatically connect (or, e.g., to prompt the user to connect the electronic device) to a wireless connection provided by the kiosk 100, such as a Wi-Fi or Bluetooth network.

In block 1706, the routine 1700 establishes communication between the electronic device and the kiosk 100. In some embodiments, establishing communication includes directing the user to make a wired connection between the kiosk 100 and the electronic device, such as by providing an appropriate connector (e.g., a micro-USB or Lightning connector) and instructions for attaching the connector to the electronic device as described above with reference to, e.g., FIG. 2C. In other embodiments, establishing communication includes establishing a wireless link for data transfer. For example, the kiosk 100 can provide a wireless network or peer-to-peer connection for communication with the electronic device, such as a radio link (e.g., Wi-Fi, Bluetooth, or NFC), an optical link (e.g., IrDA, laser, or screen-based), and/or an audio link (e.g., high-frequency or ultrasound).

In some embodiments, establishing the wireless link can include the app displaying instructions to the user and/or authentication information for the user to enter on the electronic device and/or on the kiosk 100. For example, the app can present textual and/or graphical instructions or video guidance on the electronic device's screen (e.g., the screen 342 of the device 330) and/or play audio instructions through the electronic device's speaker (e.g., the speaker 344). The instructions can include, for example, a code or other identifier to facilitate linking of the electronic device with the kiosk 100. Establishing the wireless link can also include receiving user input or confirmation at the electronic device. For example, to pair a Bluetooth-enabled device with a kiosk Bluetooth connection, the app can direct the user to perform one or more steps such as activating the electronic device's Bluetooth radio, making the electronic device discoverable, selecting the kiosk 100 with the user interface of the electronic device, initiating a pairing process, providing a Bluetooth pairing code that the user can type on the keyboard or screen of the electronic device or on the touchscreen 308 of the kiosk 100 or that the app can enter, and/or confirming that the connection should be allowed. As another example, the kiosk 100 can provide a Wi-Fi network. The app can cause the electronic device to join the Wi-Fi network or prompt the user to cause the electronic device to join the Wi-Fi network by, for example, activating a Wi-Fi radio on the electronic device, selecting the kiosk's network, inputting a particular password, etc. Establishing the wireless link can also include the app directing the user to perform actions such as swiping an NFC-enabled device against or in close proximity to a kiosk NFC sensor (e.g., within a few inches), or aligning the electronic device's optical transceiver with an optical transceiver of the kiosk 100 (e.g., by pointing a laser or an infrared LED or sensor at a designated optical window or device on the kiosk 100, or aiming or placing the electronic device's screen against a window or in front of a camera such as the camera 116 on the kiosk 100). In other embodiments, the routine 1700 can provide a visual code or image (e.g., a QR code) for the user to scan using the app on the electronic device, such that scanning the code or image prompts the electronic device to connect to the kiosk's wireless network (e.g., upon user confirmation).

In block 1708, once communication has been established, the routine 1700 transmits information from and/or about the electronic device to the kiosk 100 via the wired or wireless connection. The transmitted information can include information about the electronic device obtained by the app that could not be directly accessed by the kiosk 100 via the electrical inspection described above in connection with FIG. 2C. For example, the information can include data about user accounts, performance history data, user-submitted data about the condition of the electronic device, etc. The kiosk 100 can use the information to more accurately evaluate and price the electronic device. After block 1708, the routine 1700 ends.

Figure 18:
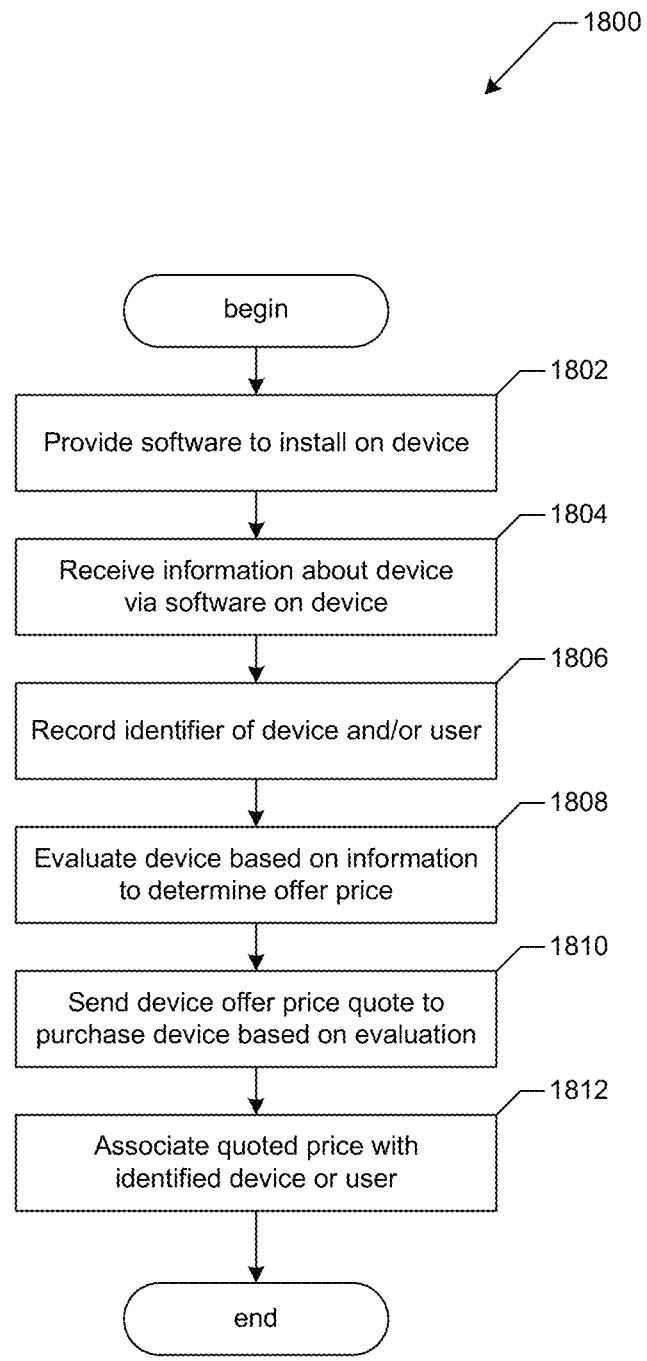
FIG. 18 is a flow diagram of a routine for remotely pricing an electronic device for recycling in accordance with embodiments of the present technology.

FIG. 18 is a flow diagram of a routine 1800 for remotely pricing an electronic device (e.g., a mobile phone) for recycling at a kiosk 100 in accordance with embodiments of the present technology. In various embodiments, the kiosk 100 and/or a remote server operatively connectable to the kiosk 100 can perform some or all of the routine 1800. In various embodiments, the routine 1800 can be performed in harmony with the routine 500 performed by the app described above on the electronic device, which can be remote from the kiosk 100. For example, the kiosk 100 and/or a remote server can provide software to be installed on the electronic device, remotely receive information about the electronic device via the software installed on the electronic device, use the received information to provide an offer price for the electronic device, and record the offer price so that the user can quickly recycle the electronic device for the quoted offer price when the user brings the electronic device to the kiosk 100.

In block 1802, the routine 1800 provides software (e.g., an app) to install on the electronic device. The routine 1800 can provide the software to the electronic device from, e.g., the kiosk 100 (e.g., sideloading an app over a wired or wireless data connection), through a website (e.g., a website associated with the kiosk operator 432), from a software repository run by the device manufacturer 424 or a third party (e.g., the Apple® App Stores℠, Google Play™ store, Amazon® Appstore™, and so on), etc. In block 1804, the routine 1800 receives information about the electronic device and/or the user via the software on the electronic device. For example, the user may download and run the app on the electronic device to obtain information as described above regarding FIG. 8, and the app can store and/or transmit information about the electronic device, such as to a remote server computer 404 as described above with reference to FIG. 5. As another example, in some instances, when the user installs the app on the electronic device, the system can receive or obtain a stored or transmitted report of the installation (e.g., from the device manufacturer 424 or from the software repository that provided the app to the electronic device). In various embodiments, the routine 1800 can access the stored or transmitted information, such as by receiving the information at the server computer 404.

In block 1806, the routine 1800 records one or more identifiers of the electronic device and/or the user. Examples of identifiers include the IMEI of a mobile phone, the serial number of a laptop computer, a unique wireless identifier of the electronic device such as a Wi-Fi interface media access control address (MAC address), a derived code such as a unique hash (based on, e.g., the information received in block 1804), and a serially or randomly assigned code such as the code given to the user as described above with reference to FIG. 5. The routine 1800 can record the identifiers in a registry database that indexes identifiers against devices to which the software has been installed, devices that the system has priced (e.g., remotely via the software), and/or devices that the kiosk 100 has previously evaluated, for example. The database can be, for example, one or more of the databases 406 associated with the server computer 404 (FIG. 4), can be stored in the cloud storage facility 426, can be distributed among the kiosks 100, and so on. For example, the routine 1800 can register the electronic device and/or the user for recognition at the kiosk 100 by saving one or more of the identifiers in such a registry. The routine 1800 can store some or all of the registry in one or more local or remote databases (e.g., the database 406), and/or can provide the registry to one or more of the kiosks 100. In some embodiments, the routine 1800 sends only a portion of the registry to a particular kiosk 100, such as information about registered devices in the same geographic area as the kiosk 100 (e.g., within the same city or state), limiting the volume of data transmitted to the kiosk 100.

In block 1808, the routine 1800 evaluates the electronic device based on the information. On a server remotely located from the electronic device (e.g., the server computer 404), for example, the routine 1800 can apply the received information to a database of prices, such as a lookup table, pricing model, or other data structure containing prices for various electronic devices. The system can use the identifier, for example, to determine the make and model of the electronic device, and use the make and model of the electronic device (along with, e.g., information about the condition of the electronic device) to determine a price to offer for the electronic device based on the data in the database or pricing model. In some embodiments, the routine 1800 can determine an offer price that enables the user to receive the price in exchange for recycling the electronic device at the kiosk 100. In some embodiments, the routine 1800 can determine an offer price for the electronic device that is contingent on an assessment of the visual condition of the electronic device at the kiosk 100 such as described above with reference to FIG. 2B. In some embodiments, the routine 1800 can determine an offer price that includes a range of prices based on the possible outcomes of such an assessment. In some instances, the electronic device may have no market value. In various embodiments, the pricing data is updated on a continuous or periodic basis.

In block 1810, the routine 1800 sends to the electronic device an offer price quote to purchase the electronic device based on the evaluation. In some embodiments, the routine 1800 sends the offer price quote from the server to the software app running on the electronic device. In block 1812, the routine 1800 associates the quoted price with the electronic device and/or the user. For example, the routine 1800 can store information about the price quote, the electronic device, and/or the user in the database 406 (e.g., in the registry described above), and/or in one or more data structures maintained by the software on the electronic device, by the kiosk 100, and/or by other aspects of the present technology. After block 1812, the routine 1800 ends. An example routine for recycling the electronic device when the user brings the electronic device to the kiosk 100 is described above with reference to FIG. 6.

Figure 19:
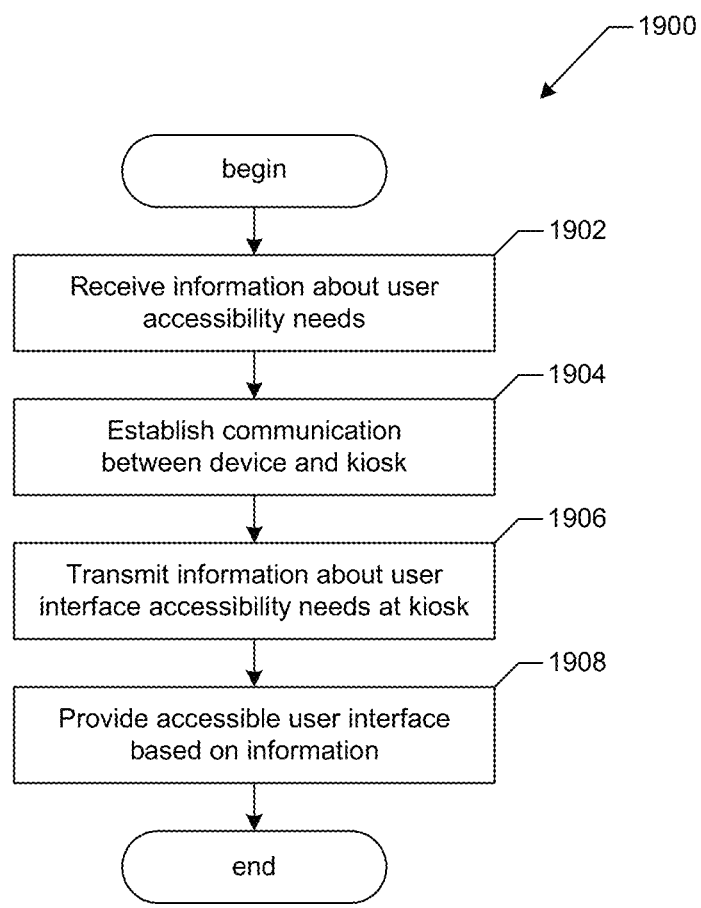
FIG. 19 is a flow diagram of a routine for accommodating user accessibility needs in accordance with embodiments of the present technology.

FIG. 19 is a flow diagram of a routine 1900 for accommodating user accessibility needs in accordance with embodiments of the present technology. In various embodiments, the app and/or the kiosk 100 can perform some or all of the routine 1900. For example, the app can facilitate use of the kiosk 100 by users who have special accessibility needs such as visual or auditory impairments. The app can augment the technology provided at the kiosk 100 to help provide an ADA-compliant interface.

In block 1902, the routine 1900 receives information about accessibility needs of the user. For example, the app can receive input from the user at the electronic device running the app requesting an accessible interface; or the app can take note of user settings on the electronic device associated with accessibility needs, e.g., through an operating system accessibility API; or the app can detect a braille interface or other assistive technology attached and/or operatively connected (such as via a Bluetooth connection) to the user's device. In some instances, the app can be running on an electronic device that the user utilizes as an accessibility aid to recycle a different electronic device. In some embodiments, the routine 1900 can receive input from the user at the kiosk 100 requesting an accessible interface, e.g., at the kiosk's touch screen 104 interface or by voice input through the kiosk's microphone.

In block 1904, the routine 1900 establishes a link between the electronic device and the kiosk, such as by wireless communication, as described above with reference to FIG. 17. In block 1906, the routine 1900 transmits information describing user interface accessibility needs of the user for a recycling transaction at the kiosk 100. For example, the app can transmit accessibility information directly from the electronic device to the kiosk 100, and/or record accessibility information in connection with a remote server before the user's arrival at the kiosk 100. As another example, if the kiosk 100 has received the user's input requesting an accessible interface, the kiosk 100 can transmit the information about the user's accessibility needs to the electronic device, e.g., to enable the app to provide part of an accessible interface for the user.

In block 1908, the routine 1900 provides an accessible user interface based on the information. For example, the routine 1900 can cause the kiosk 100 to behave differently based on the information describing the user's interface accessibility needs, such as by displaying messages on the kiosk's touch screen 104 in a large font size or in colors adapted for readability by a colorblind user. As another example, the app can display or play information relevant to the transaction at the kiosk 100 via the electronic device's assistive technology, so that the app enables the user to use the electronic device as an enhanced and/or alternative interface for the kiosk 100. For example, if the electronic device has a braille display, the routine 1900 can send messages displayed on the kiosk's display screen 104 to the app, and the app can display the messages so that they are displayed on the braille display. After block 1908, the routine 1900 ends.

Figures 20, 21:
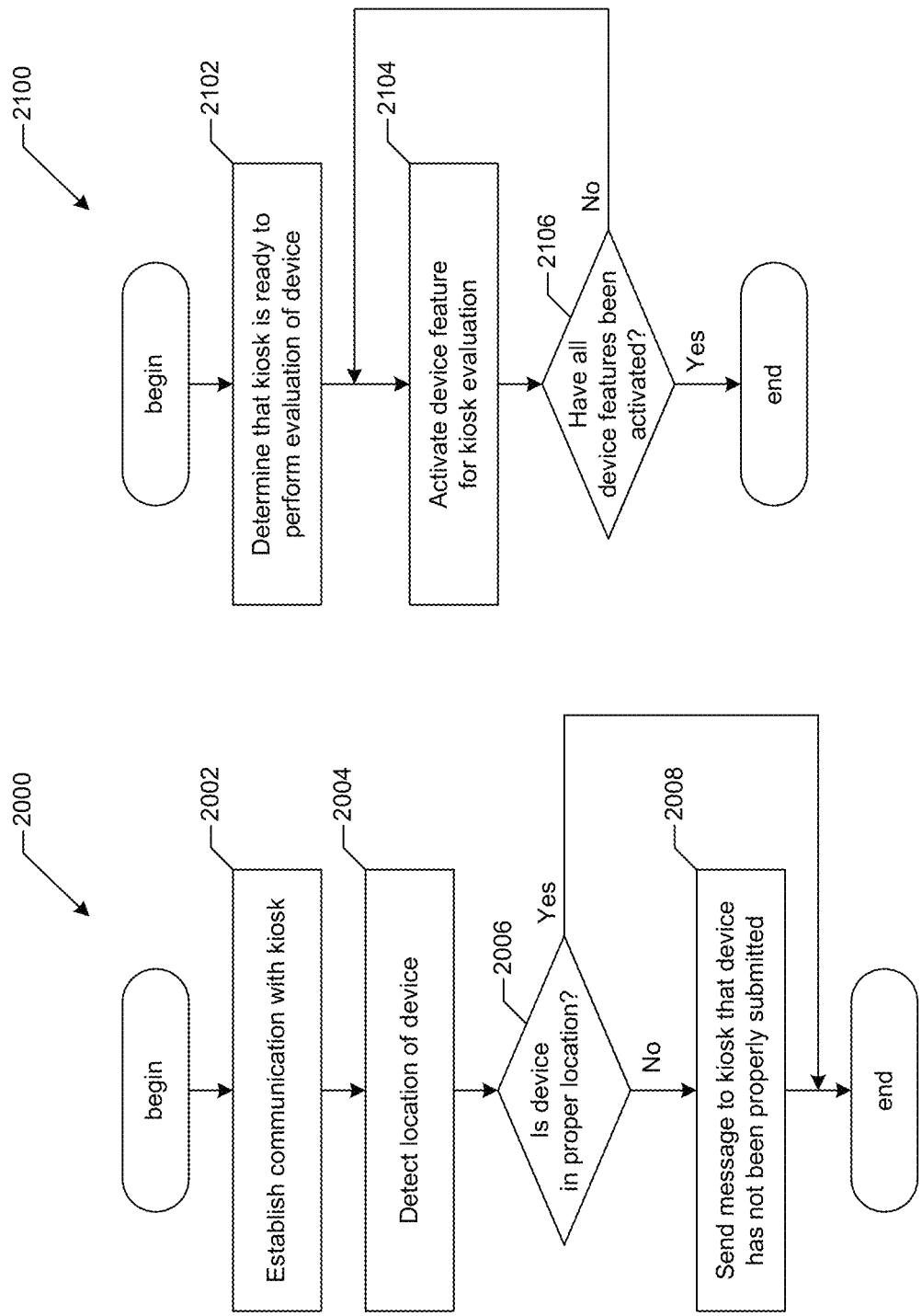
FIG. 20 is a flow diagram of a routine for determining whether an electronic device has been properly received by a kiosk in accordance with embodiments of the present technology.
FIG. 21 is a flow diagram of a routine for facilitating evaluation of an electronic device at a kiosk in accordance with embodiments of the present technology.

FIG. 20 is a flow diagram of a routine 2000 for determining that the electronic device has been properly received by the kiosk 100 in accordance with embodiments of the present technology. In various embodiments, the app can perform some or all of the routine 2000. In a typical recycling transaction at a kiosk 100, for example, the user places the electronic device, such as a mobile phone 250, in the kiosk 100, the mobile phone 250 is binned, and the user is paid for the mobile phone 250 as described above with reference to, e.g., FIGS. 2A-2D. A fraudulent user, however, may attempt to switch the mobile phone 250 for a less valuable object. For example, after pricing the mobile phone 250 and bringing the mobile phone 250 to the kiosk 100 to receive the quoted price (e.g., connecting the mobile phone 250 to the kiosk's wireless network to confirm that it is at the kiosk 100 for recycling), the fraudulent user may attempt to instead submit a non-operative object that looks like the mobile phone 250. The mobile phone 250, however, can detect if it has not been properly submitted for recycling at the kiosk 100, and can send a message to the kiosk 100. In various embodiments, the present technology can help to confirm that the electronic device received by the kiosk 100 is the electronic device that the app described above evaluated and priced for sale at the kiosk 100.

In block 2002 of the routine 2000, when a user brings his or her electronic device with the app to the kiosk 100, the app establishes communication between the electronic device and the kiosk 100, as described above with reference to FIG. 17. In block 2004, the routine 2000 detects the location of the electronic device, such as described above with reference to FIG. 16. In various embodiments, the routine 2000 determines the location of the electronic device after the kiosk 100 has directed the user to submit the electronic device at the kiosk 100 for the kiosk to collect the device (e.g., in the collection bin 234 of FIGS. 2A-2D). In some embodiments, the routine 2000 detects the electronic device's location by checking the electronic device's signal strength and/or continuity, including changes in the electronic device's signal strength. For example, if the kiosk inspection area 108 behind the access panel or door 106 of FIG. 1 is configured to, for example, reflect wireless signals within the inspection area and/or attenuate wireless signals from outside the inspection area, then the app can observe whether such wireless signals are reflected or attenuated when the access panel or door 106 is closed, and thereby detect whether the electronic device appears to be within the inspection area 108. In some embodiments, the app can use an indoor positioning system (IPS) to track the position of the electronic device. In some embodiments, the app can cause the electronic device to take a photograph when the electronic device is supposed to be within the kiosk 100, and can analyze whether the photograph looks like a picture of the interior of the kiosk 100 or of a test pattern, and whether the photograph is of a resolution equivalent to that produced by the type of camera expected to be found in that device model.

In decision block 2006, the routine 2000 determines whether the device is in the proper location. For example, the routine 2000 can determine whether the detected location of the electronic device appears to be consistent with the expected location of the electronic device (e.g., within the inspection area 108 of the kiosk 100). If the routine 2000 determines that the device is in the proper location, then after decision block 2006 the routine 2000 ends. Otherwise, in block 2008, the routine 2000 sends a message to the kiosk 100 (e.g., from the app via the established communication link between the electronic device and the kiosk 100) indicating that the electronic device has not been properly submitted for recycling at the kiosk 100. For example, if the app transmits such a message to the kiosk 100, the kiosk 100 can decline the submitted object that appears not to be the electronic device running the app. After block 2008, the routine 2000 ends.

FIG. 21 is a flow diagram of a routine 2100 for facilitating evaluation of an electronic device at a kiosk 100 in accordance with embodiments of the present technology. In various embodiments, the app and the kiosk 100 can perform some or all of the routine 2100. For example, the app can enable the kiosk 100 to evaluate features and components of the electronic device that might not be testable otherwise. The app on the electronic device can activate various features and components of the electronic device in coordination with the kiosk's tests to more completely verify the operation and capabilities of the electronic device.

In block 2102, the routine 2100 determines that the kiosk 100 is ready to perform an evaluation of the electronic device, such as the electrical and/or visual evaluation described above with reference to FIGS. 2B-2C. For example, the electronic device can be electrically connected to the kiosk 100 (wired or wirelessly, such as described above with reference to FIG. 17) and running the app, and the kiosk 100 can send a signal to the device that runs a program on the electronic device to test various features of the electronic device.

In step 2104, the routine 2100 activates one or more device features for evaluation by the kiosk 100. For example, the app can enable a detailed test of the display of the electronic device, displaying one or more test patterns on the display screen such that the cameras in the kiosk 100 can more clearly see any damaged pixels or areas of the display. Such patterns can include an all-black screen revealing any pixels that are stuck "on" instead of all black; an all-white screen revealing any pixels that are not white; and/or a red screen, a green screen, and a blue screen, to test the color range of each pixel of a typical RGB LCD screen. Additional test patterns can include checkerboard and/or line patterns to reveal pixels that bleed over into their neighbors, for example. The app can activate other features of the electronic device such as the electronic device's speaker, wireless transceiver, camera flash, etc.

In decision block 2106, the routine 2100 determines whether all of the electronic device features selected to be tested have been activated. If not all the tests have been performed, then the routine 2100 continues in block 2104, activating the next feature to be tested (e.g., according to a predetermined testing regimen, or upon receiving a signal from the kiosk 100). For example, a corresponding process performed by the kiosk 100 can select a series of tests to perform (e.g., based on the features of the electronic device and/or on information about the condition of the specific electronic device to be tested), send a message to the app describing the tests to perform, signal the app when the app should proceed to the next test, etc. In some embodiments, the app can be configured to test various features of devices according to the electronic device type (e.g., mobile phone, camera, laptop computer, etc.) and model, and/or based on what features may have a significant effect on the value of the electronic device. After each selected feature has been tested, the routine 2100 ends.

The present technology allows devices of various types that can run or be evaluated by a software application, such as mobile phones (smartphones and feature phones, for example), tablet computers, wearable computers, game devices, media players, laptop and desktop computers, etc. (e.g., the device 330) to be evaluated to facilitate purchasing by an automated kiosk 100. The present technology enables the user to submit information about the electronic device and/or the user, obtain a price quote for the electronic device, prepare the electronic device for recycling, assist the user with bringing the electronic device to the kiosk 100, and facilitate the transaction so that the user can sell the electronic device at the kiosk 100 with greater certainty and speed.

The present technology includes various other types and embodiments of recycling machines. For example, the present technology includes embodiments such as a countertop recycling station and/or a retail store-based interface operated by or with the assistance of a retail employee (such as a partially automated system). As another example, the present technology includes embodiments such as a recycling machine configured to accept all kinds of devices, including larger items (e.g., desktop and laptop computers, televisions, gaming consoles, DVRs, etc.).

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. At least one computer-readable memory carrying computer-executable instructions for causing one or more processors to facilitate purchasing an electronic device at a consumer-operated kiosk, the computer-executable instructions comprising:
    instructions that, when executed by a processor of the electronic device:
        automatically obtain characteristic information about the electronic device;
        determine a price for the electronic device factoring in the characteristic information; and
        present the price to a user of the electronic device; and
    instructions that, when executed by a processor of the kiosk:
        identify the price presented to the user; and
        offer to purchase the electronic device for the price.

2. The computer-readable memory of claim 1 wherein the instructions that automatically obtain characteristic information about the electronic device include instructions that obtain at least a unique identifier for the electronic device, and further comprising instructions that, when executed by the processor of the kiosk:
    receive the unique identifier for the electronic device; and
    identify the electronic device and the price based on the unique identifier for the electronic device.

3. The computer-readable memory of claim 1, further comprising:
    instructions that, when executed by the processor of the electronic device:
        associate an identifier with the electronic device; and
    instructions that, when executed by the processor of the kiosk:
        receive the identifier associated with the electronic device; and
        identify the electronic device and the price based on the identifier associated with the electronic device.

4. The computer-readable memory of claim 1 wherein automatically obtaining characteristic information about the electronic device includes identifying a make, model or hardware configuration of the electronic device.

5. The computer-readable memory of claim 1 wherein the electronic device is a mobile phone having a make, model, storage capacity, and carrier, and wherein automatically obtaining characteristic information about the electronic device includes identifying at least one of the make, model, storage capacity, and carrier of the electronic device.

6. The computer-readable memory of claim 1 wherein the electronic device is a mobile phone having a make, model, storage capacity, and carrier, and wherein automatically obtaining characteristic information about the electronic device includes identifying each of the make, model, storage capacity, and carrier of the electronic device.

7. The computer-readable memory of claim 1 wherein automatically obtaining characteristic information about the electronic device includes obtaining a unique identifier for the electronic device and parsing the unique identifier of the electronic device to determine a make or model of the electronic device.

8. The computer-readable memory of claim 1, further comprising instructions that, when executed by the processor of the electronic device, evaluate the condition of the electronic device based on the characteristic information, and wherein determining the price is based at least in part on the evaluation.

9. The computer-readable memory of claim 1, further comprising instructions that, when executed by the processor of the electronic device, determine whether the characteristic information is sufficient to identify the presence or absence of an issue affecting the electronic device's operation, value, or ability to be resold.

10. The computer-readable memory of claim 1, further comprising instructions that, when executed by the processor of the electronic device, determine whether the electronic device is associated with a remote user account.

11. The computer-readable memory of claim 1, further comprising instructions that, when executed by the processor of the electronic device, determine whether the characteristic information is sufficient to identify whether the electronic device is associated with a remote user account.

12. The computer-readable memory of claim 1, further comprising instructions that, when executed by the processor of the electronic device, determine whether the characteristic information is sufficient to identify whether the electronic device is associated with a remote user account that includes a device control feature.

13. The computer-readable memory of claim 1 wherein determining the price for the electronic device includes:
   transmitting the characteristic information to a remote server; and
   receiving the price for the electronic device from the remote server.

14. The computer-readable memory of claim 1 wherein determining the price for the electronic device includes determining a price that is contingent on a visual analysis of the electronic device at the kiosk.

\* \* \* \* \*